(12) United States Patent
Bismuth et al.

(10) Patent No.: US 12,271,636 B2
(45) Date of Patent: Apr. 8, 2025

(54) ANALYTICS, ALGORITHM ARCHITECTURE, AND DATA PROCESSING SYSTEM AND METHOD

(71) Applicant: Fermat International, Inc., Seattle, WA (US)

(72) Inventors: Robert Bismuth, Seattle, WA (US); Mike Stengle, Basel (CH)

( * ) Notice: Subject to any disclaimer, the term of this patent is extended or adjusted under 35 U.S.C. 154(b) by 0 days.

(21) Appl. No.: 18/502,275

(22) Filed: Nov. 6, 2023

(65) Prior Publication Data

US 2024/0078049 A1    Mar. 7, 2024

Related U.S. Application Data

(63) Continuation of application No. 18/075,576, filed on Dec. 6, 2022, now Pat. No. 11,886,750, which is a continuation of application No. 17/666,049, filed on Feb. 7, 2022, now Pat. No. 11,550,512, which is a continuation of application No. 16/729,727, filed on Dec. 30, 2019, now Pat. No. 11,249,690.

(60) Provisional application No. 62/882,044, filed on Aug. 2, 2019, provisional application No. 62/853,764, filed on May 29, 2019, provisional application No. 62/801,839, filed on Feb. 6, 2019.

(51) Int. Cl.
*G06F 9/38* (2018.01)
*G06F 3/06* (2006.01)

(52) U.S. Cl.
CPC .......... *G06F 3/0661* (2013.01); *G06F 3/0613* (2013.01); *G06F 3/067* (2013.01); *G06F 9/3867* (2013.01)

(58) Field of Classification Search
CPC ...... G06F 3/0661; G06F 3/0613; G06F 3/067; G06F 9/3867
USPC ........................................................ 711/103
See application file for complete search history.

(56) References Cited

U.S. PATENT DOCUMENTS

| | | | | |
|---|---|---|---|---|
| 11,249,690 B2* | 2/2022 | Bismuth | ............... | G06F 3/0613 |
| 11,550,512 B2* | 1/2023 | Bismuth | ................ | G06F 3/067 |
| 11,886,750 B2* | 1/2024 | Bismuth | ............... | G06F 3/0613 |
| 2015/0301900 A1* | 10/2015 | Whitehead | ............ | G06F 16/178 |
| | | | | 709/219 |

* cited by examiner

*Primary Examiner* — Christopher B Shin

(57) ABSTRACT

A system and method employing a distributed hardware architecture, either independently or in cooperation with an attendant data structure, in connection with various data processing strategies and data analytics implementations are disclosed. A compute node may be implemented independent of a host compute system to manage and to execute data processing operations. Additionally, an unique algorithm architecture and processing system and method are also disclosed. Different types of nodes may be implemented, either independently or in cooperation with an attendant data structure, in connection with various data processing strategies and data analytics implementations.

12 Claims, 29 Drawing Sheets

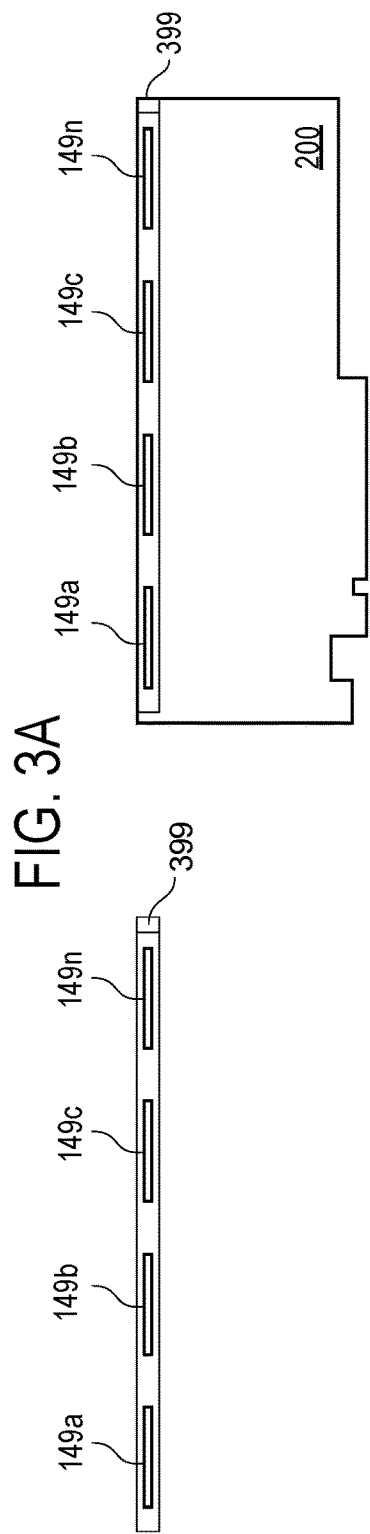
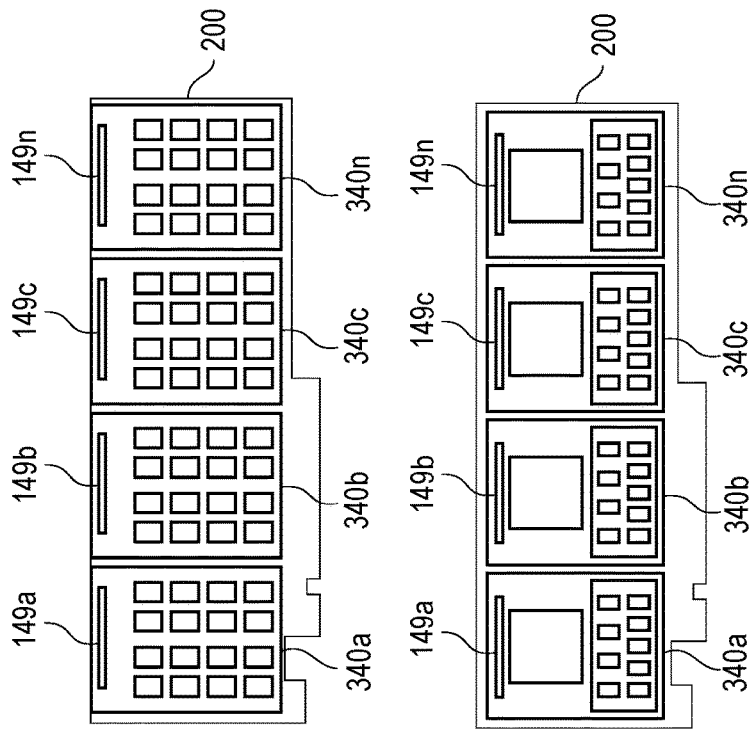
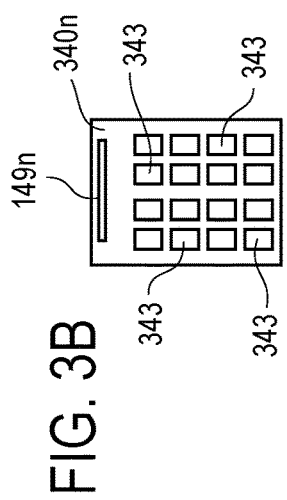
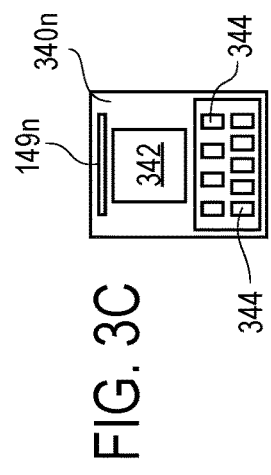
FIG. 3A
FIG. 3B
FIG. 3C

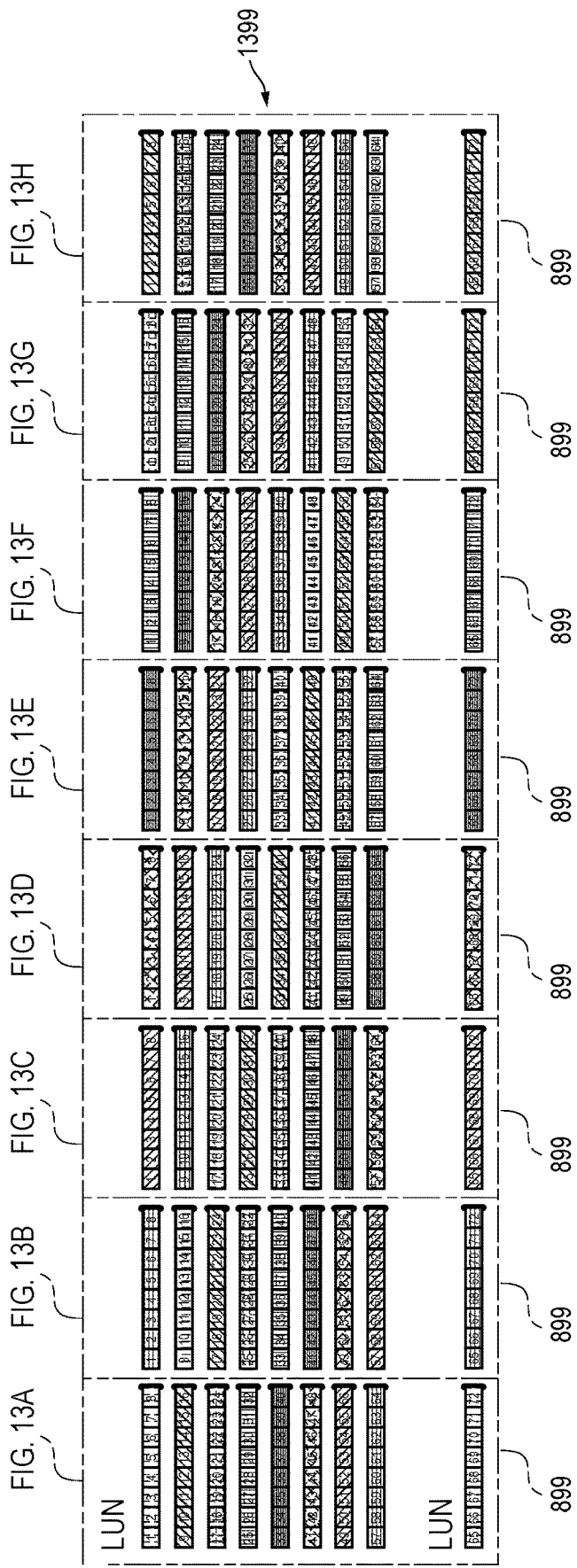
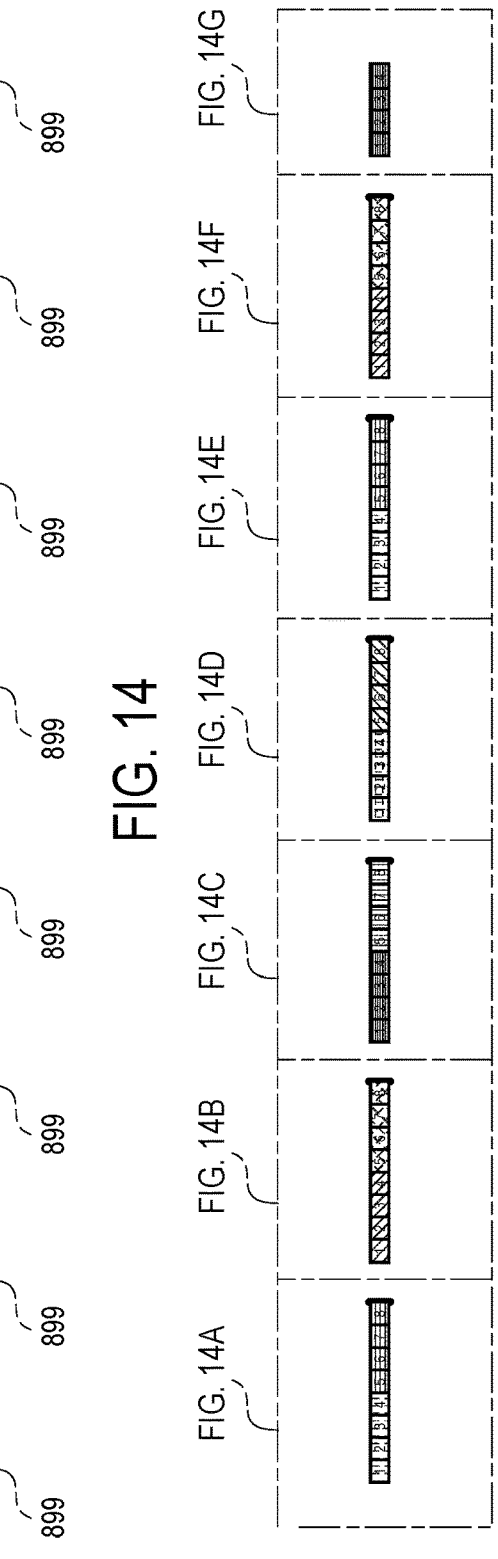

FLASH/COMUTE NODE

COMPUTE NODE

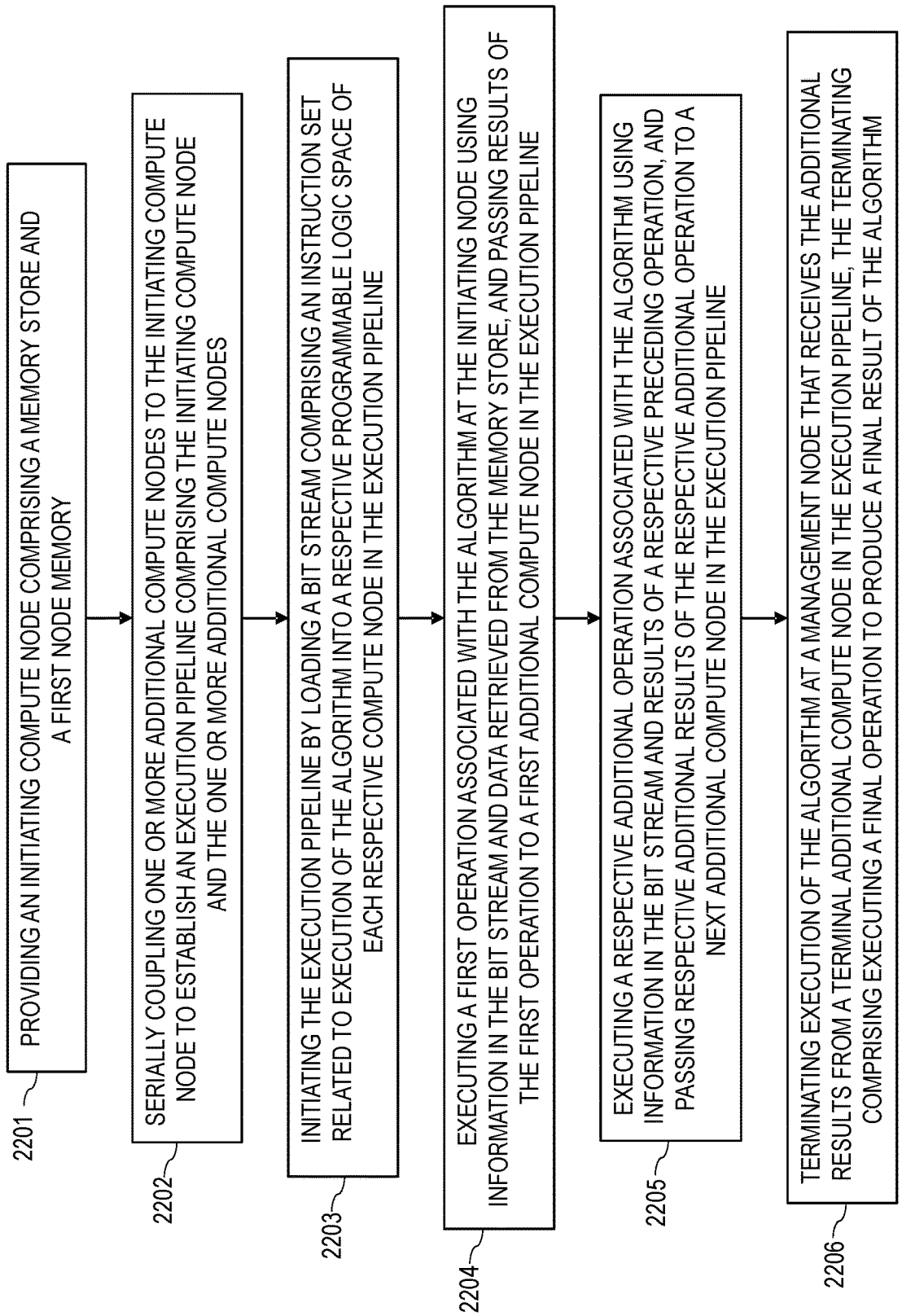

ANALYTICS, ALGORITHM ARCHITECTURE, AND DATA PROCESSING SYSTEM AND METHOD

CROSS-REFERENCE TO RELATED APPLICATIONS

This application is a continuation of, and claims priority to, co-pending U.S. patent application Ser. No. 18/075,576, filed Dec. 6, 2022, which is a continuation of U.S. patent application Ser. No. 17/666,049, filed Feb. 7, 2022, which is a continuation of U.S. patent application Ser. No. 16/729,727, filed Dec. 30, 2019, which claims the benefit of the following United States provisional patent applications: Ser. No. 62/801,839, filed Feb. 6, 2019; Ser. No. 62/853,764, filed May 29, 2019; and Ser. No. 62/882,044, filed Aug. 2, 2019. The disclosures of each of the foregoing applications are hereby incorporated herein by reference in their entireties.

FIELD OF THE DISCLOSURE

Aspects of the disclosed subject matter relate generally to high performance data processing, and more particularly to a system and method employing a distributed hardware architecture, either independently or in cooperation with an attendant data structure, in connection with various data processing strategies and data analytics implementations; additionally or alternatively, aspects of the disclosed subject matter relate to an unique algorithm architecture and processing system and method that may be implemented, either independently or in cooperation with an attendant data structure, in connection with various data processing strategies and data analytics implementations.

BACKGROUND

Recently, "Big Data," high performance computing, and solid state device technologies have become increasingly important in many contexts, such as in connection with machine learning and artificial intelligence projects, for instance. In accordance with conventional computing strategies, solid state devices (such as Flash™ memory and other data storage hardware media), having no moving parts or motors and having relatively short access/read/write times as compared to traditional spinning media, have been gaining popularity in cycle-intensive applications that benefit from decreased latency in memory access. On the other hand, with the explosion of data available to such systems (as a result, for example, of the nascent Internet of Things ("IoT"), distributed memory systems, and other processing paradigms involving devices sharing data with other devices), the sheer volume of available data to process is increasing faster than traditional hardware and software systems are able to evolve in order to process those data in a meaningful and efficient manner.

Further, most conventional systems designed for high throughput data processing and analytics rely upon exhaustive (or "brute force") approaches that attempt to overpower the magnitude of the challenge with overwhelming computational resources, at the expense of cycle time and power consumption. In many instances, the dataset size creates a situation in which a practical or commercially reasonable solution is impossible, or at least prohibitively expense. As a practical matter, it will be appreciated that for as long as the rate at which new data become available for processing continues to outpace the rate at which processing methodologies advance to accommodate the increased size of a given dataset, it will continue to take longer to solve bigger and more complex data processing problems.

Therefore, there is a need for an improved system and method employing a distributed hardware architecture that facilitates high throughput data processing and analytics solutions for resource-intensive applications; as set forth below, some implementations of such a distributed hardware architecture may be configured and operative to employ a data structure that departs from traditional approaches. Further, there is a need for an improved algorithm architecture and processing system and method for high throughput data processing and analytics solutions for resource-intensive applications. As with the distributed hardware architecture noted above, such an algorithm architecture and processing system may have utility in connection with a non-traditional data structure.

SUMMARY OF THE DISCLOSURE

The following presents a simplified summary of the disclosure in order to provide a basic understanding of some aspects of various embodiments disclosed herein. This summary is not an extensive overview of the disclosure. It is intended neither to identify key or critical elements of the disclosed embodiments nor to delineate the scope of those embodiments. Its sole purpose is to present some concepts of the disclosed subject matter in a simplified form as a prelude to the more detailed description that is presented later.

The present disclosure describes a system and method employing a distributed hardware architecture to manage and to execute data processing operations, either independently or in cooperation with an attendant data structure; in the context of this description, a discrete component of such a distributed hardware architecture is generally referred to as a "compute node," though other terms may be used by those of skill in the art. In some implementations, one or more compute nodes may be utilized to manage and to execute data processing operations independent of, though communicatively coupled with, a host compute system. In addition, the present disclosure describes an algorithm architecture and processing system and method that may be implemented, either independently or in cooperation with an attendant data structure, in connection with various data processing strategies and data analytics implementations that may be distributed across or amongst various compute nodes in a distributed processing environment or paradigm.

In accordance with one aspect of the disclosed subject matter, for example, a method of reformatting a data structure may generally comprise: receiving a block of data, the block of data comprising a number, y, of original records wherein each original record comprises a number, x, of original fields; for i=1 to x, defining a new data record, each respective new record comprising y new fields, wherein each respective new field corresponds to a respective $i^{th}$ original field from a respective original record; reformatting the block of data responsive to the defining such that a reformatted block of data comprises the new data records, each comprising a single field type; associating each of the new data records with an index operative to identify a particular new data record in the reformatted block of data; and writing the reformatted block of data to memory.

In accordance with some implementations, a reformatted data structure may be derived from an original data structure, and the reformatted data structure may generally comprise a plurality of new data records, each of the new data records comprising a plurality of new fields associated with a particular field type defined in the original data structure such that every new field in a particular new record is of the particular field type, wherein the reformatted data structure allows a processing system selectively to read the new data records as original records from the original data structure or as original fields from the original data structure.

In some disclosed implementations, a method of executing data processing operations may generally comprise: providing a compute node communicatively coupled to a host computer and operative to manage data processing operations independent of the host computer; providing a programmable logic component in the compute node that is configured and operative to execute data processing operations in cooperation with a first memory component; providing a data mover component in the compute node that is configured and operative to facilitate data communications between the programmable logic component and a second memory component; providing a set of instructions that enable the programmable logic component to reformat a block of data comprising original records, each original record comprising a plurality of fields having different field types, such that a reformatted block of data comprises new records, each new record comprising a plurality of fields of a single field type from the original records; and utilizing a plurality of communications channels to transfer data associated with the reformatted data block between the programmable logic component and the first memory component.

In accordance with another aspect of the disclosed subject matter, a data processing system may be operative in cooperation with a host compute system, and the data processing system may generally comprise: a router module comprising a host interface and a node interface, wherein the router module is communicatively coupled to the host compute system via the host interface; and a compute node comprising: a communications link, wherein the compute node is communicatively coupled to the node interface at the router module via the communications link; a data store comprising records associated with a data processing operation; a programmable logic component to execute the data processing operation in cooperation with the data store; a node memory comprising data and instructions to support operation of the programmable logic component in connection with the data processing operation and to facilitate data communications via the communications link; a data mover component to facilitate data communications between the programmable logic component and the node memory; and a storage interface component to facilitate data communications between the programmable logic component and the data store; wherein the storage interface component utilizes a plurality of communications channels to transfer data between the programmable logic component and the data store.

Additionally or alternatively, a data processing system operative in cooperation with a host compute system may generally comprise: a router module comprising a host interface and a node interface, wherein the router module is communicatively coupled to the host compute system via the host interface; and a compute node comprising: a communications link, wherein the compute node is communicatively coupled to the node interface at the router module via the communications link; a data store comprising datasets associated with a data processing operation; a programmable logic component to execute the data processing operation in cooperation with the data store; a node memory comprising data and instructions to support operation of the programmable logic component in connection with the data processing operation and to facilitate data communications via the communications link; a data mover component to facilitate data communications between the programmable logic component and the node memory; and a storage interface component to facilitate data communications between the programmable logic component and the data store; wherein the programmable logic component executes a set of instructions to reformat a block of data comprising original records, each original record comprising a plurality of fields having different field types, such that a reformatted block of data comprises new records, each new record comprising a plurality of fields of a single field type from the original records; and wherein the programmable logic component causes the new records to be stored as the datasets in the data store.

In accordance with another aspect of the disclosed subject matter, a data processing system operative in cooperation with a host compute system may be summarized as generally comprising: a management node comprising a host interface and a node interface, wherein the management node is communicatively coupled to the host compute system via the host interface; a memory-supported compute node comprising: (i) a communications link, wherein the memory-supported compute node is communicatively coupled to the node interface at the management node via the communications link; (ii) a data store comprising records associated with a data processing operation; (iii) a programmable logic component to execute the data processing operation in cooperation with the data store; and (iv) a node memory comprising data and instructions to support operation of the programmable logic component in connection with the data processing operation and to facilitate data communications via the communications link; and a pipeline of one or more additional compute nodes, each of the respective one or more additional compute nodes serially connected to the memory-supported compute node via a respective communications link and comprising a respective additional node memory and a respective programmable logic component to execute a respective data processing operation in cooperation with data received via the respective communications link.

In another aspect, a data processing system operative in cooperation with a host compute system may generally comprise: a management node comprising a host interface and a node interface, wherein the management node is communicatively coupled to the host compute system via the host interface; a memory-supported compute node comprising: (i) a communications link, wherein the memory-supported compute node is communicatively coupled to the node interface at the management node via the communications link; (ii) a data store comprising records associated with a data processing operation; (iii) a programmable logic component to execute the data processing operation in cooperation with the data store; and (iv) a node memory comprising data and instructions to support operation of the programmable logic component in connection with the data processing operation and to facilitate data communications via the communications link; and a pipeline of one or more additional compute nodes, each of the respective one or more additional compute nodes comprising: a respective communications link, wherein the respective additional compute node is communicatively coupled to an upstream compute node and a downstream compute node via the communications link; and a respective additional node memory and a respective programmable logic component, the respective additional node memory comprising data and instructions to support operation of the respective programmable logic component in connection with a respective data processing operation and to facilitate data communications via the respective communications link; wherein each respective additional compute node executes the respective data processing operation using results from its respective upstream compute node, and passes respective results to its respective downstream compute node; in some implementations, it may be desirable that each respective additional compute node operates without storing the respective results in the respective additional node memory.

In accordance with yet another aspect of the disclosed subject matter, a method of executing an algorithm in a distributed processing compute environment may generally comprise: providing an initiating compute node comprising a memory store and a first node memory; serially coupling one or more additional compute nodes to the initiating compute node to establish an execution pipeline comprising the initiating compute node and the one or more additional compute nodes, each respective one of the one or more additional compute nodes comprising a respective second node memory; initiating the execution pipeline by loading a bit stream comprising an instruction set related to execution of the algorithm into a respective programmable logic space of each respective compute node in the execution pipeline; executing a first operation associated with the algorithm at the initiating node using information in the bit stream and data retrieved from the memory store, and passing results of the first operation to a first additional compute node in the execution pipeline; wherein the first additional compute node and each subsequent additional compute node in the execution pipeline executes a respective additional operation associated with the algorithm using information in the bit stream and results of a respective preceding operation, and passes respective additional results of the respective additional operation to a next additional compute node in the execution pipeline; and terminating execution of the algorithm at a management node that receives the additional results from a terminal additional compute node in the execution pipeline, the terminating comprising executing a final operation to produce a final result of the algorithm. As with the previous example, it may be desirable in some circumstances that each respective additional compute node operates without storing the respective results in the respective additional node memory.

In accordance with another aspect of the disclosed subject matter, a compute node for use in a data processing system may generally comprise: a communications link communicatively coupling the compute node to a host compute system either directly or indirectly via an adjacent compute node in an execution pipeline; a data store comprising records associated with a data processing operation; a programmable logic component to execute the data processing operation in cooperation with the data store; a node memory comprising data and instructions to support operation of the programmable logic component in connection with the data processing operation and to facilitate inter-node data communications with the adjacent node via the communications link; a data mover component to facilitate intra-node data communications between the programmable logic component and the node memory; and a storage interface component to facilitate intra-node data communications between the programmable logic component and the data store; compute nodes are disclosed wherein the storage interface component utilizes a plurality of communications channels to transfer data between the programmable logic component and the data.

Implementations of compute nodes are disclosed wherein the communications link employs a serial communications protocol enabling bi-directional data communication between the compute node and other compute nodes in the execution pipeline. A compute node may be communicatively coupled to the adjacent compute node in series via the communications link.

In some implementations, the data comprise an Electronically Erasable Programmable Read Only Memory (EEPROM) device. In some compute nodes, the storage interface employs an Open NAND Flash Interface (ONFI) protocol, the programmable logic comprises a field programmable gate array (FPGA), or both.

Additionally or alternatively, the compute node may further comprise a processor to manage operation of the data mover component; in some instances of such a compute node, the data mover component comprises a device controller.

Implementations are disclosed wherein the communications link enables the compute node to receive instructions from the host compute system, the instructions to influence operation of the compute node. The compute node may be combined with a router module and integrated into an interface card communicatively coupled to the host compute system.

In some instances, the compute node executes a respective operation associated with an algorithm using information in a computer-executable code associated with the algorithm and results of a respective preceding operation, and passes respective additional results of the respective operation to a next compute node in the execution pipeline; implementations are disclosed wherein the computer-executable code associated with the algorithm is incorporated in a bit stream.

The foregoing and other aspects of various disclosed embodiments will be apparent through examination of the following detailed description thereof in conjunction with the accompanying drawing figures, in which like reference numerals are used to represent like components throughout, unless otherwise noted.

DESCRIPTION OF THE DRAWING FIGURES

FIGS. 3A through 3C are functional block diagrams illustrating certain hardware components of an implementation of a data processing and analytics system such as that depicted in FIG. 1;

FIGS. 13 and 13A through 13H are diagrams illustrating another implementation of a data record structure having utility in connection with a compute node operative in accordance with the present disclosure;

FIGS. 14 and 14A through 14G are diagrams illustrating yet another implementation of a data record structure having utility in connection with a compute node operative in accordance with the present disclosure;

FIG. 22 is a functional flow diagram illustrating aspects of one implementation of a method of executing data processing operations.

DETAILED DESCRIPTION

Figure 1:
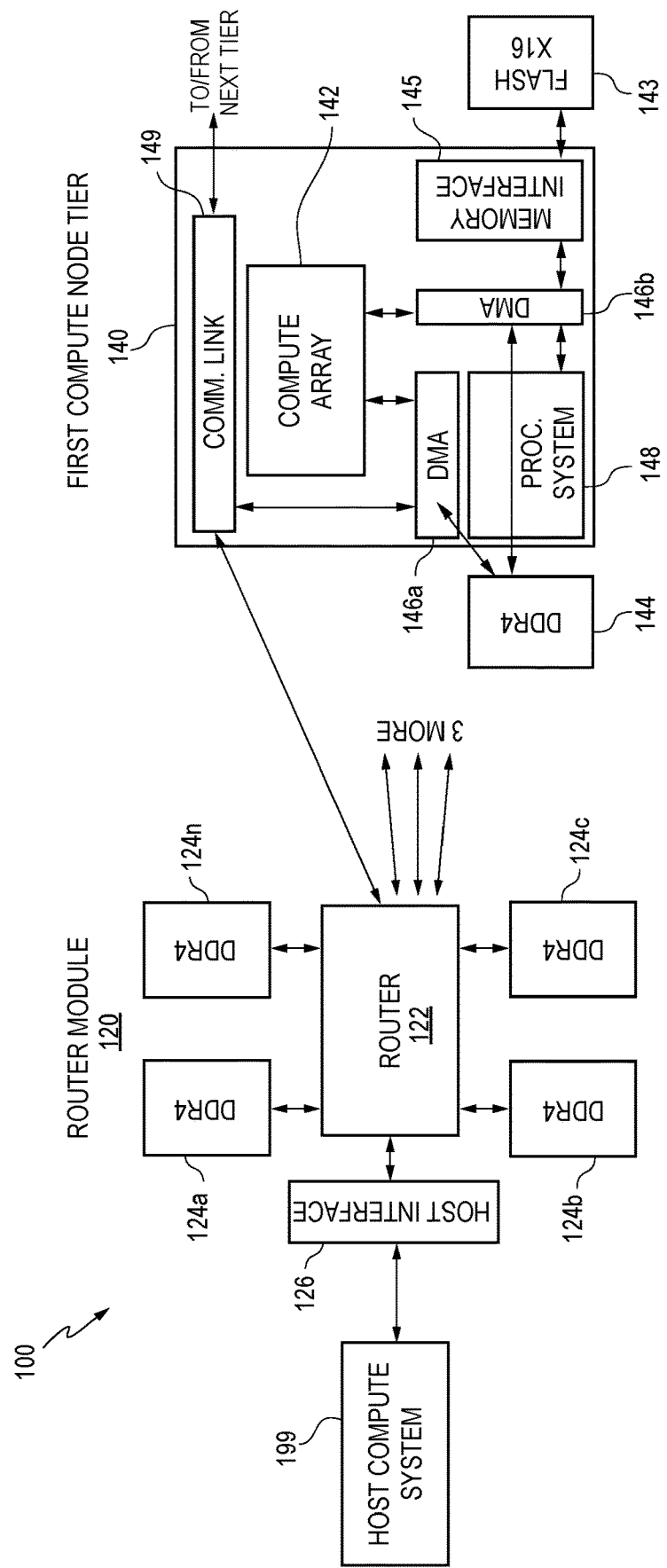
FIG. 1 is a functional block diagram illustrating one implementation of a data processing and analytics system for use in connection with a host compute system.

Certain aspects and features of the disclosed subject matter may be further understood with reference to the following description and the appended drawing figures. In operation, a system and method employing a distributed hardware architecture, and optionally, an attendant data structure, may have utility in connection with various data processing strategies and data analytics implementations. Specifically, the present disclosure provides for an integrated data processing platform that may generally comprise hardware and software.

As set forth in more detail below, the present disclosure addresses design and implementation of an architectural framework that may employ high performance data processing elements (compute nodes) coupled with massive data storage (a data store) in a unique configuration that minimizes or eliminates typical processor/network wait states, optimizes instruction fetch memory cycles, and analyzes data that are streamed from an attached or associated data store at the maximum rate at which the data can be accessed or streamed by the storage subsystem. The architectural framework generally contemplates one or multiple compute nodes operating in parallel (and in series, in some cases, as described below), each of which may be configured as a pipeline of computational elements that can be configured and operative to implement a variety of algorithms or other data processing operations. In the configurations provided as examples, a fully parallelized dataflow environment, which exhibits extremely high performance for analyzing massive amounts of data, is described.

The disclosed architectural arrangement may generally include a set of programmable logic blocks that may be linked in various ways to create (as well as to execute) arbitrary algorithms. This strategy greatly reduces the learning curve for using programmable processors to implement computational algorithms. For example, a typical application programmer (e.g., with a limited understanding of programmable logic hardware, per se) may nevertheless easily use the disclosed architecture without needing to understand the intricacies of using one of more programmable logic block hardware components and how their structures or interconnections might affect or otherwise relate to algorithm requirements of the application program.

Additionally, embodiments are disclosed of a system and method of morphing (i.e., reorganizing or reformatting) data located in data records; as is generally known in the art, these data are typically stored or maintained in files or datasets (or "records" or "pages"). The disclosed system and method may be implemented for the purpose of increasing the performance of analytic algorithms being applied to the data, and may optimize or maximize the rate at which data may be correctly presented to an analytic algorithm.

It will be appreciated that the present disclosure addresses design and implementation of memory controller (such as a Flash controller) hardware and strategies capable of supporting optimized, overlapping data read and write requests from or to a memory component, while also allowing streaming of data from the same memory component for analysis by an algorithm or other data processing operation. In one implementation, scheduling of read access requests issued to memory component targets may be sequenced and overlapped in a strategic manner such that data output from the memory component is maximized, optimized, or otherwise increased as compared to conventional memory controller technologies; specifically, the disclosed systems and methods may decrease or eliminate wait times typically caused by Flash (or other memory) read delays or latency.

In accordance with the disclosed subject matter, it will be appreciated that a power management system may readily be implemented using the architecture set forth below (see, e.g., FIG. 4) to implement a system of microcontroller- or microprocessor-based regulators that communicate with each other using an on-board local area network. This solution may allow power regulators to be sequenced as desired or required (for instance, by power consuming subsystems on a host hardware module), and also may allow the regulators to balance current load requirements. In some instances, this implementation may also provide a failover capability in the event that any single regulator or group of regulators fails. The result is a safe power environment that correctly starts up a module (such as a compute node or an entire interface card or other hardware component comprising or accommodating a plurality of compute nodes such as described below) without risk of damage due to uncoordinated power sequencing and also provides for a balanced, fault-tolerant running environment to facilitate or to improve reliability with respect to a particular hardware module operative in accordance with the disclosed subject matter. For instance, core voltage supplied to a processing unit in a router component as described below may be supplied via, or in cooperation with, a poly-phase, shared (i.e., redundant) regulator to handle power sequencing, load balancing, and fault-tolerance; it will be appreciated that other voltage supply subsystems necessary or desirable to provide the following functionality may benefit from a similar or analogous voltage regulation strategy.

Turning now to the drawing figures, FIG. 1 is a functional block diagram illustrating one implementation of a data processing and analytics system for use in connection with a host compute system. As illustrated, one implementation of system 100 may generally comprise a host compute system 199, a router module 120, and a compute node 140.

Host compute system 199 may generally be embodied in or comprise a computer server, a desktop or workstation computer, a laptop or portable computer or tablet, or a combination of one or more of such components. In operation, host compute system 199 may be employed to initiate, instantiate, or otherwise to request data processing operations to be executed by system 100 substantially as set forth below. In that regard, host compute system 199 may include one or more microprocessors, field programmable gate arrays (FPGAs), microcontrollers, or other digital processing apparatus, along with attendant memory, controllers, firmware, network interface hardware, and the like. For example, host compute system 199 may generally comprise multiprocessor systems, microprocessor-based or programmable consumer electronics, personal computers ("PCs"), networked PCs, minicomputers, mainframe computers, and similar or comparable apparatus for general purpose or application-specific data processing. Various implementations of host compute system 199 may be deployed in distributed computing environments in accordance with which tasks or program modules may be performed or executed by remote processing devices, which may be linked through a communications network. Those of skill in the art will appreciate that any of various computer servers, work stations, or other processing hardware components or systems of components may be suitable for implementation at host compute system 199, and that the disclosed subject matter is not limited to any particular hardware implementation or system architecture employed at host compute system 199.

With respect to requesting, initiating, enabling, facilitating, and receiving results of the data processing functionality described herein, host compute system 199 may be communicatively coupled to router module 120, enabling bi-directional data transmission in accordance with any of various communications interfaces or telecommunications protocols generally known in the art or developed and operative in accordance with known principles. Router module 120, in turn, may also be communicatively coupled to compute node 140 such that data may be transmitted or transferred, via router module 120, between host compute system 199 and compute node 140 substantially as set forth below.

Specifically, router module 120 may generally comprise a router 122, one or more router memory components 124a, 124b, 124c, . . . 124n ("router memory 124") and a host interface 126; additionally, router module 120 may also include one or more node interfaces (not illustrated in FIG. 1) such as network interface cards, wireless or inductive hardware components, or communications ports, jacks, or plugs, for instance, to enable router 122 to communicate with a respective compute node 140 as is generally known in the art. In use, router 122 may be operable to transmit data packets between host compute system 199 and a respective compute node 140 in cooperation with routing information (destination address, packet header data, flood domains, etc.) and other short term data (look up tables, resource availability, performance or load balancing data, etc.) stored in or accessible by router memory 124. In some instances, router 122 may distribute data packets and write commands to compute nodes 140 in accordance with a data-aware round robin strategy. Router memory 124 may be embodied in or comprise, by way of example, volatile memory such as random access memory (RAM) in any of its various forms, for instance, static RAM (SRAM), dynamic RAM (DRAM), double-data rate (DDR) RAM, and the like; in some applications, DDR4 RAM may be used as router memory 124. Attendant bus structures and memory controller elements are omitted from FIG. 1 for clarity, but are well-known in the art. In one implementation, router 122 may execute all routing functionality on or in cooperation with a Kintex™ KU095 FPGA platform marketed by Xilinx, Inc., but as many types of hardware implementations are generally available, the structure and operation of router 122 and router memory 124 are not described further.

In some implementations, host interface 126 may be operative in accordance with Peripheral Component Interconnect (PCI) or PCI Express (PCIe) hardware and associated communications protocols. Alternatively, other types of communications interface hardware and methodologies may be employed, such as Ethernet™ or Serial ATA (SATA). The specific hardware and communication strategy embodied by or incorporated into host interface 126 may be selected in accordance with bandwidth requirements, cooperating hardware at host compute system 199, functionality and operational characteristics of router 122, or a combination of these and a variety of other factors. The same is generally true of the hardware and communication protocol implemented at node interfaces, which may be configured and operative to communicate data packets bi-directionally between router 122 and compute nodes 140 as set forth below.

In that regard, router 122 may be communicatively coupled (via a respective node interface) to a respective compute node 140 via a communications link 149 integrated into each respective compute node 140. In the FIG. 1 illustration, only a single compute node 140 is illustrated, but an additional three in the first compute node tier are also depicted abstractly by the bi-directional arrows from router 122. It will be appreciated that each respective series of compute nodes 140 may employ a dedicated communications channel or "lane" for data transmission with router 122, such that the FIG. 1 architecture contemplates four parallel lanes, one for each of a series of compute nodes 140. In that regard, compute node 140 may be communicatively coupled, via communications link 149, to one or more additional compute nodes 140 connected in series (i.e., at different successive tiers), as illustrated at the top right side of FIG. 1.

In addition to communications link 149, in the FIG. 1 arrangement, each compute node 140 may generally comprise a compute array 142, a data store 143, a data store interface 145, node memory 144, one or more datamover apparatus (DMA) 146a and 146b ("DMAs 146"), and a processing system 148. These elements are described in detail below with specific reference to FIG. 4.

In some implementations, data store 143 may be embodied in or comprise a mass data storage component, such as a non-volatile data storage device, one example of which is an Electronically Erasable Programmable Read Only Memory (EEPROM) store. For example, data store 143 may be, or include, Flash memory, though other memory types having suitable or appropriate characteristics to facilitate the functionality set forth herein may be in use currently or developed in the future. Specifically, though all Flash is EEPROM (as a technical matter), it is noted that not all EEPROM is Flash. Typically, those of skill in the art may tend to interpret the term EEPROM as a very specific type of non-volatile memory, but the term is not so limited as employed in the context of this disclosure; examples using Flash are described below, but any non-volatile storage media and high-bandwidth interface protocol may have utility in the context of the disclosed subject matter. In situations in which data store 143 is implemented as Flash, data store interface 145 may employ an Open NAND Flash Interface (ONFI) protocol; in the case that data store 143 uses a different memory technology, data store interface 145 may be selected or modified accordingly. In operation, data store interface 145 manages access (e.g., read and write access) to data store 143, as is generally known in the art.

As with router memory 124, node memory 144 may be implemented as or comprise DDR4 RAM, or other volatile or non-volatile memory suitable to support operations of compute node 140, in general, and processing system 148, in particular. In the illustrated architecture, processing system 148 may generally handle read/write commands and other memory access with respect to data store 143 (via data store interface 145), receive and act upon interrupt requests (e.g., with respect to operations executing at compute array 142), and regulate, control, or otherwise influence data transfers managed by DMAs 146. For instance, in one embodiment, processing system 148 may comprise a set of one or more processing components to manage all interrupt handling as well as Advanced Extensible Interface (AXI) or other data transfers via DMAs 146, on the one hand, and a different set of one or more processing components to manage general system administration (or "house-keeping") and management tasks for compute node 140 as well as algorithm execution support for compute array 142, on the other hand. While this implementation is described in more detail below with reference to FIG. 4, it is worth noting here that it is only one example, and that many different component arrangements and task distributions are within the scope and contemplation of the disclosed subject matter.

It is noted that router module 120 (including host interface 126) and the various compute nodes 140 described above, as well as associated busses, communications pathways, and attendant or supporting hardware infrastructure, may be incorporated into or disposed on a carrier board (such as a printed circuit board (PCB)) or interface card ("card," see reference numeral 200 in FIGS. 2A and 2B) that is configured and operative to cooperate with structural components of host compute system 199 as is generally known. Specifically, one or more cards 200 may be inserted into or otherwise engage receptacles, slots, jacks, plugs, etc. that are electrically and communicatively coupled to a motherboard, bus, or other interface component at host compute system 199; accordingly, system 100 may be scalable as a function of slots that are available at host compute system 199 to receive a card 200.

At a high level, the disclosed architecture of system 100 generally includes a star arrangement in accordance with which a central host interface 126 (e.g., a PCIe interface) to/from host compute system 199 may be routed to four (or more) "riser" positions via router 122 (e.g., an FPGA or microprocessor platform). At each riser position, a stack (i.e., various tiers in FIG. 1) of compute nodes 140 may be communicatively coupled in series. One configuration may generally comprise two rows of four compute nodes 140 (tiers), whereas the FIG. 1 configuration includes four rows, each having an indeterminate number of tiers. In accordance with a PCIe implementation, each riser position or stack may employ eight discrete lanes of 8 Gb/s data links, i.e., a total of 64 Gb/s, full duplex, capacity per riser position.

As noted above, communications link 149 may be employed to couple compute nodes 140 within a stack (i.e., at different successive tiers) in series. In some implementations, communications link 149 may be based upon and operative in accordance with standard serial interfaces or protocols, though some proprietary serial links may also be appropriate, depending upon the functionality and operational characteristics of compute array 142, for instance. For instance, one example of compute array 142 may employ or comprise a Xilinx Zynq™ Ultrascale+™ ZU9EG FPGA, in which case, it may be desirable that communications link 149 employ or comprise a Xilinx Aurora™ communication link, as it functions well with transceivers provided by the same manufacturer. In operation, communications link 149 may be selected, configured, and operative to provide a light-weight wrapper of the complex multi-gigabit transceivers deployed in the FPGA fabric of compute array 142, and so it may be desirable to select communications link 149 hardware as a function of, or otherwise taking into consideration, the hardware and operation of compute array 142. Those of skill in the art will appreciate that many options exist for both compute array 142 and communications link 149, and that specific commercial embodiments have been identified by way of example only, and not by way of limitation.

In connection with Big Data and other resource-intensive processing applications, it may generally be desirable to allow compute nodes 140 autonomously to handle much of the data ingest activities and distribution of processing responsibilities; accordingly, compute nodes 140 themselves may, in some cases, determine an appropriate method of round robin processing and tracking of write histories during complex data processing operations. Additionally or alternatively, it may be desirable that host compute system 199 provide directions or instructions regarding round robin processing and write operations.

For example, each compute node 140 may monitor and track, or log, its own local activity; as the level of detail or the quantity of activity to be tracked increases, however, the amount of node memory 144 required (to enable rapid access, for example) may generally increase, the latency for a given memory access operation (or for a given type or class of operations) will increase, or both. This is especially true if information or local activity sought to be tracked must be extracted from data store 143 prior to each new write transaction.

Further, communication with neighboring compute nodes 140 in the disclosed star architecture may generally become increasingly costly the further away a particular compute node 140 is from the neighboring compute node 140. Elapsed time, throughput degradation (if control or administrative paths are shared with payload data), programmable logic resource consumption, and energy consumption may all increase in proportion with or as a function of distance between respective compute nodes 140 that are to exchange information. One way to eliminate or to minimize such deleterious effects is to implement a mesh architecture (not shown), in accordance with which an "any to any" communications strategy may be integrated into the architecture of system 100. In such an embodiment, a bit of sideband control traffic may generally have minimal or negligible impact, and may be implemented effectively without having a materially adverse effect on payload data or overall performance of system 100.

One approach to round robin processing that may readily be implemented across multiple cards 200 is to allow host compute system 199 itself to direct write commands to specific data targets or memory addresses, down to the data store 143 level, for instance. In particular, host compute system 199 may generally be apprised of all the data (i.e., system-wide) to be written, and is unique in that regard (as compared to other components of system 100); accordingly, host compute system 199 may be enabled to select, compute, or otherwise to determine a proper, appropriate, or optimal granularity of distribution (e.g., after how many clock cycles may the round robin advance from one compute node 140 to another). Furthermore, host compute system 199 may keep track of last writes across the entirety of the topography of system 100, and then re-start the round robin at an appropriate point (e.g., after a power cycle, crash, or other interruption).

Employing host compute system 199 in the foregoing manner may not scale well in terms of performance under certain circumstances, particularly in situations where host compute system 199 is limited to local resources and not distributed across multiple processing platforms. For applications or environments requiring high scalability, an alternative approach may include enabling host compute system 199 to inform each attached or coupled card 200 of an optimal granularity of the round robin method that it is to utilize (for example, to attain maximum or some desired level of efficiency). In the case of a system employing multiple cards 200, host compute system 199 itself may implement the first tier of round robin distribution. In this example, each compute node 140 may keep track of the last channel as well as the memory address or data record (per channel) that was used for each record or column of data that is written as set forth in more detail below.

If the first stage of the round robin mechanism (e.g., on the FPGA implemented at router 122) has no non-volatile storage available, it may not be possible to store the last target of distribution across power cycles. To avoid overburdening the first compute node 140 as a target in the case of many power cycles (each of which may require round robin re-initialization), the round robin logic may be initialized with a random first target in some applications. If the round robin granularity is too small and the data are distributed across multiple compute nodes 140 without filling a full page on any of them, the performance of system 100 incurs partial page write penalties on all compute nodes 140 involved.

Figure 2A:
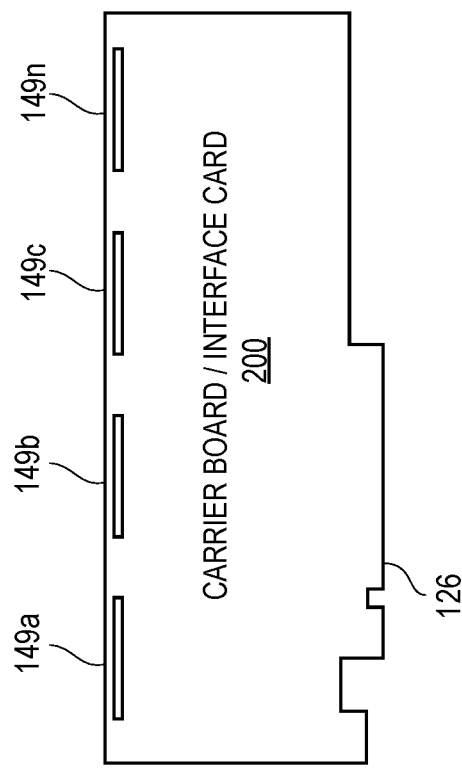
FIGS. 2A through 2C are functional block diagrams illustrating one example of a hardware environment accommodating components of a data processing and analytics system.
Figure 2C:
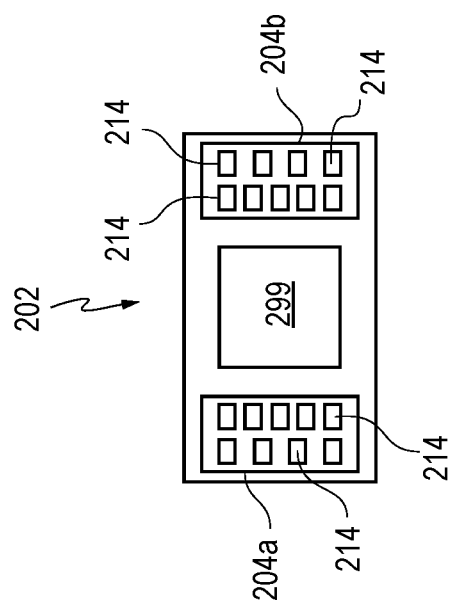
Figure 2B:
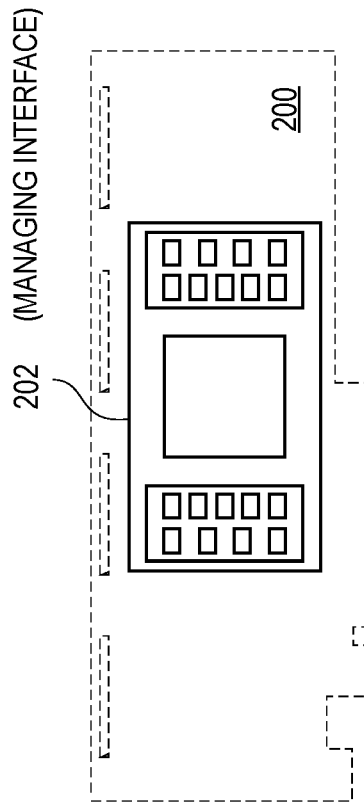

FIGS. 2A through 2C are functional block diagrams illustrating one example of a hardware environment accommodating components of a data processing and analytics system.

FIG. 2A depicts a top view of a carrier board (such as a PCB) or interface card ("card" 200) that may support or carry router module 120 and compute node 140 substantially as set forth above. Card 200 may comprise a typical or conventional form factor host interface 126 suitably dimensioned and configured to create electrical and/or power connections when engaged with a cooperating structure integrated into, associated with, or otherwise communicatively coupled to host compute system 199. As noted above, host interface 126 may be a PCIe, Ethernet, SATA, or other interface, and may be coupled to electrical and power connections on or integrated with card 200 via conventional PCB fabrication techniques. FIG. 2A also illustrates communications links 149a, 149b, 149c, through 149n (links 149), a respective one dedicated to each of a respective number "n" of stacks of compute nodes 140 coupled in series as set forth above. It is noted that card 200 may employ more or fewer than the four communications links 149 that are depicted in FIG. 2A.

FIG. 2B depicts a top view of a card 200 on which is disposed one example of a managing interface 202 component, and FIG. 2C depicts a top view of the managing interface 202 component of FIG. 2B. In some implementations, managing interface 202 may be embodied in or comprise router module 120 described above; in that regard, managing interface 202 may be an example of one embodiment of router module 120, such that router 122 maps to an FPGA 299 and router memory 124 components map to interface memory components 204a and 204b, each of which is depicted as having a number of discrete memory cells or memory modules 214, such as dual in-line memory modules (DIMMs) or other independently addressable memory structures. It is noted that, in this example, managing interface 202 may further comprise additional interface memory components (not shown) to correspond to the number of router memory 124 components employed in router module 120. As an alternative, router module 120 may be deployed in the FPGA 299 block in FIG. 2, and interface memory components 204a and 204b may support the functionality of router module 120 substantially as described above. Those of skill in the art will appreciate that other alternatives exist, and that the disclosed subject matter is not intended to be limited to the architecture or structural arrangement illustrated in FIGS. 2B and 2C.

FIGS. 3A through 3C are functional block diagrams illustrating certain hardware components of an implementation of a data processing and analytics system such as that depicted in FIG. 1. The left side of FIG. 3A depicts communications links 149a, 149b, 149c, through 149n (links 149) and a power coupling 399 in isolation, while the right side of FIG. 3A depicts links 149 and power coupling 399 as they may be deployed on card 200. As noted above, each respective communications link 149 may be dedicated to each of a respective number "n" of stacks of compute nodes 140 coupled in series, and card 200 may employ more or fewer than the four communications links 149 that are depicted in FIG. 3A.

FIG. 3B is a first view of one side of a card or substrate upon which elements of compute nodes 340a, 340b, 340c, through 340n (compute nodes 340) may be disposed, and FIG. 3C is a second view of an opposite side of a card or substrate upon which other elements of compute nodes 340 may be disposed. The left side of each of FIGS. 3B and 3C illustrates a single compute node 340n in isolation, while the right side illustrates a number, "n," of such compute nodes implemented on card 200.

It is noted that compute nodes 340 may be integrated with, or disposed upon, a PCB or other carrier board, interface card, or similar structural substrate such as described above with reference to card 200. In the example of FIGS. 3B and 3C, for instance, some elements or components of compute nodes 340 may be disposed upon, attached to, or integrated with one side of such a card, whereas other components of compute nodes 340 may be disposed upon, attached to, or integrated with an opposing side. This particular structural arrangement, and appropriate manufacturing methods for effectuating same, are generally known in the art of electronics fabrication, and the disclosed subject matter is not intended to be limited to any particular fabrication techniques or process node methodologies.

Each compute node 340 may generally comprise communications link 149, a data store (depicted abstractly at reference numeral 343 in FIG. 3B), a compute array 342, and node memory 344. In some implementations, compute nodes 340 may map generally to compute nodes 140 illustrated in, and described with reference to, FIG. 1. In one example, data store 343, compute array 342, and node memory 344 may correspond, respectively, to data store 143, compute array 142, and node memory 144 described above; in such an example, compute nodes 340 may additionally comprise components that are equivalent or analogous to data store interface 145, DMAs 146, and processing system 148, though these are omitted from FIGS. 3B and 3C for clarity. In another embodiment using a different mapping, compute array 342 itself may incorporate some or all of the components illustrated and described with reference to compute node 140, in which case data store 343 and node memory 344 may be employed to support the functionality of compute array 342.

In the examples described above, system 100 may facilitate scalability, in terms of both memory or storage density as well as compute power, that is greater than conventional systems. Additionally, the foregoing modular approach may accommodate design longevity and flexibility with respect to module design and implementation (or "bring up"). In particular, data store 143/343 may be closely coupled to compute resources (such as compute array 142/342), while remaining physically separated, such as by deployment on opposing sides of an interface card 200 or PCB, which facilitates cooling and minimizes thermal effects that are typically associated with implementing mass storage in proximity to high power processing resources or system on chip (SoC) hardware.

Figure 4:
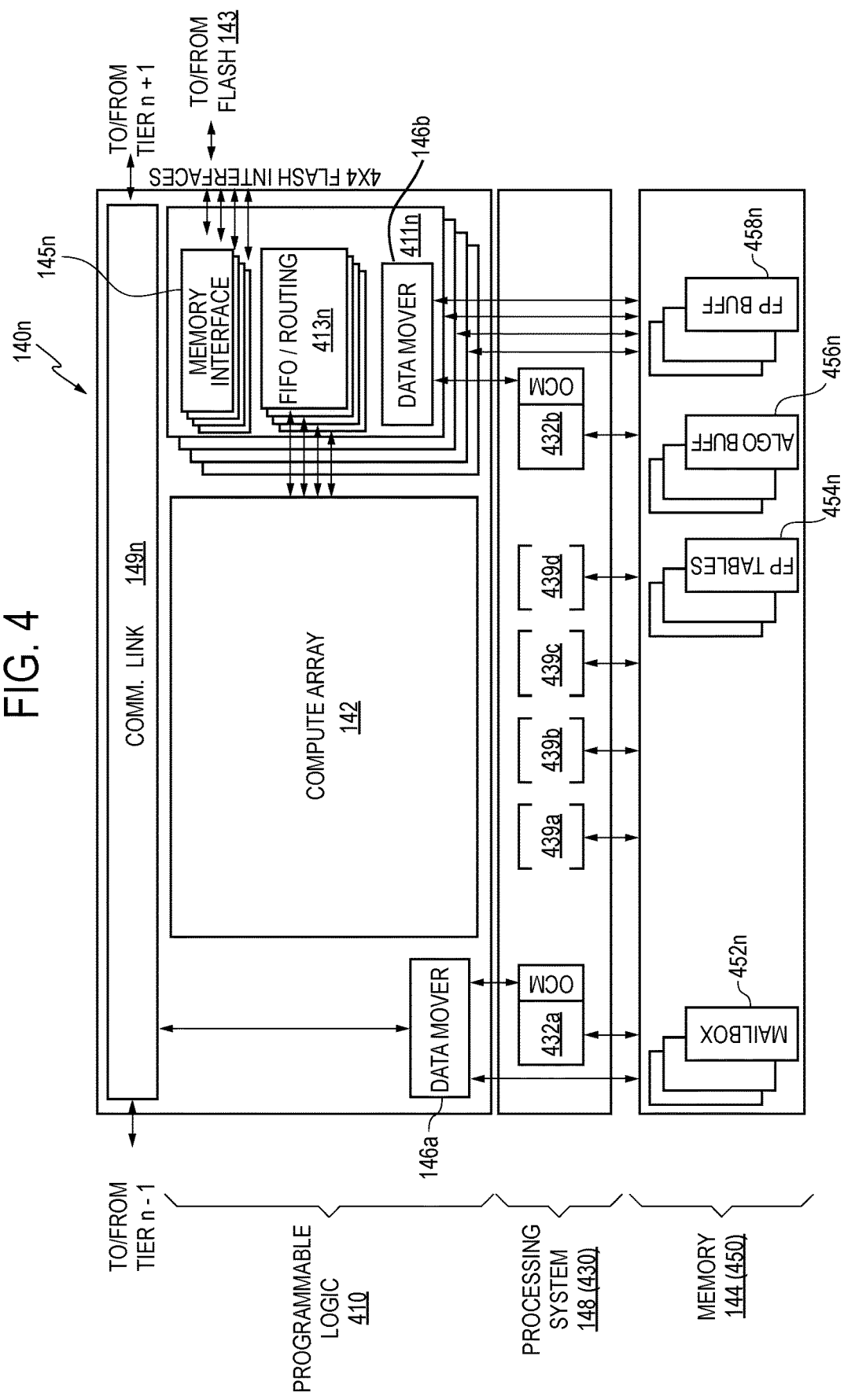
FIG. 4 is a functional block diagram illustrating components of an implementation of a compute node having utility in connection with a data processing and analytics system such as that depicted in FIG. 1.

FIG. 4 is a functional block diagram illustrating components of an implementation of a compute node having utility in connection with a data processing and analytics system such as that depicted in FIG. 1. The FIG. 4 example represents one implementation of a compute node 140n such as illustrated in FIG. 1, and generally comprises communications link 149n, a programmable logic block 410, a processing system 430, and node memory 450.

In the FIG. 4 example, compute node 140n (in tier "n" of a particular stack of compute nodes 140) may be communicatively coupled, via communications link 149n to one or more additional compute nodes 140 connected in series at different successive tiers, i.e., to compute node 140n−1 and compute node 140n+1. As described above, communications link 149n may be based upon or operative in accordance with standard serial interfaces or protocols, or may employ proprietary serial link technologies, for example, as a function of or influenced by the functionality and operational characteristics of compute array 142.

In the FIG. 4 implementation, programmable logic block 410 is illustrated as generally comprising, in addition to compute array 142 and DMA 146a, a storage interface component 411n.

As noted above, compute array 142 may employ or comprise any of various commercial embodiments of an FPGA, and many alternatives may be equally suitable or adequate, depending upon design considerations such as power consumption, thermal factors, throughput and processing capabilities, overall requirements of system 100, price constraints, or a combination of these and other boundaries conditions that are typical in electronics design. DMA 146a may be employed to handle data traffic between processing system 430 or node memory 450, on the one hand, and communications link 149n, on the other hand, as illustrated in FIG. 4. In particular, DMA 146a may be embodied in or comprise a data transfer apparatus, device controller, or other hardware or firmware module that is configured and operative to facilitate bi-directional data communications between electronic devices, either independently or in cooperation with control signals or other instructions received from processing system 430 or specific components thereof.

Any of various commercially available hardware- or firmware-supported datamover implementations may be suitable for DMA 146a, provided that a particular implementation enables data transfer operations and throughput bandwidths sufficient to support required or desired functionality of compute node 140n, in particular, and system 100, in general.

Storage interface component 411n may be one of a number, "n," of such components employed in connection with a particular programmable logic block 410, as represented by the stack on the right side of FIG. 4. While a number of similar or identical such storage interface components may be integrated with or implemented in cooperation with programmable logic block 410, only one storage interface component 411n is described; it is noted that every such storage interface component in the illustrated stack need not be identical, and that various alternatives to the specific storage interface component 411n may be suitable for a particular implementation of programmable logic 410. The functionality and specific architecture of storage interface component 411n may vary as a function of data store 143 requirements, the operational characteristics and processing capabilities of compute array 142, or a combination of these and other factors. As noted above, a particular data store 143 having utility in connection with system 100 may be embodied in or comprise a mass data storage component, such as an EEPROM store. In the FIG. 4 embodiment, data store 143 may be a Flash memory, and accordingly, data store interface 145n may employ an ONFI protocol. In operation, data store interface 145n may manage access (e.g., read and write access) to data store 143, as is generally known in the art. Other types of controller technology may be substituted as a function of the particular technology employed at data store 143, for example.

Storage interface component 411n may also comprise DMA 146b. As with DMA 146a, those of skill in the art will appreciate that any of various commercially available hardware- or firmware-supported datamover implementations (such as a data transfer apparatus, device controller, or other hardware or firmware module) may be suitable for use at or in conjunction with DMA 146b. In operation, DMA 146b may facilitate bi-directional data communications between compute array 142 or processing system 430 (and node memory 450), on the one hand, and storage interface component 411n, on the other hand. DMA 146b may function independently or autonomously, for example, or in cooperation with control signals or other instructions received from processing system 430 or specific components thereof, to effectuate data transfer operations sufficient to support operation of compute array 142 with respect to read/write or other access to data store 143.

Storage interface component 411n may also comprise a routing block 413n. Routing block 413n may be implemented as a first in/first out (FIFO) buffer or similar memory structure temporarily to store one or both of data transferred (via data store interface 145n) between compute array 142 and data store 143, and data transferred (via DMA 146b)

between compute array 142 and node memory 450. Various commercial implementations of a FIFO buffer structure are available (or may be developed and operative in accordance with known principles) to provide the functionality of routing block 413n. In some implementations, routing block 413n may comprise hardware logic, or may be operative in accordance with software instruction sets, sufficient to allow routing block 413n to access or to target specific memory locations in data store 143, either independently or in cooperation with compute array 142, processing system 430, data store interface 145n, or a combination of these and other components. The disclosed subject matter is not intended to be limited by the nature, structural configuration, or operational characteristics of routing block 413n, as many alternatives may be employed as a function of design considerations and operational requirements of system 100, in general, and compute node 140n, in particular.

Processing system 430 may generally comprise a first set of one or more processors 432a and 432b and a second set of one or more processors 439a, 439b, 439c, through 439n. Bus structures, power sources, controllers, internal memory, and other attendant and supporting hardware and communications paths have been omitted from FIG. 4 for clarity. It is noted that all of the processor blocks (432a, 432b, 439a, 439b, 439c, and 439n) depicted in FIG. 4 may be implemented as or generally comprise a microprocessor, a multicore microprocessor, a microcontroller, an FPGA, a programmable logic controller (PLC), a programmable logic unit (PLU), or some similar or analogous hardware component suitable for data processing as is generally known in the art. In one implementation, for example, one or both of processors 432a and 432b may be embodied in or comprise a Cortex™ A5™ microprocessor core marketed by ARM Holdings PLC, and some or all of processors 439a, 439b, 439c, through 439n may be embodied in or comprise a Cortex A53™ microprocessor core marketed by ARM. Other configurations (e.g., the number of processors employed) and specific types of processing devices are contemplated, and may readily be implemented, as a function of, or influenced by, design goals, processing overhead, application-specific requirements for compute node 140n, and a variety of other factors. It is also noted that the example of processing system 430 illustrated in FIG. 4 represents only one implementation of processing system 148 depicted in FIG. 1, and that the FIG. 4 embodiment may comprise more or fewer processing resources than those shown.

In operation, processors 432a and 432b may manage or otherwise influence operation of DMAs 146a and 146b, respectively. Also as depicted in FIG. 4, each of processors 432a and 432b may employ on chip memory (OCM) to facilitate interoperation with DMAs 146. In that regard, DMAs 146a and 146b may be configured and operative to transfer data between and amongst components of compute node 140n as illustrated in FIG. 4 under control of or responsive to instructions from processors 432a and 432b; some or all of such instructions may be resident in or accessible by OCM components or hardware. Additionally or alternatively, OCM may also host or maintain status updates and attendant data acquired from or associated with operation of mailbox 452n described below. In some instances, OCM may have a lower latency than external memory, such as a DDR RAM component, and by employing OCM to manage mailbox 452n updates, memory 450 bandwidth may be reserved for payload traffic, rather than administrative traffic.

In some implementations, operation of processors 432a and 432b may be influenced by interrupts received, for example, from DMAs 146a and 146b. For example, one or both of DMAs 146a and 146b may be operative to issue an interrupt following expiration of a predetermined or dynamically selected duration (i.e., a "timeout"), or upon the occurrence of a predetermined or pre-established event (such as completion of a certain threshold number of transactions). In this example, one or both of processors 432a and 432b may be operative to initiate exchange of mailbox 452n status information, or to execute some other administrative or substantive function, upon receipt of such an interrupt. Additionally or alternatively, processors 432a and 432b may be configured and operative to schedule or otherwise to influence operation of processors 439a, 439b, 439c, through 439n, e.g., via interprocessor interrupts or other communications protocols or instructions.

Specifically, processors 439a, 439b, 439c, through 439n may be responsible for a variety of tasks which, under some circumstances, may be requested or required by processors 432a and 432b, or which may be initiated autonomously or otherwise without direction from external components such as processors 432a and 432b. In various implementations, processors 439a, 439b, 439c, through 439n may perform some or all of the following functions, or a subset thereof, as requirements of system 100, in general, or node 140n, dictate: data transformation and storage (e.g., with respect to node memory 450, memory store 143, or both); data dispatch for write/read operations (again, with respect to node memory 450, memory store 143, or both); command interpretation and execution (e.g., with respect to data processing and algorithm compilation and execution); algorithm load and compute; and memory exception handling. Those of skill in the art will appreciate that various other functions may be assigned to or attributable to processing system 430 as a function of desired operability of compute node 140, and that any of numerous hardware arrangements, computing architectures, and distributed processing resources may be employed at processing system 430 to enable its functionality in the context of supporting desired capabilities of compute node 140.

Processing system 430 may cooperate with programmable logic block 410 for data transfer and read/write operations with respect to data store 143. In particular, flexible FIFO or other buffer structures and multiplexers may be employed to provide multiple data paths to and from each memory (such as Flash) channel. Some examples of specific data paths and supporting hardware are described below with reference to FIGS. 5 through 7.

In the FIG. 4 example, node memory 450 is one representation of the node memory 144 illustrated and described above with reference to FIG. 1. In that regard, node memory 450 may be implemented as or comprise DDR4 RAM, or other volatile or non-volatile memory suitable to support operations of compute node 140n and processing system 430. In some implementations, node memory 450 may generally comprise one or more mailboxes (i.e., resource-specific data storage cells or memory locations) 452n, as well as one or more functional programming (FP) tables 454n, algorithm buffers 456n, and FP buffers 458n. These components may generally be operative to store data and instructions necessary or desirable for processing system 430 to perform write/read/execute operations in support of programmable logic block 410 as is generally known. An example is provided below.

In order to minimize the need for processor 432a intervention during write transactions from host compute system 199 to compute node 140n, a largely autonomous mailbox 452n and DMA 146a strategy may handle the entire transfer (or a portion thereof) of incoming data packets to DDR4 (or similar or analogous) buffers at compute node 140n, in general, and at node memory 450, in particular. In some implementations, it may be desirable that the inbound buffers are "content agnostic" and are treated generically. In that regard, a plurality (such as one hundred twenty eight, for instance) of mailboxes 452n may be initialized for this purpose, and their status may be set to "empty" at boot time.

In programmable logic block 410, inbound DMA 146a may also be initialized and its internal control logic may be set to "full availability." In this instance, when data packets arrive, the first available mailbox 452n address may be retrieved (e.g., from a local list maintained in node memory 450), and the incoming packed may be posted to that particular mailbox 452n. The local list may then be updated to reflect that a particular mailbox 452n is occupied, and that a next mailbox 452n in series, or otherwise selected or determined in accordance with processing system logic, should be used for a next inbound data packet or series of data packets. At that point, two processes may be initiated, as noted briefly above. First, a transaction counter or other meter may be incremented (or decremented, as a matter of design choice); once a message count threshold is reached, attaining the threshold may trigger an update of the occupied mailbox list by processing system 430. Second, a timer may be set; once a predetermined period of time has elapsed (i.e., a timeout event), expiration of the time period may trigger an update, just as if the message count had been reached. This second process may ensure that single or last messages will be captured, even in the event that a message or transaction counter does not reach a predetermined or minimum threshold to trigger an update in accordance with the first process. In some implementations, during such an update, programmable logic block 410 may also receive an updated list (e.g., a message or instruction representative of emptied mailboxes 452n since a last transaction, or some other relevant data) as prepared by processing system 430.

With the foregoing overview of system 100 and compute node 140n architecture in mind, the following addresses one example of algorithm load and execute initiation and functionality, by way of example only, and not by way of limitation. In one implementation, initialization of each compute node 140n may begin by booting from a local golden bit stream; this initialization may generally provide a common (i.e., across all compute nodes 140) infrastructure in each respective programmable logic block 410. For example, initialization may define data paths (such as those described below with reference to FIGS. 5 through 7), protocols for communications link 149n, identification and initialization of various I/O controllers, and the like— generally establishing and defining the operating environment for each compute node 140n ("compute node environment"). In one embodiment, the initial bit stream may include an algorithm block or other information concerning particular algorithm execution, though this may occur after the initial bit stream, if necessary or desired. In some circumstances, initialization may also provide boot code or other initial parameters for the various processors in processing system 430.

Upon initialization of compute node 140n, new or updated algorithm bit streams may then be transmitted, e.g., by host compute system 199, via router module 120 and communications link 149n. In some implementations, algorithm bit streams may contain both algorithm logic and the same compute node environment used in the local golden bit stream employed during initialization. When an algorithm bit stream is received from (e.g., from host compute system 199), some or all of the following processes may ensue: the algorithm bit stream may be provided to all compute nodes 140 simultaneously, or substantially simultaneously or concomitantly; each respective compute node 140n may complete any outstanding data transactions; normal compute node 140n operation may be briefly paused while the new bit stream is loaded into all compute arrays 142; normal compute node 140n operations may be resumed and all compute nodes 140 may begin executing the algorithm (and continue to do so until it completes or times out); and upon completion, computational results may be returned along with status, and the algorithm bit stream may be left in place for potential re-use at a later time.

Figure 5:
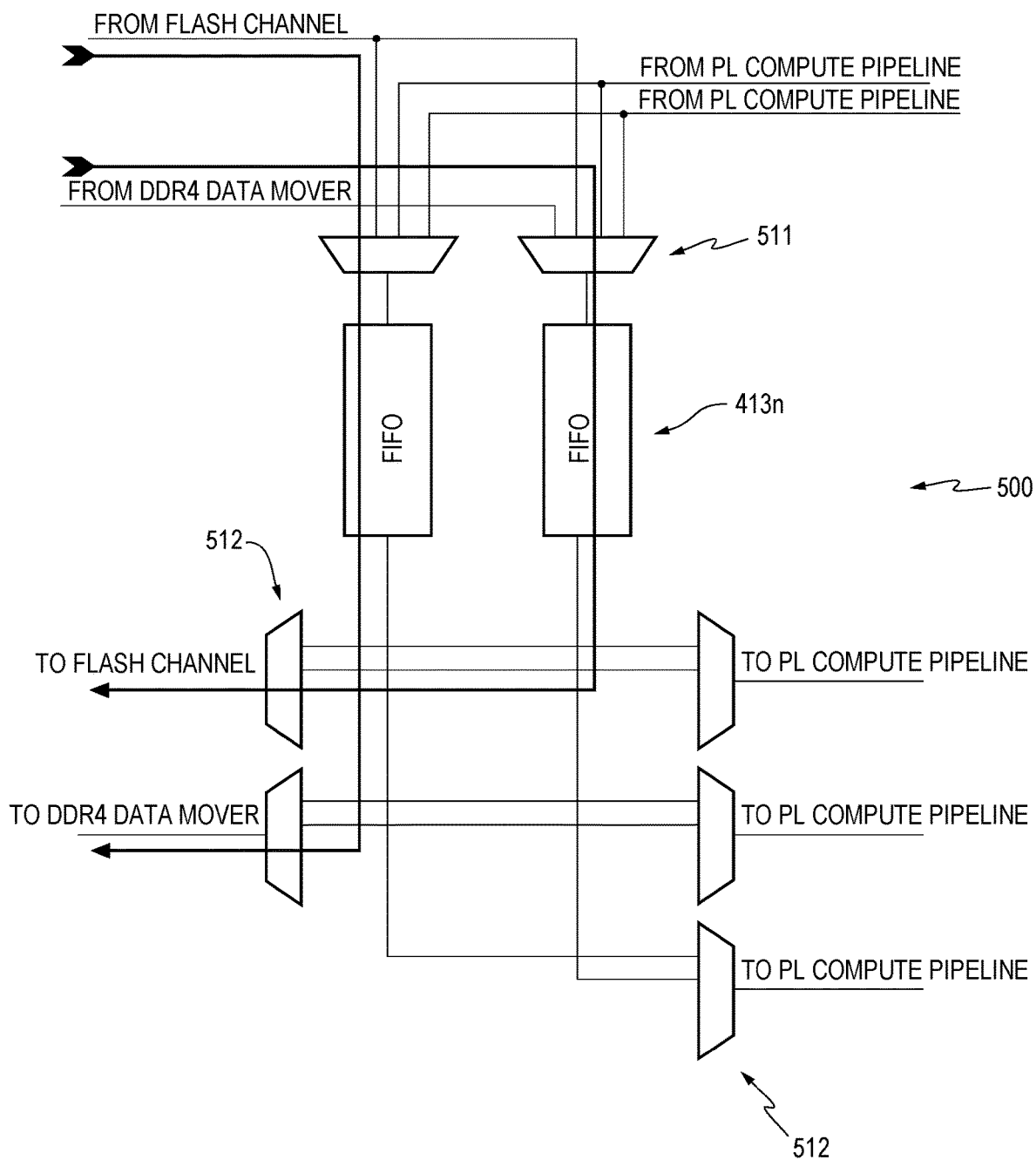
FIG. 5 is a diagram illustrating one example of a data routing strategy to route data through portions of the compute node depicted in FIG. 4.
Figure 6:
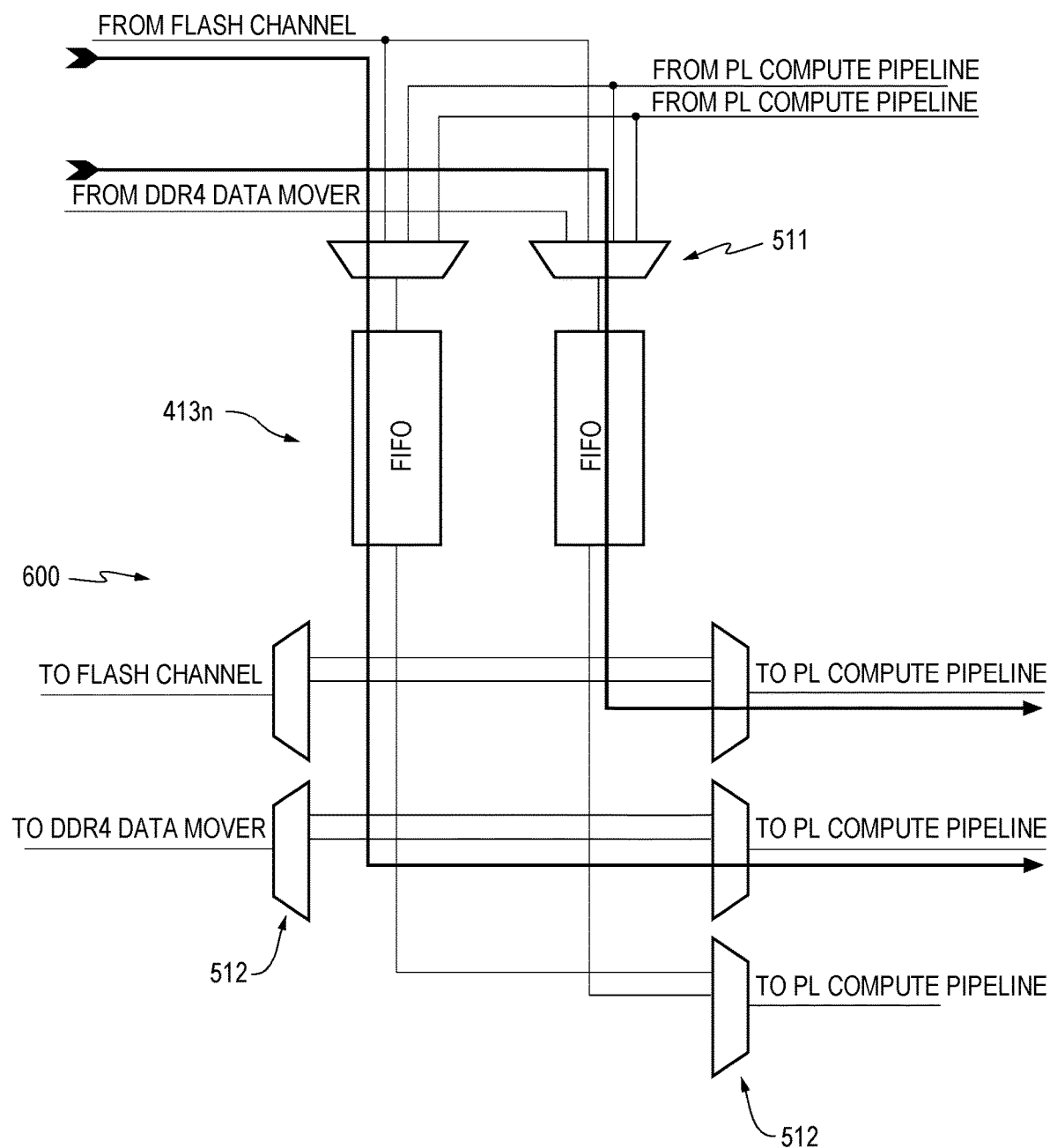
FIG. 6 is a diagram illustrating another example of a data routing strategy to route data through portions of the compute node depicted in FIG. 4.
Figure 7:
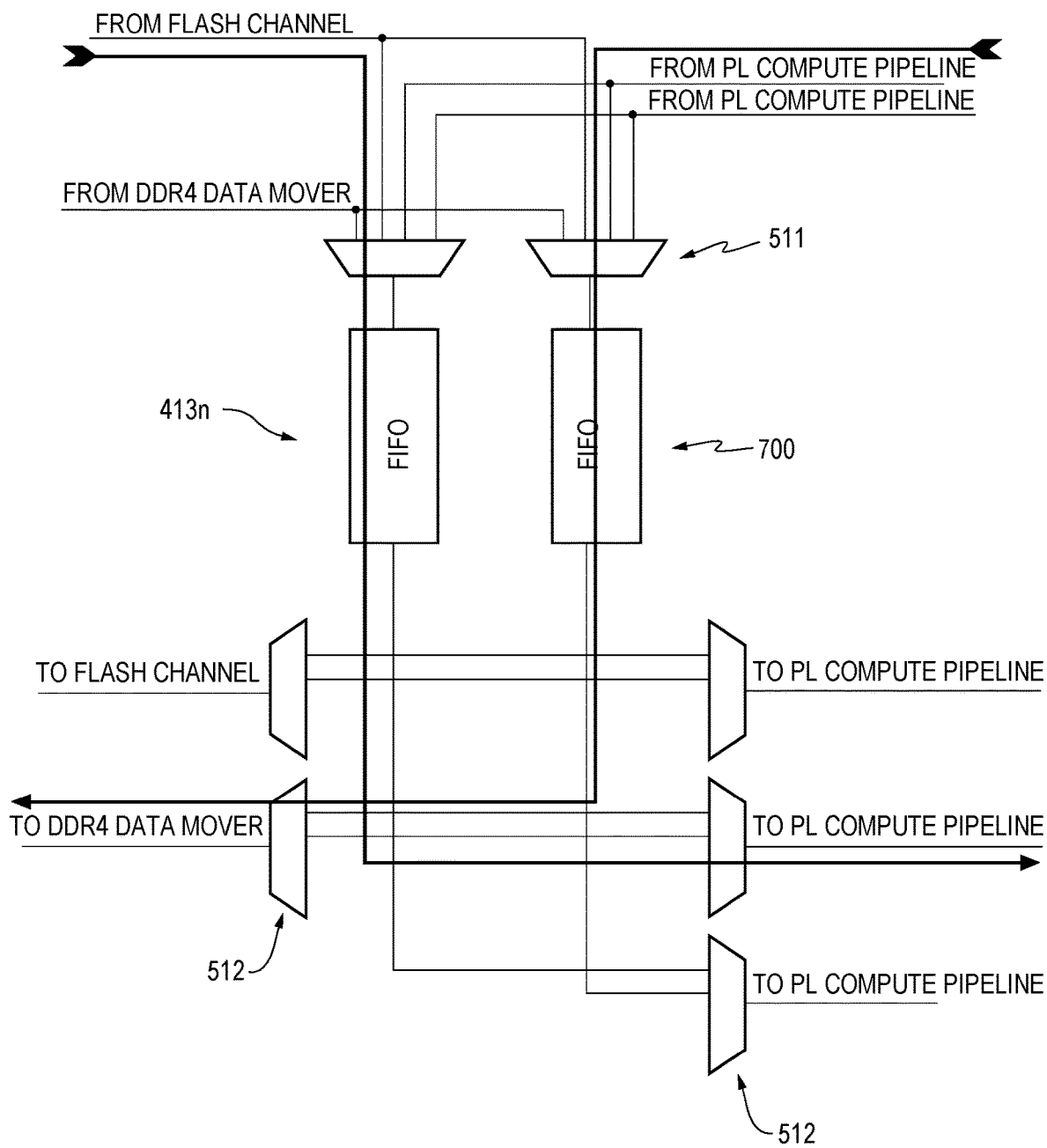
FIG. 7 is a diagram illustrating another example of a data routing strategy to route data through portions of the compute node depicted in FIG. 4.

Regarding some of the data paths supporting the foregoing functionality, it is noted that FIGS. 5 through 7 are diagrams illustrating examples of data routing strategies to route data through portions of the compute node depicted in FIG. 4. In the illustrated example, each storage interface component 411n may generally comprise a group of FIFO buffers or similar structures (such as represented by routing block 413n) connected with a versatile routing fabric. During operation, the routing fabric allows for run time configuration of data flow paths through routing block 413n and (1) to/from node memory 450 or OCM buffers associated with components of processing system 430, (2) to/from data store interface 145n, (3) to/from programmable logic block 410 compute pipelines, (4) to/from programmable logic block 410 path to communications link 149n.

In some embodiments, all such data paths may be implemented with 16-bit width and follow the AXI stream protocol. In that regard, an AXI stream is generally an addressless transport mechanism that requires a minimal amount of control signals (e.g., only READY, VALID and LAST). Using this example approach, data flow may begin as soon as an intended target of a data transaction indicates "READY" and a source of the data transaction indicates "VALID." Conversely, data flow may be suspended when one of the foregoing two conditions is no longer true. The "LAST" indicator may be used by logic in the target to detect packet or data stream boundaries, for example.

In some implementations of interface routing fabric employed at routing block 413n, one or more 4:1 multiplexers may have particular utility. For instance, a 4:1 multiplexer may cooperate well with a 6:1 (four data signals, two control signals) logical unit (LUN) data structure (described below), and therefore may maximize use of the basic elements found in some viable options for FPGA structures of compute array 142. Other types of multiplexers may be employed, for instance, to match a fabric used in a commercial implementation of compute array 142, to combine certain functionality set forth below into fewer components, or as a result of a variety of other considerations. A 4:1 multiplexer also provides a reasonable multiplexing strategy, to the extent that it can devote one input section to each of the four sources noted above, which may generally cover all use cases in most practical applications and hardware configurations.

In addition to the 4:1 input section, each multiplexer output may be configured and operative to drive multiple targets simultaneously as each path may be implemented as 4:1 source select. So, in such an example, one implementation of a routing paradigm may focus on the source of the data, rather than the component to which the data are to be transmitted. This paradigm allows each source to provide data to multiple targets simultaneously (or substantially simultaneously), and it makes an illegal or conflicting configuration (e.g., two or more sources trying to drive one target simultaneously) impossible.

In some implementations, some AXI stream flow control signals may be treated with some extra logic applicable to the architecture and methodologies described herein. For instance, some logic rules for AXI stream flow control may be expanded as follows: READY signals of data sinks that are connected to a common source may be ANDed (i.e., combined); READY signals for destinations that not selected (i.e., inactive) may be set to "1" by default; and VALID status may only be presented by a data source when it sees the ANDed READY from all possible destinations (data sinks) to prevent a single sink from initiating the dataflow. This mechanism is very flexible and resource efficient. It may generally enable a versatile interconnect with respect to the compute pipeline, in accordance with which one source value may need to feed multiple compute engines in parallel (e.g., count a value "x," square "x," and multiply "x" by a different value "y"). By instantiating multiple concurrent "listening ports" (i.e., compute elements) to monitor one data source, it is possible to implement an arbitrary number of concurrent calculations in parallel, subject to the architectural and processing limitations of the hardware embodying or employed at compute array 142, for example.

FIGS. 5 through 7 show such an arrangement with two parallel FIFOs or other buffer structures, each of which is fed by an input multiplexer 511 coupled to all source interconnects, and selectively outputs to any of three paths to programmable logic block 410 for compute. The actual count of paths to programmable logic block 410 compute resources may depend, for example, upon the loaded algorithm, the corresponding compute pipeline, and a variety of other factors.

In particular, each of FIGS. 5 through 7 show four inputs to input multiplexers 511: from data store 143 (e.g., "Flash Channel" via data store interface 145*n*); from node memory 450 (e.g., via DMA 146*a*); a first input from the compute pipeline (i.e., programmable logic block 410 compute array 142); and a second input from the compute pipeline (i.e., programmable logic block 410 path to communications link 149*n*). These inputs are concatenated at input multiplexers 511; output from the respective FIFOs may be concatenated at output multiplexers 512.

FIG. 5 illustrates one data path from data store 143 (e.g., "Flash Channel" via data store interface 145*n*) to node memory 450 (e.g., via DMA 146*a*), and a separate data path from node memory 450 (e.g., via DMA 146*a*) to data store 143 (e.g., "Flash Channel" via data store interface 145*n*). FIG. 6 illustrates one data path from data store 143 (e.g., "Flash Channel" via data store interface 145*n*) to one of the compute pipelines, and a separate data path from node memory 450 (e.g., via DMA 146*a*) to a different one of the compute pipelines. FIG. 7 illustrates one data path from data store 143 (e.g., "Flash Channel" via data store interface 145*n*) to one of the compute pipelines, and a separate data path from one of the compute pipelines to node memory 450 (e.g., via DMA 146*a*). Those of skill in the art will appreciate that various modifications and alterations to the implementations shown in FIGS. 5 through 7 are possible, and that numerous data paths between the various components may be defined as necessary or useful for operation of a particular compute node 140*n*.

Figure 8:
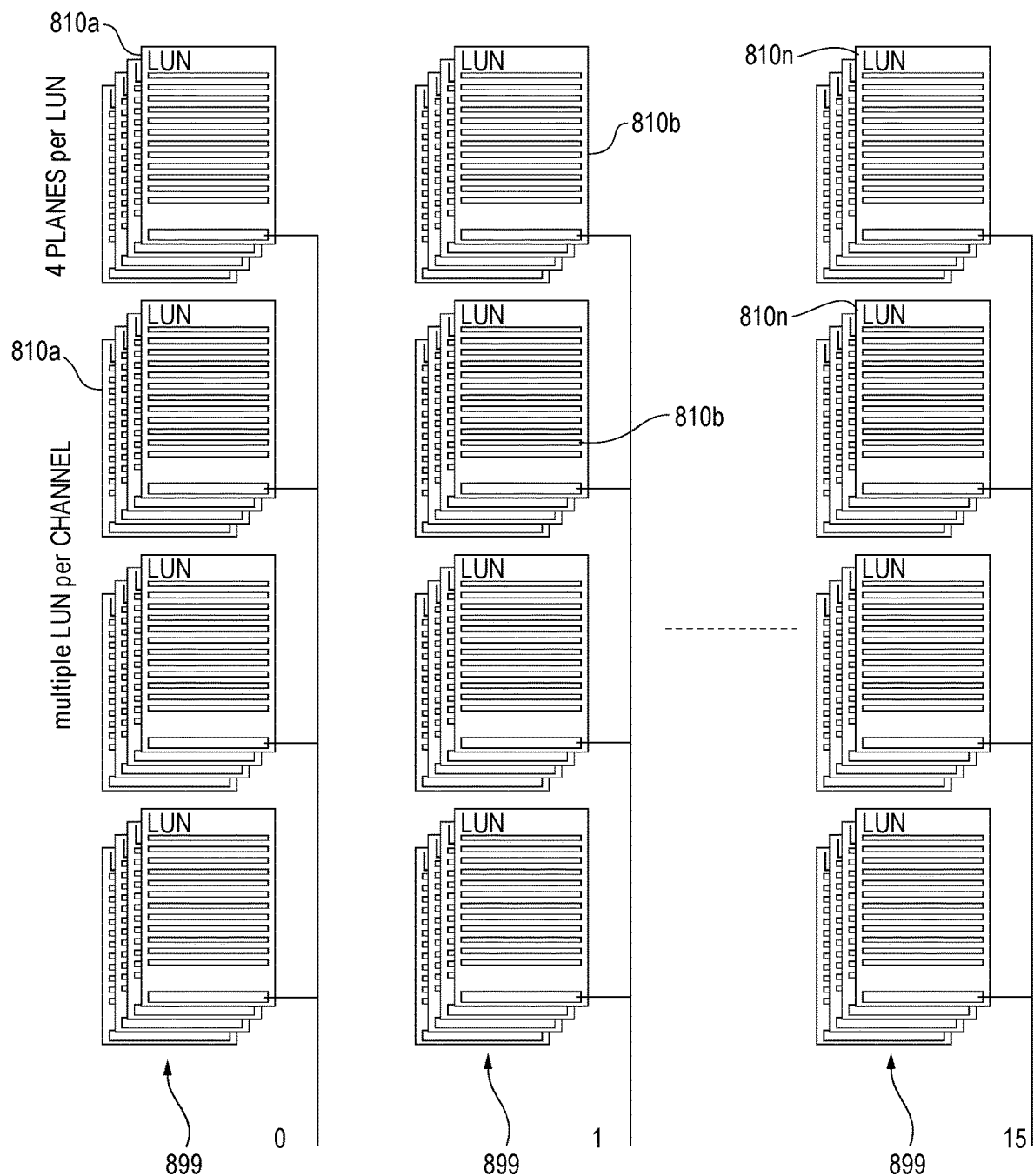
FIG. 8 is a diagram illustrating one implementation of a memory architecture having utility in connection with a compute node such as that depicted in FIG. 4.
Figure 9:
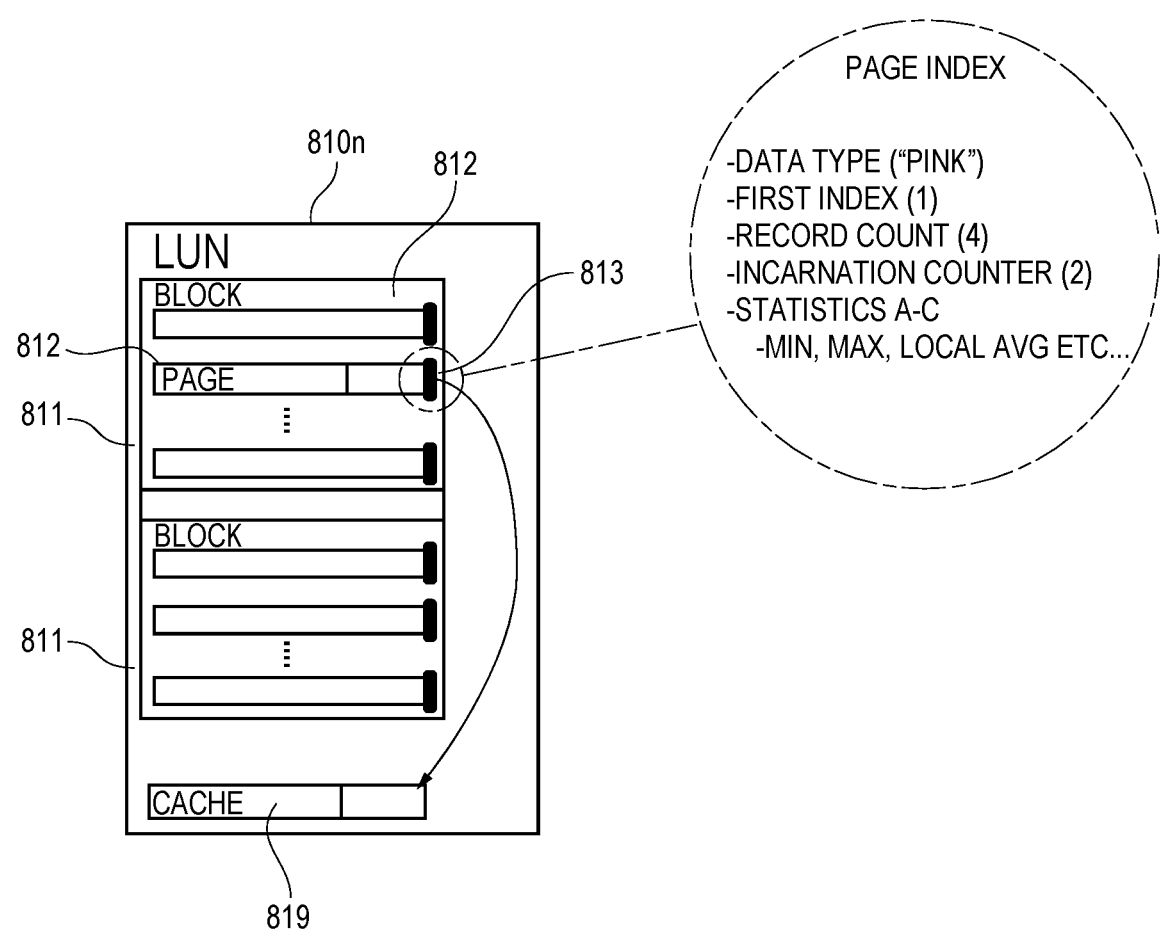
FIG. 9 is a diagram illustrating one implementation of a portion of the memory architecture depicted in FIG. 8.

FIG. 8 is a diagram illustrating one implementation of a memory architecture having utility in connection with a compute node such as that depicted in FIG. 4, and FIG. 9 is a diagram illustrating one implementation of a portion of the memory architecture depicted in FIG. 8.

In some implementations, each compute node 140*n* may employ sixteen physical channels (or buses) for access to data store 143. In FIG. 8, these physical channels (reference numeral 899) are depicted in vertical columns labeled, from left to right, 0, 1, . . . , 15. On each respective channel 899, one arrangement may employ one or two memory chips, each of which may comprise one or more logical units (LUNs) (reference numeral 810). In FIG. 8, LUNs associated with channel 0 are labeled 810*a*, LUNs associated with channel 1 are labeled 810*b*, and LUNs associated with channel 15 are labeled 810*n*. It is noted that more or fewer channels 899 may be employed, and more or fewer LUNs 810 per channel may be implemented, depending upon overall arrangement and processing functionality of a particular compute node 140*n*, the type of memory employed at data store 143, and a variety of other factors.

In the context of the disclosed architecture and data path approaches set forth herein, it will be appreciated that a LUN 810 may execute more than one memory access (such as a Flash access) operation concurrently, even on the same Flash (or other memory) chip. In addition to LUNs 810, each chip in the FIG. 8 arrangement may generally feature multiple planes (as indicated by the stacks of LUNs 810—each LUN 810 in a particular stack resides at a different respective plane in the architecture). By utilizing multiple (in this case, four) planes concurrently, the available access to a given memory page, in effect, quadruples in size, thereby improving the ratio of data transfer to command bandwidth.

In the discussion that follows, LUNs 810, in particular, and data store 143, in general, are referred to in terms of Flash memory for convenience; as noted above, however, the disclosed subject matter is not intended to be limited to the particular type of memory used for data store 143, except to the extent that changing a memory type or employing a different memory technology at data store 143 may influence selection and implementation of suitable or appropriate interface mechanisms, such as at data store interface 145. In any event, references to Flash memory are by way of example only, and not by way of limitation.

In some instances, data in each LUN 810*n* may be stored in the form of Flash pages, one example of which may generally comprise 16 Kb of data payload, plus some overhead associated with error correction code (ECC) and header information. Pages may be organized into blocks, for instance, or sets of 1024 pages. This is illustrated best in FIG. 9, which depicts a LUN 810*n* comprising two blocks 811 of data; more than two blocks 811 per LUN 810 are contemplated. Similarly, while each block 811 is depicted as comprising only three discrete pages 812, it may be desirable that a block 811 comprise 1024 pages, 2048 pages, or more. Each page 812, in turn, may generally comprise an index 813, which may record metadata, information, or metrics or statistics associated with the data payload of the page 812. For instance, index 813 may include ECC information and a data type indicator, a first index, a record count, an incarnation counter, various statistics (such as a minimum data value, a maximum data value, a local average value, etc.) and other information, or a combination of these and other types of information, with respect to data in a particular page 812. Additionally, LUN 810*n* may include a cache 819, which may serve as temporary storage for a page 812, or a portion thereof, for various purposes such as read operations.

For example, in order to read a given page 812, a read command is issued (for example, by compute array 142 or processing system 430, either individually or in cooperation). Such a read command may generally cause LUN 810n to copy page 812 to (on-chip) cache 819, from where it may be read rapidly across data store interface 145 and communicated to compute array 142.

As is generally known in the art, a Flash page 812 may only be written in its entirety in the context of any particular write operation; specifically, a particular Flash page 812 must be erased, in its entirety, before any new contents or data may be written to that particular page 812. This is true even if only relatively few data values (as compared to the overall contents of the particular page 812) are sought to be changed; in every case, manipulating data in a page 812 typically requires that the entire page 812 be erased and subsequently re-written with modified contents. To make matters worse, particularly in the context of Flash memory, not only must a page 812 be erased before any new value may be re-written (or altered) in that page 812, but the entire block 811 containing the affected page 812 must also be re-written.

In one implementation of LUN 810n and a method of interacting with Flash memory, erase granularity may be set as one block 811 (e.g., a set of 1024 pages) as noted above; in accordance with a novel approach to an old problem, one method of updating a page 812 is to read its contents, selectively to modify whatever data are to be changed, and subsequently to write a new copy of that page 812 to a new location in memory—typically in the same block 811, or at least in the same LUN 810n, but this may not always be practical or even desired—and with an updated identifier to facilitate identification of the new copy as the definitive, updated version. As it is not economical to erase an entire block 811 (and to move all the unaltered pages 812 that may reside in the same block 811 to a new location) each time a page 812 is updated or erased, the old page 812 may remain unaltered and in its original location within the block 811.

To manage the resulting multiple copies of a page 812, each specific page 812 may be provided with an incarnation counter (or similar indicium or identifier) in its metadata; as noted above, it may be useful that this incarnation counter is updated each time a page 812 is copied during an update or modification process. In some implementations, such an incarnation number count or other identifier may be read during boot and used to populate a page pointer index (not shown) or look up table that resides in, or is accessible by, node memory 450 or processing system 430, for example. In one approach, only the copy of a particular page 812 having the highest value in the incarnation counter may be identified in the pointer index or look up table, as it is this copy that represents the active and valid copy of that page 812—all other copies contain data that have not been updated to reflect new values. In some embodiments, the page pointer index or look up table may also be updated when a page 812 is copied and its incarnation counter is incremented. The incarnation counter may be selected to have a range that is large enough (e.g., 24 bit, double check) so that wrap-around conditions (i.e., a reset from the highest value in the range back down to the lowest) occur infrequently.

Upon wrap around of a page incarnation counter, two methods of exception handling may be applied. In a brute force approach, all remaining stale copies of the page 812 may be eliminated; it will be appreciated that this approach may trigger a great number of page moves, even in the case where neighboring page data are still valid. In an alternative approach, an algorithm that closely interacts with garbage collection and block recycling (described below) may be employed to track the correct highest count even after wrap around has occurred. Many such algorithms may be devised to keep track of a most recently modified version of a page 812 after a counter wraps around, and the present disclosure is not intended to be limited by any particular approach or methodology.

In some embodiments, blocks 811 may be recycled efficiently by tracking a valid page (VP) count identifier and a continuity factor (CF), where VP count may be an indication of a number of valid pages 812 written to a block 811, and CF may be an indication of a number, or percentage, of pages 812 within a block 811 that no longer contain up to date data. In accordance with this paradigm, a block 811 having a low VP and a low CF is at the beginning of its life span—not all pages 812 have been written yet, and relatively few pages 812 are out of date—and hence this particular block 811 may be assigned a low priority for recycling operations. A block 811 with a high VP but a low CF may be nearly full or totally full—most, if not all, pages 812 have been written—but the block 811 as a whole contains relatively few pages 812 that have been subsequently invalidated by more updated versions; such a block 811 may be assigned a medium or middling priority for recycling. A block 811 with a high CF, on the other hand, may be considered a candidate for recycling having a relatively higher priority, since many, if not most, of its pages 812 no longer contain valid data.

In accordance with one strategy, as long as there are sufficient blocks 811 available in a given LUN 810n to accommodate short term copying of pages 812 without rewriting or excessive wrap around activity, no old block 811 should be forcefully recycled as long as it has space to allocate to more than one unwritten page 812; this strategy may minimize, or at least reduce, unnecessary page writes. When free resources in a given block 811 become sparse, the block(s) 811 with the highest CF and the lowest VP may be freed by moving the remaining valid pages 812 to other blocks 811 having free space, and then erasing the block 811 from which all remaining valid pages 812 have been moved.

In most conventional Flash applications, retrieving (reading) a page 812 has a latency of about 100 µs, as the page 812 is first copied to an on-chip cache 819 as set forth above; this typically occurs before the page 812 is ready to be transferred across a bus (e.g., via data store interface 145n) to compute array 142. The data transfer of one page 812 from that on-chip cache 819 to the compute array 142, in contrast, requires less than a third of that overall time—i.e., around 32 µs.

In order to mask the foregoing latency, each physical channel 899 in FIG. 8 may accommodate multiple LUNs 810, each of which may be retrieving pages 812 to cache 819 concurrently. Once an array of LUNs 810 (or targets) is loaded with read commands, further read commands may be interleaved while data from pending reads are retrieved from cache 819. With sufficient targets (for example, four or more) on a channel 899, the available bandwidth for a given channel 899 may be fully saturated with data moves (streaming). As the LUN 810 count increases, it becomes possible to read partial pages 812 (for example, a ½ A page or a ½ page) without any substantial loss in channel utilization (interleaving the additional read commands has minor impact on overall throughput). Reading partial pages 812 efficiently becomes a valuable feature in more advanced data mapping methods (see the discussion of data structures with reference to FIGS. 10 through 14 below).

Specifically, executing commands against a LUN 810 on a Flash chip will always result in latencies and minimum (but not deterministic) wait times before a previously issued command is executed and the LUN 810 is available for further exchanges. As noted above, the biggest latencies are related to commands that retrieve a page 812 (around 100 μs) and write a page 812. During those wait times, many features of a LUN 810 are generally unavailable. The status of a LUN 810 may be polled by issuing a status request command (for instance, from storage interface component 411*n* or elements thereof such as routing block 413*n*).

As also noted above, in accordance with the disclosed architecture, payload data and command sequences share the same bus or physical channel 899. Accordingly, to maximize throughput on a given channel 899, LUN 810 access may be interleaved across many targets (i.e., pages 812), and an estimate of availability of each LUN 810 may be determined and maintained in order to minimize interrogation overhead. This functionality, and that set forth below, may be provided by storage interface component 411*n*, in general, and routing block 413*n* and data store interface 145*n* (either individually or in combination), in particular.

In that regard, storage interface component 411*n* or its components may take all of these requirements into consideration, and may be configured and operative to provide enough processing functionality to reduce or to eliminate the requirement for central processing unit (CPU) intervention (either by compute array 142, processing system 430, or both) by providing hardware resources necessary or sufficient to effectuate some of all of the following (e.g., in routing block 413*n*): provide or control a dedicated command buffer per LUN 810 of a given physical channel 899; provide or control a dedicated command execution timer per LUN 810 (this timer may be set with a minimum latency of the Flash chip after issuing a command, such that status polling only begins after the minimum delay time has elapsed, and therefore keeps the channel 899 less congested with status requests); provide an autonomous status request command generator, so that status polling does not require CPU intervention; and provide a session identifier buffer for each command that is posted by processing system 430 into the various command FIFOs in routing block 413*n* (this may allow processing system 430 to "set and (almost) forget" issued commands, as storage interface component 411*n* may post completed (or failed) transaction updates in message mailboxes 452*n* along with a corresponding session identifier). In that regard, mailboxes 452*n* may have the utility set forth above with reference to FIG. 4.

It is also noted that routing block 413*n*, memory interface 145*n*, or a combination of these and (possibly or optionally) other components of storage interface component 411*n* may also provide hardware, firmware, or software resources necessary or sufficient to effectuate selective storage of data in a "co-located" manner. In this context, the terms "co-located" or "co-location" generally refer to the operational characteristic (or its practical effect) of maintaining data records that are related to each other in or at memory addresses such as are reflected by or implemented in blocks 811, pages 812, or both that are relatively proximate to each other (e.g., in physical space, logical space, or both) as compared to other blocks 811 or pages 812 in data store 143. Header information or metadata associated with particular data may be used to designate or otherwise to identify certain data as related to or relevant with respect to other data for this purpose. As set forth above, data may be supplied to system 100 with information (that may be recorded in index 813, for example) that may include a data type index or identifier, various statistics, and other information that may be used, among other things, to co-locate particular data with respect to other related data in a particular page 812; in the foregoing manner, related data may be stored in adjacent or contiguous pages 812 or blocks 811, facilitating retrieval of related data using reduced or minimal read operations.

One particular implementation that may benefit from co-located data may be configured and operative to organize large datasets acquired, by way of example, from a STARE (Surveillance Technology Advancement & Replacement for Ebsicons) data acquisition system. A typical STARE system employs a variety of sensors (e.g., nine or more independent sensors, typically deployed in a satellite or high-altitude surveillance aircraft) that acquire optical or other electromagnetic data across a large geographic area and at successive points in time, such as for satellite reconnaissance, weather observations, time-lapse photographic applications, and the like. While the following discussion addresses such a STARE system, the disclosed subject matter is equally applicable to other types of large datasets, as will generally be appreciated by those of skill in the art. For example, on a micro-scale, the types of data storage and analytics techniques employed in a typical STARE application may be equally applicable to computer tomography (CT) scans, computer aided detection (CAD) mammography analyses, and other medical technologies involving optical or image data, as well as to design verification and quality assurance methodologies (such as machine vision inspection techniques, for instance) in the semiconductor, micro-electrical-mechanical (MEM) machines, and other small scale electrical and mechanical industries.

In accordance with one implementation, a respective data stream from each of a plurality of data sources (for instance, each respective sensor in a STARE array or each respective channel in a medical imaging device) may be ingested as a dedicated dataset for a given point in time (e.g., a temporal STARE index). In this example, the respective output of each respective sensor or channel may be considered an independent data source, while the data from each respective independent data source may be considered (and identified, designated, or otherwise characterized as) "related" to all the other data acquired from others of the independent data sources. For instance, data acquired by a specific sensor operating in a specific spectral band on a given satellite may be considered a specific, independent data source; if that satellite employs multiple sensors, each operating in a respective (though, perhaps, overlapping) spectral band such that the satellite, as a whole, acquires and provides data across multiple spectral bands, each such independent data stream may be ingested by system 100 (and, in particular, by compute node 140*n*) as different, independent, but related datasets. As noted above, the relationship between such independent datasets may be encoded in metadata or header information, for example, such that related datasets may be co-located when stored or written to data store 143 or other memory component.

In the foregoing manner, and in the context of a STARE system, each independent dataset may represent a collection of data points from a specific sensor observing or dedicated to a specific geographic region at one point in time. In the case of an arthroscopic, mammographic, CT, or other procedure involving medical imagery or other data collection application, for instance, each independent dataset may represent a time-specific or temporally varying collection of data points from a specific type of sensor covering a specific anatomical region or that is dedicated to collecting a particular type of data. Applications include automotive diagnostics, time-dependent stresses in aerospace structures, inventory and logistics tracking, machine vision and machine learning implementations, and any other application in which large datasets and analytics techniques are relevant.

Returning to the STARE example, each record in a particular independent dataset may include fields to designate, for instance, a STARE index and sensor data sufficient to identify a particular data source (i.e., the sensor from which the data are acquired), a position of each sample in the data stream (e.g., a time stamp or other unique indicium), and any related data streams to facilitate co-location of data during storage. It is noted that some or all data acquired by some or all of the plurality of data sources may be multi-dimensional (e.g., intensity, frequency, directionality or orientation, altitude or distance from sensor to imaged object, and the like, depending upon the application and the type of data collected). Some or all of these factors may be encoded into, included in, or referenced by header information or other metadata associated with each data packet provided by the independent data source or otherwise derived by other components as a function of or dependent upon the independent data source and a prior or predetermined knowledge of its operational characteristics or deployment.

In some implementations, a user or administrator of system 100 may choose to divide data associated with independent data sources which cover large geographic areas (or other areas or regions of interest) with high resolution into multiple smaller datasets, each of which may include or be specifically directed to a fraction of the overall geographic area or region of interest that is covered by the data source as a whole. If this is done with a suitable amount of spatial overlap, boundary conditions that may arise from distributing the smaller datasets to multiple compute nodes 140n may be mitigated.

Those of skill in the art will appreciate that the foregoing functionality may be readily implemented, for example, via suitable programming in an application programming interface (API) and/or in logic at compute array 142, routing block 143n, or both, such that related data may be recognized as such and ingested and reproduced as indexed and related datasets in connection with STARE or other applications. In some implementations, permanent, non-intrusive detailed instrumentation may be integrated into programmable logic block 410, for instance, and cooperate with an API to effectuate appropriate hardware configurations, analysis interfaces, and setup methods to accommodate this embodiment supporting co-location of related data.

Some of the same factors that enable co-location of data also facilitate implementations in which algorithms may operate on multiple datasets. In that regard, it will be appreciated that typical algorithms employ only a single dataset for input; this is both conventional and sensible, since a typical algorithm seeks to apply the same set of rules or instruction sets to data that are related in some way, and since the relationship between particular data points is conventionally defined by the fact that the data points reside in the same dataset. Where, as set forth above, different, independent data streams may be identified as related (e.g., by header information or metadata) across independent datasets to support co-location, however, such relatedness may be leveraged to enable a particular algorithm to execute on multiple datasets in a single instantiation of the algorithm.

By way of example, a typical API call to execute an algorithm only allows the use of fields that belong to a single (open or active) dataset; multiple dataset computations are difficult to implement and require extensive programming and computational (and data record access) overhead. However, using the above techniques that contemplate importing and storing data streams as dedicated datasets from independent data sources, and since those multiple sources may be considered for thresholding calculations and other housekeeping and initiation procedures, an API or programmable logic block 410, or both, may readily be modified to accommodate use of multiple datasets by a single instantiation of an algorithm. In that regard, programmable logic block 410 may be implemented such that it allows for each field which provides data for computations to be a member of any dataset that is available (e.g., stored in data store 143n or other applicable memory structure). In a STARE implementation, such algorithms may be embodied in or comprise Connected Component Labelling (CCL) algorithms or other implementations, though these and other algorithms or heuristic approaches may have equal utility in image processing and other applications as noted above.

Figure 10:
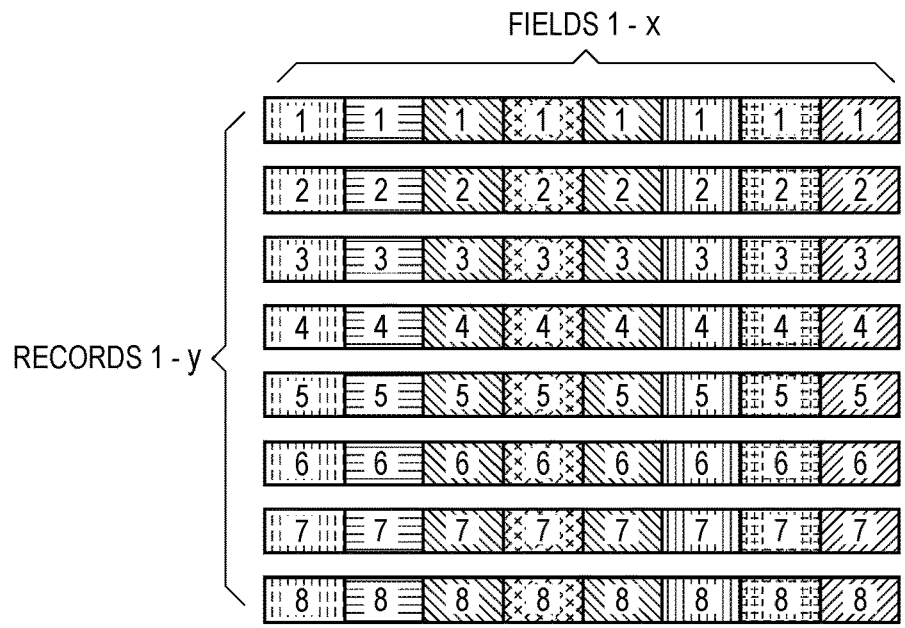
FIG. 10 is a diagram illustrating a conventional data record structure.
Figure 11:
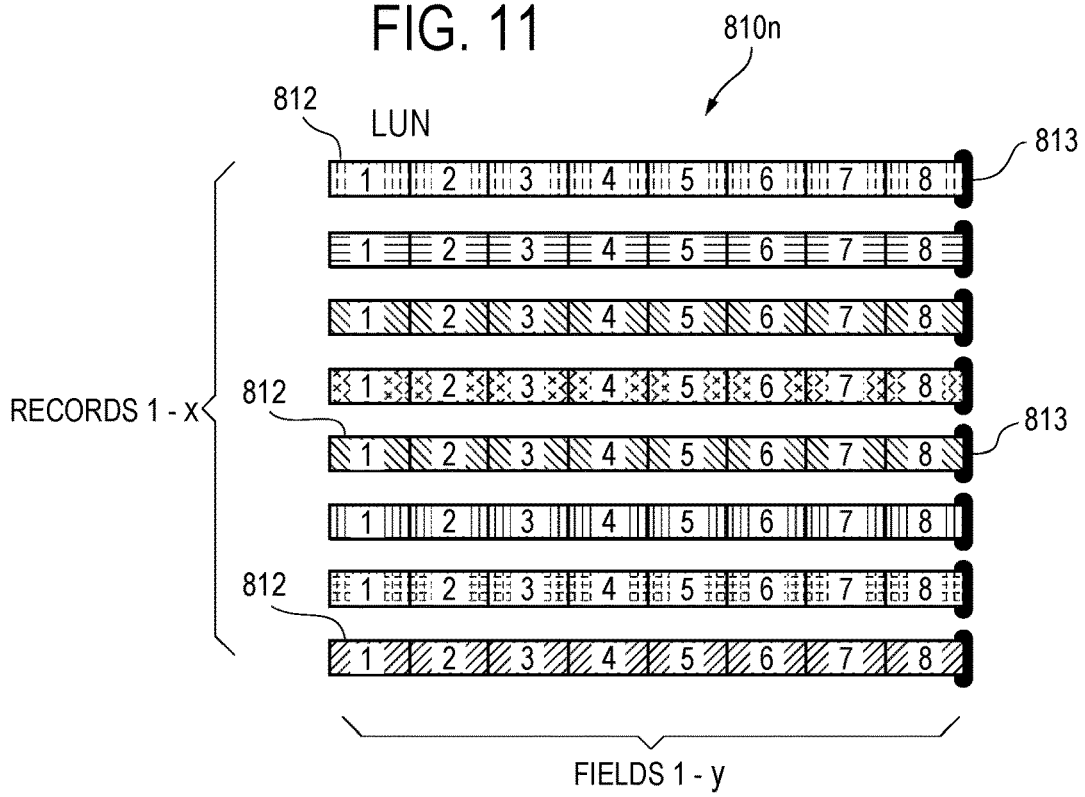
FIG. 11 is a diagram illustrating one implementation of a data record structure having utility in connection with a compute node operative in accordance with the present disclosure.

FIG. 10 is a diagram illustrating a conventional data record structure, and FIG. 11 is a diagram illustrating one implementation of a data record structure having utility in connection with a compute node operative in accordance with the present disclosure. Further, FIGS. 12 through 14G are diagrams illustrating additional implementations of data record structures having utility in connection with a compute node operative in accordance with the present disclosure.

In most Big Data and high performance computing applications, many computations may be performed on columns of data, or vectors, rather than on a single data point or value. This typical mode of operation may indicate or suggest that one useful way to store data in Flash is to map columns to dedicated Flash pages for efficient retrieval. On the contrary, however, some applications may benefit from organizing data in records organized in such a manner that a Flash page holds multiple fields (columns) of a common record. Prior data management and data processing systems address these competing requirements by storing the data twice: once, organized in columns; and then again, organized in records.

In accordance with the disclosed architecture of system 100, since each compute node 140 may have sixteen or more physical channels 899 that may operate concurrently, a sophisticated data mapping method, examples of which are set forth below, may allow for certain features that are typically unavailable in the context of single channel storage solutions.

The following examples, and the illustrations in FIGS. 10 through 14G, are based upon a hypothetical dataset of eight records, each record consisting of eight fields or columns. In the drawing figures, a respective color (represented by a unique hatching pattern) is used to indicate a respective column or field type in a record, and a unique number is used to indicate a row or index for each unique record. In the context of the present disclosure, the terms "record" and "page" may be used interchangeably, and the terms "field" and "column" may be used interchangeably.

In the prior art data record structure depicted in FIG. 10, for example, each distinct row (1 through 8) represents a distinct data record (numbered 1 through 8); as indicated by the legend "Records 1-y," it will be appreciated that such a data record structure may include more or fewer records than shown. Each column in FIG. 10 represents a particular field, each of which is distinct from the others as indicated by the respective color hatching; as indicated by the legend "Fields 1-x," it will be appreciated that each record (1 through 8) may include more or fewer fields than shown.

In accordance with the disclosed subject matter, however, when staged or reformatted for storage in Flash (such as data store 143), the data may be, in effect, rotated by 90 degrees, such that all original fields in the same original column are stored in a new dedicated page (or pages), i.e., a new dedicated page comprises fields, each comprising a single field type. This is illustrated in FIG. 11. Specifically, each respective row in FIG. 11 represents a new respective record, 1 through x (eight, in this example); i.e., one new record for each discrete field in the original data structure. Each new record comprises a number of fields (eight, in this example) 1 through y, corresponding to the number of records in the original data structure of FIG. 10, and each field is of the same field type mapped from the same column in the multiple records in the original data structure.

In the foregoing manner, original records may be re-mapped into columns, and original fields may be re-mapped into discrete records or pages 812, each comprising a column from the original data structure; each new record (i.e., representing an original column) may be stored in a dedicated Flash page 812 of any channel 899. In the FIG. 11 example, page 812 retrieval may be executed efficiently, as set forth above, though fetching related data may be further optimized with some additional manipulation.

Figure 12:
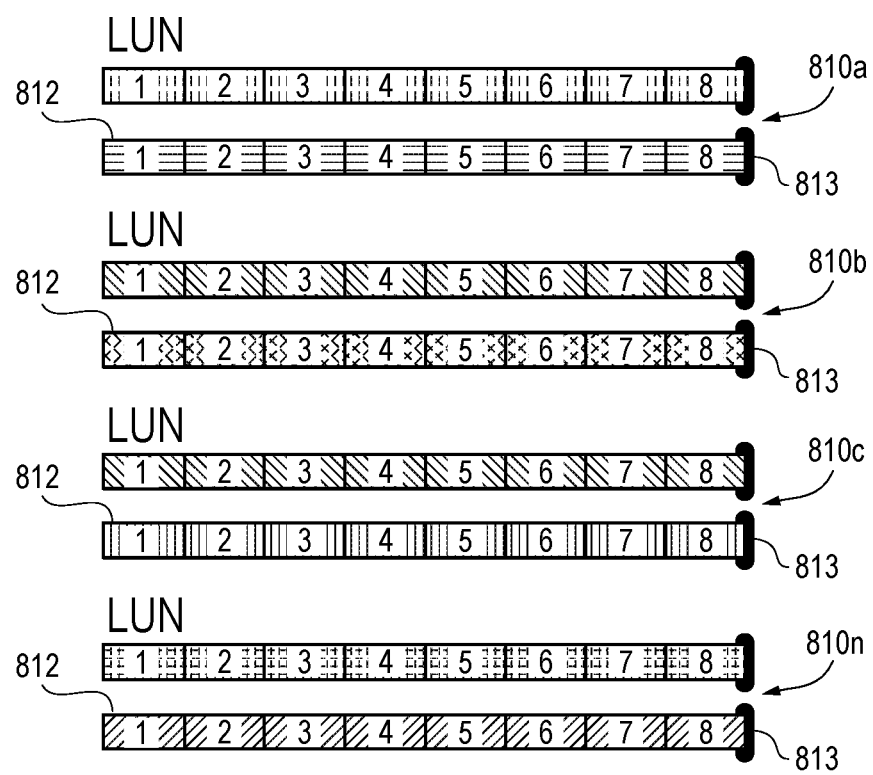
FIG. 12 is a diagram illustrating another implementation of a data record structure having utility in connection with a compute node operative in accordance with the present disclosure.
Figure 13A:
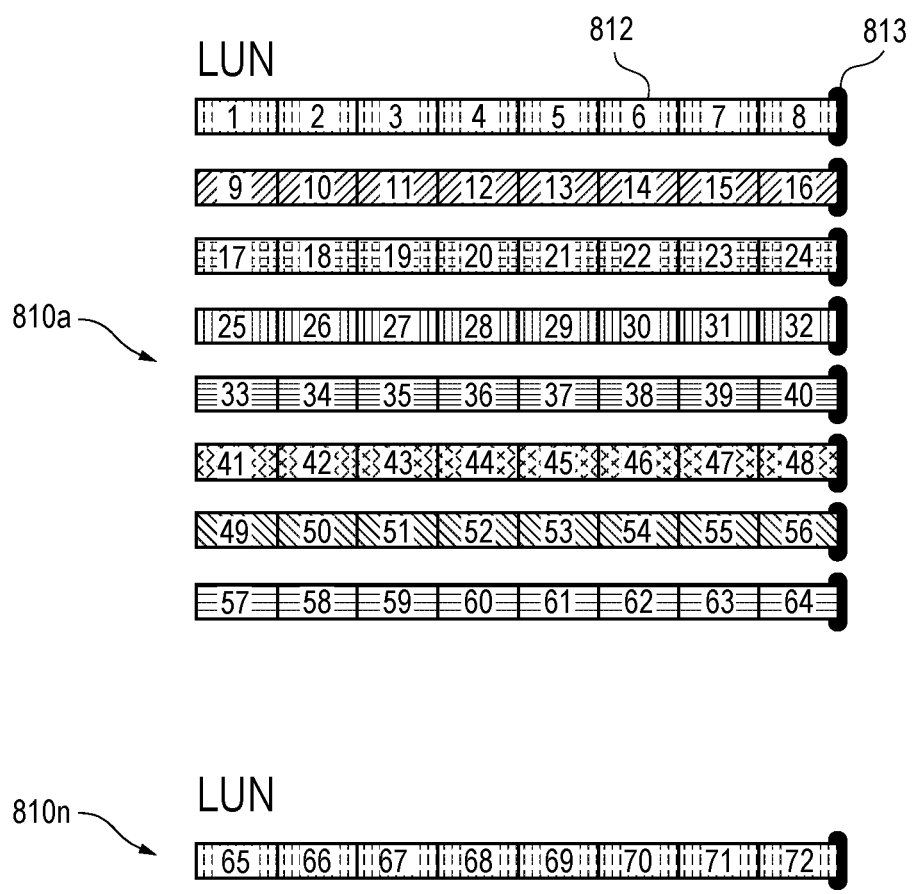
Figure 13B:
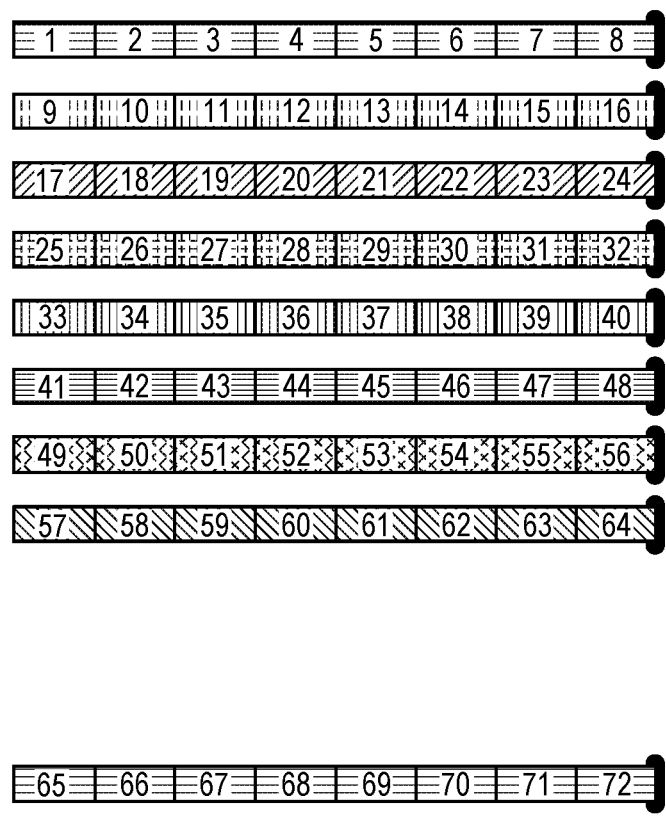
Figure 13C:
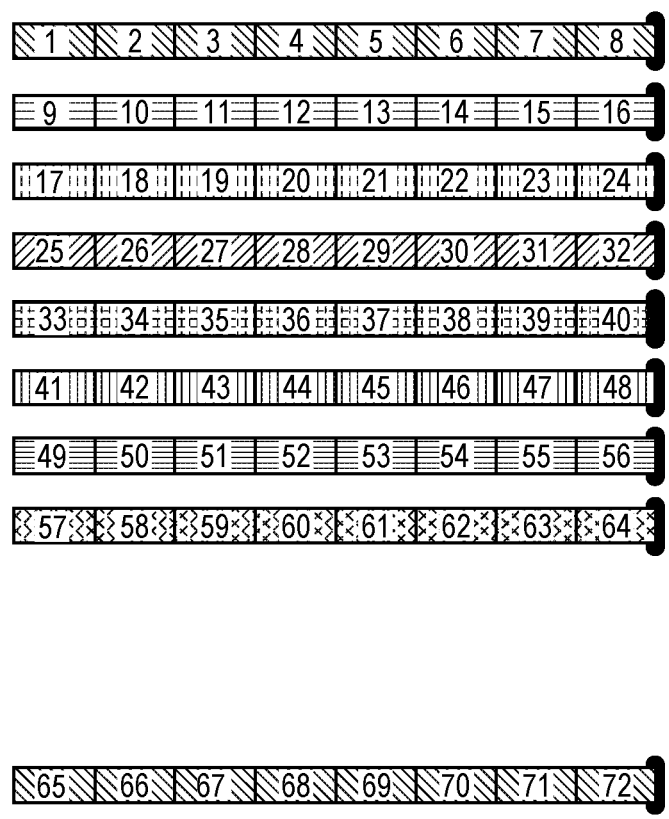
Figure 13D:
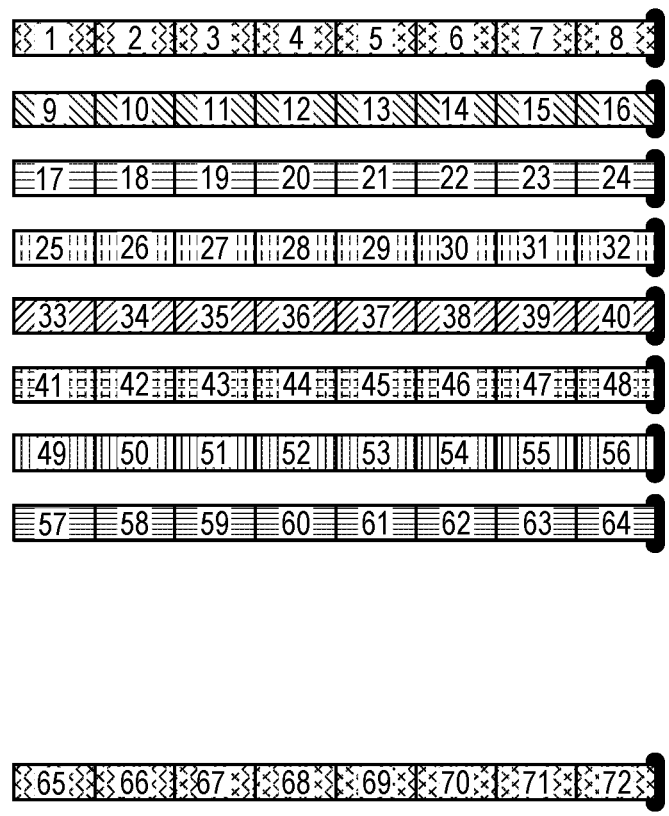
Figure 13E:
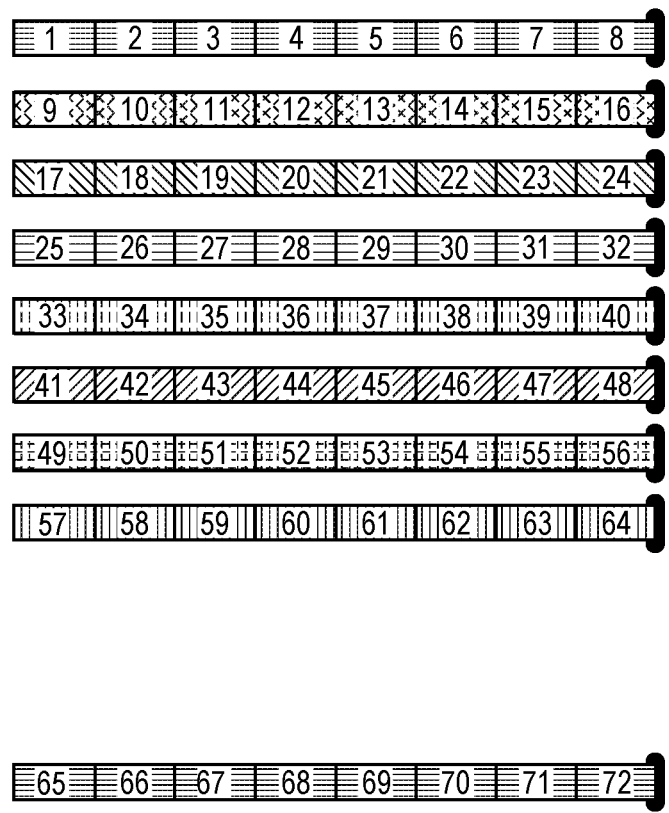
Figure 13F:
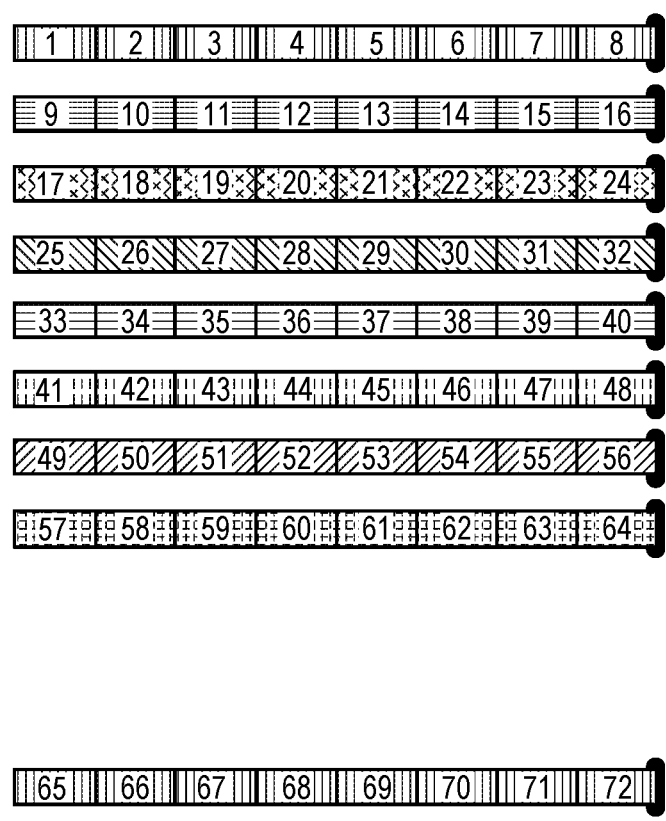
Figure 13G:
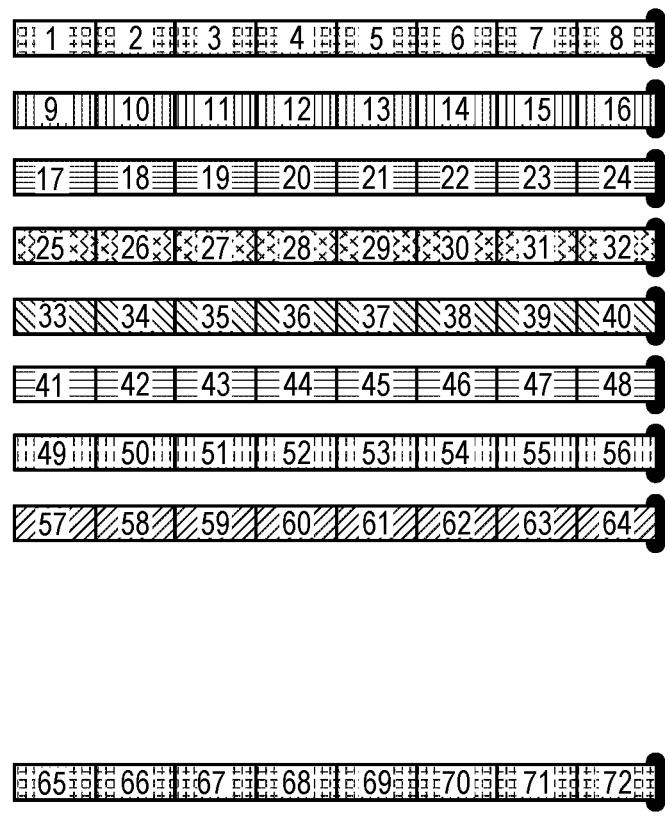
Figure 13H:
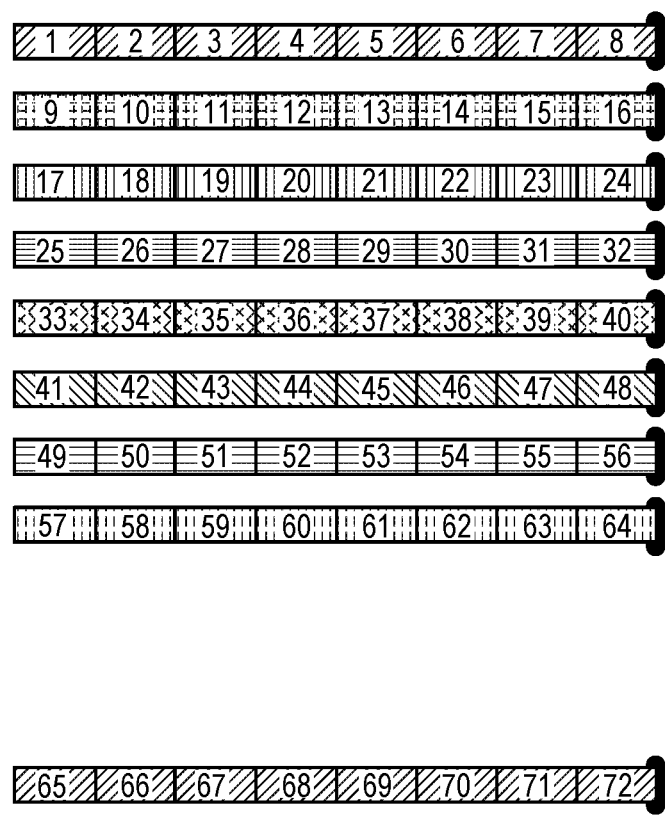
Figure 14A:
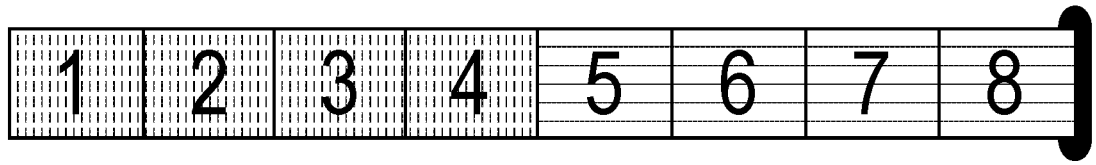
Figure 14B:
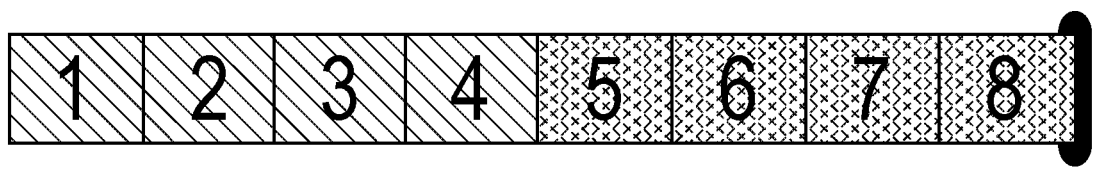
Figure 14C:
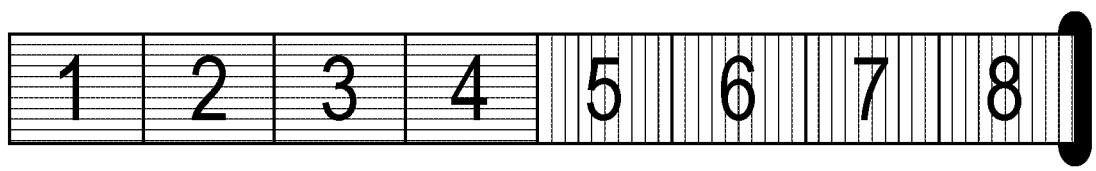
Figure 14D:
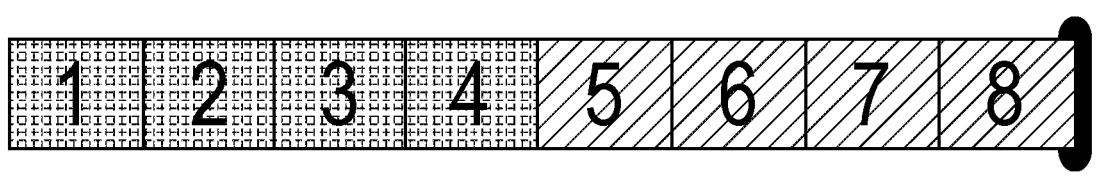
Figure 14E:
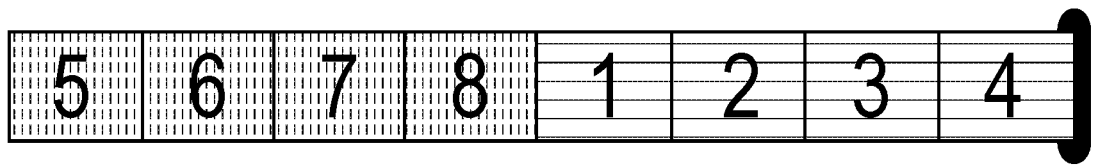
Figure 14F:
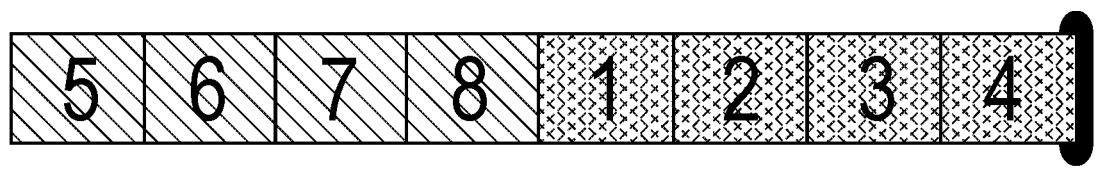
Figure 14G:

For example, if only one channel 899 were available, one additional mechanism to facilitate optimization may be to spread the newly formatted pages 812 across multiple LUNs 810 so that access to the various pages 812 may be executed in an interleaved manner. As noted above, such an interleaving strategy may have a positive effect on overall throughput with respect to the transfer time associated with writing a page 812 to cache 819 in the Flash array; in particular, this specific latency type of may be masked by use of interleaving, in accordance with which other data types or records from a second LUN 810 may be transferred across routing block 413*n* to compute array 142 while a first cache 819 associated with a first LUN 810 is still filling. This arrangement is illustrated in FIG. 12, which depicts the data structure of FIG. 11 distributed across multiple LUNs 810*a*, 810*b*, 810*c*, . . . 810*n*.

In some implementations in which each compute node 140 accommodates sixteen (or more) parallel channels 899, it may be useful to distribute data traffic across all available channels 899 as described above with reference to FIGS. 4 through 9. In such an embodiment, it may be useful to distribute the data structure of FIG. 11 across the available channels 899 in the manner illustrated in FIG. 13 (only eight channels 899 are shown, for clarity). As illustrated in FIG. 13, a LUN 810*a* may comprise newly formatted pages 812 (each having an index 813) as set forth above; in this example, however, the newly formatted pages 812 are distributed across each channel 899 available to handle data transfers to and from the data store 143. It will be readily appreciated from examination of FIGS. 13A through 13H that the manner in which pages 812 are stored may be manipulated in accordance with a particular one of the channels 899 with which those pages 812 are associated. For each successive channel 899, for instance, a location of pages 812 associated with the same field type from the original data structure is incremented by an offset value, and each successive channel includes data from the next successive eight original records.

In the illustrated implementation, the order in which pages 812 are stored (i.e., from record 1 through record 8) by original field type remains constant, but the first record 812 associated with a particular channel 899 increments by an offset value (for example, 1) for each successive channel 899. For example, a first channel 899 may be assigned or associated with a dataset in LUN 810*a* that begins with a first record or page 812 that represents a first field from the original data structure shown in FIG. 10, a second channel 899 may be assigned or associated with a dataset in LUN 810*a* that begins with a second record or page 812 that represents a second field from the original data structure, and so on. This is represented in FIGS. 13A through 13H, which depict a respective dataset for each respective one of eight channels 899 that are useable by LUN 810*a* (as indicated by the dashed lines in FIG. 13).

It is worth noting here that the actual (i.e., physical) order in which pages 812 are stored in data store 143 (e.g., a Flash array) need not change from channel 899 to channel 899 in many applications; for example, the same effect may be achieved logically or virtually by associating each series of pages 812 with an index or a look up table value that identifies a first page 812 for each channel 899. As long as a read operation (for example, requested by compute array 142 in cooperation with routing block 413*n*) is apprised of an index and an offset value for each channel 899, the specific order in which pages 812 are stored for any given channel 899 may be irrelevant. In one implementation, such indices and offset values may be maintained in node memory 450 (e.g., in FP tables 454*n*) and communicated as necessary to routing block 413*n* via DMA 146*b* substantially as described above, though other alternatives may have similar or analogous utility. The depiction in FIG. 13 is provided by way of example only, and for purposes of visualization, but those of skill in the art will appreciate that the illustrated structure may be achieved virtually without undue experimentation. It is also noted that the data record structure shown in FIGS. 13 and 13A through 13H may be altered or modified to accommodate the number of physical channels 899 available to a particular LUN 810*n*, the bandwidth or processing capabilities of compute array 142, the number of records, fields, or both in the original data structure, or a combination of these and a variety of other factors.

In particular, the diagonal striping depicted in FIG. 13 is indicative of a unique feature provided by this approach: data may be read massively parallel as records (i.e., from the original data structure in FIG. 10), on the one hand, and as pure columns (i.e., from the original data structure in FIG. 10), on the other hand. The type of read may be selectively adjusted or determined by identifying a page 812 selection for each channel 899. As noted above, such a read operation may be requested by compute array 142, either independently or in cooperation with routing block 413*n*, and may be supported by data retrieved from node memory 450, in some applications.

If a read request for all channels 899 points to the same page 812 location (i.e., the number of spaces measured from the top down, or from the bottom up, in FIG. 13), then horizontally across all channels 899, this is represented by the row at reference numeral 1399. Reading all channels 899 across the entirety of row 1399 will result in retrieval of complete records for the entire dataset in LUN 810*a* in parallel. This method may be useful when an application or algorithm needs to check for many conditions concurrently. As noted above, the same result may be effectuated by using a page index and offset value for each respective channel 899, irrespective of location of a particular page 812 in a data structure maintained for that particular channel 899.

Additionally or alternatively, the patterned data record structure of FIG. 13 may also be effective in finding all individual records or pages 812 with a specific condition (or field type), for example, by setting an offset value in each channel 899 differently (i.e., diagonally across) so that all channels 899 only deliver that specific condition or field type in parallel. For this search or read strategy, no reformatting of the data structure is required; both record-wide and column-centric selection may be equally effective in the context of effective storage bandwidth utilization.

To facilitate reassembly of related fields (from the newly formatted data structure) into complete original records after the different fields have been mapped to different Flash pages 812, each index 813 for a new page 812 may include, in addition to the information and metadata noted above, an indication of the field type (e.g., a column number or other identifier from the original data structure in FIG. 10) and record (again, from the original data structure) with which a given page 812 should be associated, as well as an index number or other identifier of both the first and last record (from the original data structure) from which the fields contained in page 812 originated. In some embodiments, compute nodes 140 may assign a local system index to each page 812, for example, as each page 812 is received or otherwise acknowledged (e.g., during boot or initialization). This index may be globally unique if combined with a node identifier and a card identifier, for instance, which uniquely identify compute node 140n and its card 200 in the context of system 100.

In one simple implementation employing eight compute nodes 140 each having sixteen memory channels, it is possible to spread the various field types across all eight compute nodes 140 for a total of one hundred twenty eight parallel field types. In the absence of sophisticated mesh connectivity, however, it may be cumbersome to accommodate compound conditions across multiple compute nodes 140 in this context, and even one hundred twenty eight field types or columns may not be sufficient to reflect many real-world applications. Accordingly, it may be appropriate or desirable in some circumstances to utilize Flash pages 812 that hold, maintain, reflect, or represent multiple field types (i.e., columns from the prior art data structure of FIG. 10). This is depicted in simplified form in FIGS. 14A through 14G.

Specifically, the illustrated approach may be employed in some situations to mitigate or to eliminate shortcomings generally associated with current known limitations of block RAM (BRAM) technologies implemented by many commercially available FPGA structures, for example, such as those having utility in connection with compute array 142. In applications requiring storage and/or retrieval of a vast number of datatypes (i.e., fields) in parallel to facilitate examination or analysis of many conditions concurrently, conventional BRAM-based systems simply do not (and cannot, as a practical matter) comprise enough local storage to store or otherwise to accommodate many records with possibly thousands of fields at the same time.

Enabling multiple field types to be populated in a single page 812 of memory, and realizing benefits from reduced bandwidth overhead associated with partial page reads (made possible by deployment of multiple LUNs 810 in a high density constellation as illustrated and described herein), allows a compute node 140 to achieve higher throughput rates as compared to a strategy that requires reading specific entries from freshly retrieved entire pages 812 for each read request.

In some implementations, only minor adjustments to logic (e.g., at routing block 413n, compute array 142, or both) or a few additional instructions (e.g., in FP tables 454n at node memory 450) may be useful to enable partial page read functionality. For example, with mixed column types in a page 812, a normal page header or index 813 as described above may be modified such that it refers to a secondary page header describing the contents of a page 812 and a boundary between field types; using this mechanism, and by apprising relevant logic or instructions sets that partial page reads are possible, fractional compound pages such as those illustrated in FIGS. 14A through 14G may be maintained without altering the above-mentioned methods for selecting pages, pre-sorting, sorting, and so forth.

Many different applications and algorithmic processing strategies may benefit from partial page reads, particularly in situations where only data from some of the subpages, or a portion thereof, are relevant for a particular computation to be executed; by using a partial page read strategy, other (irrelevant) field types in a particular page may be ignored (i.e., may not be retrieved) to economize on bandwidth and computational or other processing resources. In some such embodiments, it may be desirable to implement a strategy to rotate between active LUNs 810, and their associated resources, to maximize or otherwise to increase throughput (as in the example above addressing a single field type per page).

Figure 15:
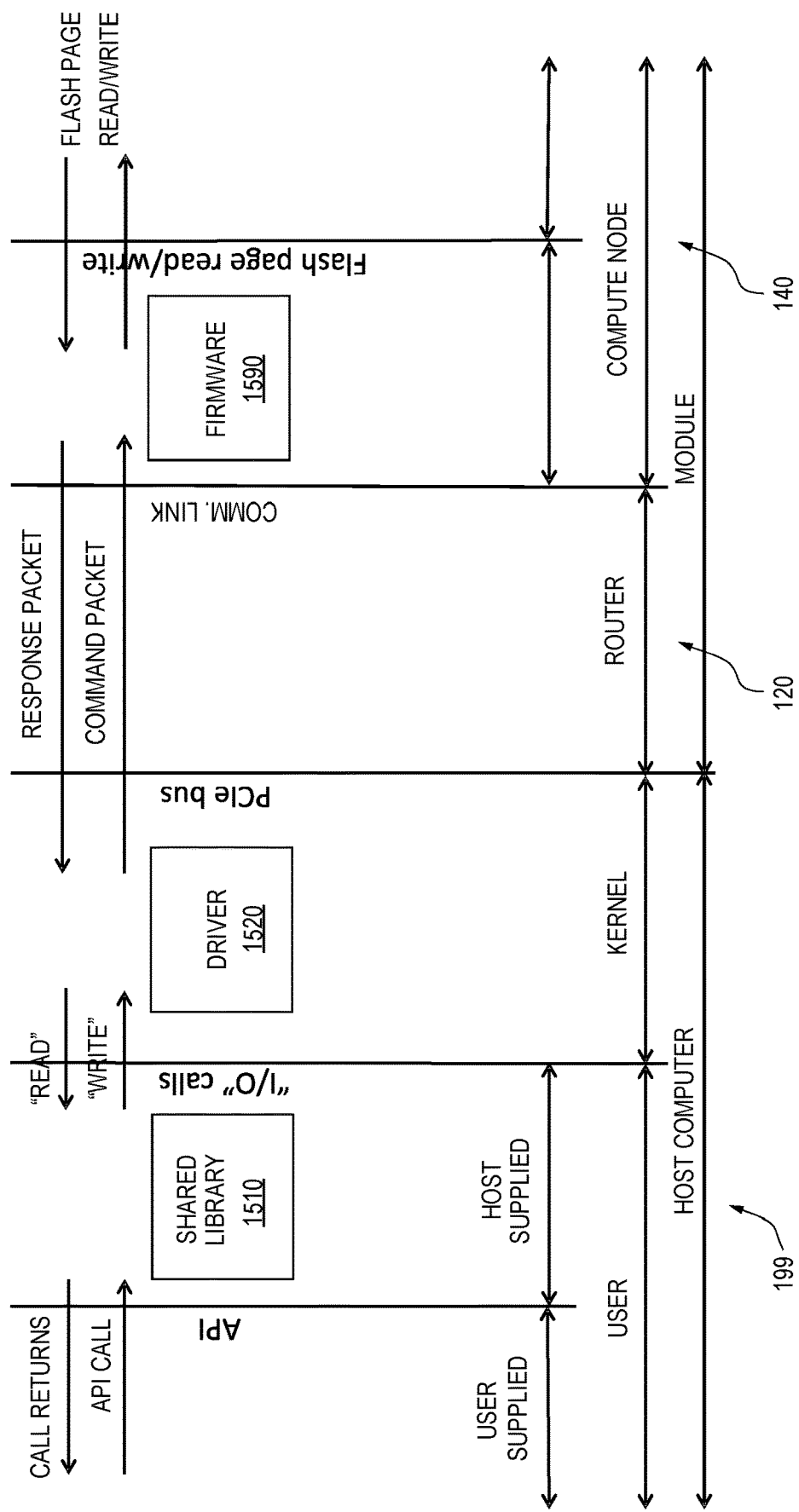
FIG. 15 is a diagram illustrating one strategy for data communications between a host compute system and a data processing and analytics system as depicted in FIG. 1.

FIG. 15 is a diagram illustrating one strategy for data communications between a host compute system and a data processing and analytics system as depicted in FIG. 1. FIG. 15 illustrates, in simplified form, one example of certain data communications that may support the foregoing functionality in the context of a data processing operation or compute task requested by a host compute system 199. Specifically, communications (calls/receipts) operations for host compute system 199 are illustrated on the left of FIG. 15, communications passing through router module 120 are illustrated in the middle of FIG. 15, and communications operations for compute node 140 are illustrated on the right of FIG. 15.

Among the other things noted above with specific reference to FIG. 1, host compute system 199 may generally comprise a shared library 1510. In some implementations, shared library 1510 may be configured and operative to implement an appropriate application programming interface (API) to enable bi-directional data communications between host compute system 199 and router module 120 as described above and as depicted in FIG. 15. In particular, an API at shared library 1510 may be embodied in or comprise a procedural interface implemented on one or more of common or popular operating systems typical for host compute system 199; examples of such an operating system include Linux™, Windows™, and Mac™ OS™, though others may be available currently, or may be developed in the future. As is generally known, an API binding typically provides basic functionality to authenticate API requests, to enable or to facilitate text encoding/decoding, and to provide generic support for read and write requests; in some implementations, the API at shared library 1510 may employ C™ and Python™ bindings, though others may also be employed. Further, the API may parse dataset descriptions and perform basic parameter validation, as is also generally known.

As set forth above, the API may also have utility in storing and retrieving datasets in a co-located manner. For example, shared library 1510 may be configured and operative (such as by the foregoing parsing of dataset descriptions, parameter validations, or other techniques) in cooperation with the API to identify specific datasets and to characterize same as related to other distinct datasets. Such a relatedness determination, which may be binary or effectuated in accordance with a weighted scale (e.g., to provide a relatedness "score" or other value for a dataset relative to one or more selected other datasets) may be used to influence a physical or logical location in shared library 1510 at which data are maintained.

For example, it may be beneficial in some circumstances to store related datasets in adjacent, contiguous, or alternating memory blocks in shared library 1510. The same may also be true for memory store 143n, as noted above, and so, additionally or alternatively, components at host compute system 199 may communicate datasets to compute nodes 140 (such as illustrated in FIG. 15) with such relatedness information encoded in metadata or header information, or even embedded within the datastream itself.

In some embodiments, shared library 1510 may be implemented as a binary library (for example, on Windows, it may be in the form of a dynamic link library (DLL)) and may be provided as part of a simple software development kit (SDK) that includes appropriate header files, in a manner that is similar to support provided for any other generic C or Python library. In use, shared library 1510 may generally be apprised of, and may maintain, information related to open datasets for each individual user of host compute system 199 (i.e., it may be desirable that information within shared library 1510 is not shared between individual users, but is rather shared between discrete resources of system 100).

As indicated in FIG. 15, host compute system 199 may further comprise a driver 1520. In operation, functionality of driver 1520 may be called by shared library 1510. In that regard, driver 1520 may employ standard input/output (I/O) calls, such as read and write, and may be operable in cooperation with Linux, Windows, Mac OS, or a combination of these and other operating systems (depending, for instance, upon the operating system governing functionality of host compute system 199 as a whole). Driver 1520 may translate dataset names to internal dataset identifiers, for example, as may be necessitated by host compute system 199 operating system or other resources, and may also provide full parameter validation, security and sharing management functionality, and administrative tasks as are generally required by operating systems and other components in host compute system 199. Specifically in the context of the disclosed subject matter, driver 1520 may manage activity of compute nodes 140 (for instance, in cooperation with individual processing systems 430) by sending commands and receiving (and, optionally, aggregating) responses as necessary during run-time. In that regard, it is noted that some of the functionality of driver 1520 may be provided in cooperation with one or more of the components of processing systems 148/430, and may influence or benefit from data in node memory 144/450, described above with reference to FIGS. 1 and 4.

Driver 1520 may also maintain and organize open datasets for all registered or authorized users of host compute system 199, maintain dataset identification data or indicia for same, and enforce administration privileges or other access rights to components or modules that are fundamental to operation of host compute system 199.

Compute node 140 may generally comprise, in addition to the components described above, a firmware module 1590 or instruction set repository as indicated in FIG. 15. Firmware 1590 may be embodied in a dedicated memory component, for example, or may reside in or be maintained by an element of processing system 430 or node memory 450, in some instances. The disclosed subject matter is not intended to be limited by the manner in which firmware 1590 is stored or deployed in the context of the various hardware and software components of compute node 140. In operation, firmware 1590 may generally implement an appropriate data transfer command/response protocol sufficient to enable the communications and functionality set forth herein; in that regard, firmware 1590 may execute or accommodate an asynchronous command packet/response packet interface to allow the communications depicted in FIG. 15 and otherwise to facilitate data transfer between compute node 140 and router module 120 in accordance with the foregoing methodologies and principles. As set forth above, this feature may also comprise one or more mechanisms supporting col-location of related datasets, either independently or in cooperation with information received from host compute system 199 and associated with the data transfer.

Specifically, firmware 1590 may, in some embodiments, be configured and operative to manage data transfers between compute array 142 and data store 143 (e.g., a Flash array). For example, firmware 1590 may be responsible for, manage, or otherwise facilitate some or all of the following functionality: handling boot-up initializations for compute node 140; building and managing indices or look up tables indicative of data locations for all dataset records managed by compute node 140; creating and managing datasets and any associated dataset descriptors (including co-location indications or relatedness scores across datasets); optimizing data storage by field type per dataset; managing page 812 or block 811 write optimization protocols or strategies (including, but not limited to, co-location or dataset density approaches); managing page 812 replacement and page 812 aging strategies; loading and execution of algorithms in compute array 142 (e.g., such as may be embodied in an FPGA fabric); loading relevant parameters needed or desired for algorithm execution (including whether a particular algorithm may execute on multiple, related datasets); collating and, optionally, passing data (e.g., read data and/or algorithm results) between and amongst components in compute node 140; and generating dataset identifications or other indicia for dataset creation and co-location or relatedness scores, and coordinating same across all compute nodes 140 in a particular distributed processing system 100.

In the context of all datasets, firmware may maintain and organize all names, access strings, identifiers, descriptors, indices, relevant relatedness scores or co-location preferences, if applicable, and the like. For a particular dataset, firmware 1590 may also maintain a record of data pages 812 that contain dataset data and are located or that reside on or in association with a particular compute node 140. Additionally, firmware may also maintain data associated with a list of outstanding read or write requests (or both) for data that are currently being transferred. As noted above with respect to driver 1520, it will be appreciated that some of the functionality of firmware 1590 may be provided in cooperation with one or more of the components of processing system 148/430, and may influence or benefit from data stored in node memory 144/450.

Turning now specifically to the data flow illustrated in FIG. 15, a user's application program may make an API call at host compute system 199 to initiate a data processing operation. In some implementations, the API may include different routines for different functions, such as CREATE, OPEN, CLOSE, WRITE, READ, EXECUTE ALGORITHM, DELETE RECORDS, DELETE DATASET, and the like. Typically, the API expects that a dataset to be accessed will or must be specified by name and access string (password) or in accordance with some other unique identifier or identifying indicium.

In this example, shared library 1510 may field the API call and check, authenticate, verify, or otherwise confirm basic parameters. For example, if the request targets a particular dataset, then shared library 1510, either individually or in cooperation with other components of system 100, may check to ensure that host compute system 199 has that dataset open or is in the process of opening it (e.g., such that the target dataset, or a relevant portion thereof, is accessible in, or via, RAM or via another short term storage medium). As another example, if the request were to create a dataset, shared library 1510, either individually or in cooperation with other components of system 100, may parse and verify a relevant dataset descriptor or other information related to creation of such a dataset. If the request were to access dataset records, on the other hand, shared library 1510 may verify valid record numbers and ranges, again, either autonomously or in cooperation with other system 100 components.

In some implementations, shared library 1510 may be responsible for building the basis for the requested or required command, for example: the dataset may be specified by name; relevant command codes and other parameters may be set; a "write" command may be formatted to specify a number, say from 1 to n, of data records to be written; a "read," "delete record," or other command may be formatted to specify a starting record number (or an index and offset as set forth above, for instance) and a number of records to be accessed or affected; and so forth. The types of commands recognized and constructed by shared library 1510 are myriad, and may be application-specific or dynamically created, for example, as a function of the processing operation sought to be executed.

In that regard, shared library 1510 may build an "algorithm load" or "algorithm execute" command, or both, as necessary or as instructed by host compute system 199, and may retrieve, or request retrieval of, an algorithm bit stream or other pertinent instruction sets from an algorithm library or other memory storage facility maintained, for example, at host compute system 199. Upon specification of a suitable bit stream or other data and information associated with a particular algorithm to be executed, as well as selection of required or desired filters, boundary conditions, relevant variables, or a combination of these and other command parameters, shared library 1510, or a proxy, may then make a call to driver 1520, which call may include a dataset name and other relevant command parameters sufficient to initialize driver 1520 with appropriate data to begin data transfer and processing operations.

Such "I/O" calls and "Read" and "Write" data transfers are illustrated in FIG. 15 at the vertical line representing a boundary between user operations and kernel (or low level, operating system) operations in host compute system 199.

Driver 1520 may field calls from the user domain (i.e., across the "I/O" call boundary illustrated in FIG. 15), such as may be embodied in or comprise a request or command string from shared library 1510. Responsive to such a command or request, driver 1520 may execute, or may ensure that some other component executes, a full validation or verification of each and every parameter in a particular command or request. For example, many commands use a dataset identifier or unique indicium or indicia for efficiency; in such instances, driver 1520 may translate a dataset name to an associated identifier for downstream use at compute node 140. As another example involving security checks and administrative privileges, driver 1520 may maintain a record of authorized users, and thus may be apprised of which users are administrative users that have attendant administrative rights or privileges. In situations in which a particular command or request is one that requires administrative rights, driver 1520 may enforce administrative access rules as dictated or suggested by other elements of host compute system 199; alternatively, driver 1520 may ignore such rules involving regulated access to system resources in instances where a particular command or request does not implicate administrative access rules or policies.

Similarly, driver 1520 may be configured and operative to maintain data indicative of which datasets, system- or enterprise-wide, that are open and currently accessible; further, driver 1520 may also maintain data or other information related to open datasets with respect to which sharing is or may be allowed, and under what circumstances (e.g., sharing may be permitted if so declared when the dataset was opened or if a dataset is related to an open dataset, for instance, or when the dataset was created), as well as which records are valid within a particular dataset (e.g., including a total number of valid records and a percentage of valid records as compared to all records, valid and invalid or out of date).

If driver 1520 determines that all examined criteria and parameters are within acceptable ranges (i.e., a command or request is properly constructed and formatted), then a cyclic redundancy check (CRC) may be calculated for the command packet (e.g., creating a validated or authenticated command packet), and the newly validated command packet may be transmitted to compute node 140 via host interface 126 (which may be, for example, a PCIe bus in some implementations, as noted above). This data transfer is illustrated in FIG. 15 at the vertical line (labeled "PCIe Bus") representing a boundary between kernel operations in host compute system 199, on the one hand, and router module 120, on the other hand. Router module 120 may then forward the verified command packet to one or more compute nodes 140 (e.g., via communications links 143) substantially as described above.

At a compute node 140, firmware 1590 may receive a verified command packet and may execute authentication procedures to verify the CRC for the packet; as described above with respect to driver 1520, firmware 1590 may also execute a full parameter check in the compute node 140 domain. Given valid parameters and successful CRC check, firmware 1590 may then execute the command specified by the verified command packet.

It is noted that a particular command may include zero, one, or a plurality of page read and/or write operations, and instructions for these may be parsed by firmware 1590 and transmitted to elements of compute array 142, processing system 430, or both for execution.

For algorithm load and algorithm execute commands, the algorithm bit stream provided by shared library 1510 may be loaded into compute array 142, processing system 430, or both, and executed substantially as set forth above with reference to FIGS. 1 and 4. For example, selected data records may be streamed to and from compute array 142, generally in cooperation with routing block 413n, and multi-channel algorithm results may be combined into a single result (for example, by compute array 142, routing block 413n, or both, either independently or in cooperation with processing system 430).

A response packet (illustrated at the top center of FIG. 15) generated at compute node 140 may generally describe what happened during data processing operations, and may provide, include, or reference a result (or an analysis of results) generated during computational execution of a relevant algorithm. Data payload in a response packet may include some or all of the following: a status of an ongoing processing operation (e.g., percent complete, estimated time to completion, estimated compute cycles, estimated node resources that must or may be brought online, etc.); how many and which particular dataset record(s) are involved or may be implicated or affected by an ongoing processing operation; and what (interim) results have been obtained so far, along with an accounting or other report of such results. Most command packets generally expect a single response, but that is not true for all command packets; in some implementations in which command packets may expect or allow for multiple responses, those multiple responses may be aggregated, either at compute node 140 or at driver 1520, for example, as a function of system design choice or simply to decrease or otherwise to optimize data transfer efficiency or bandwidth utilization.

In any event, a CRC may be calculated for the whole response packet as generated by elements of compute node 140. Firmware 1590, or a surrogate or delegated component, may then transmit response packets back to host compute system 199 (e.g., via router module 120, across host interface 126 bus, and to driver 1520). Upon receipt of a response packet (e.g., from host interface 126), driver 1520 may then verify the CRC associated with or included in the response packet, ensure that the response matches or is coordinated with outstanding or pending command packets, and manage these and other operations in the context of a multi-access environment in which multiple compute nodes 140 are communicating with a single host compute system 199. In that regard, driver 1520 may aggregate responses, for instances, from a single compute node 140 or from multiple compute nodes 140, and may return such responses, as well as any appropriate or attendant status information to shared library 1510. At this point in some implementations, shared library 1510 may then take control of program execution, update its data structures based upon information in received responses, and send new or updated data to a particular user's buffer or other temporary, user-specific data storage area. Program control may then be returned to a user's program or other software application that requested the data processing operations in the first place.

Figure 16:
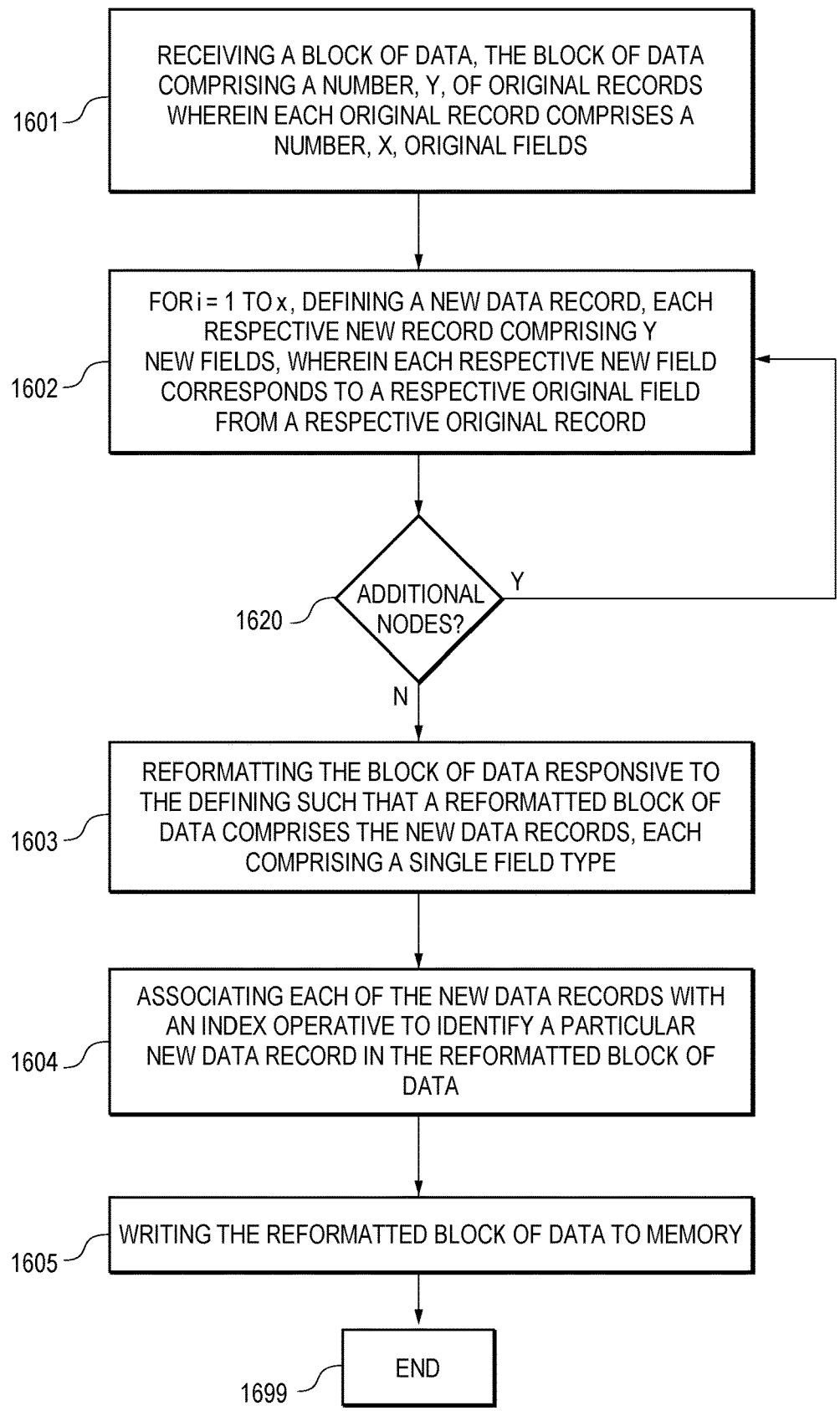
FIG. 16 is a functional flow diagram illustrating aspects of one implementation of a method of reformatting a data structure.

FIG. 16 is a functional flow diagram illustrating aspects of one implementation of a method of reformatting a data structure. As indicated at block 1601, a method of reformatting a data structure may begin by receiving a block of data, the block of data comprising a number, y, of original records wherein each original record comprises a number, x, of original fields. See, e.g., FIG. 10 for an illustration of one example of such an original data record. The receiving operation depicted at block 1601 may be executed, for instance, by compute array 142 as illustrated in FIGS. 1 and 4; additionally or alternatively, this operation may be executed by, or supported by, one or more components of processing system 148/430 as described above with reference to FIGS. 1 and 4.

The method may proceed to an iterative loop as indicated at block 1602 and decision block 1620. In accordance with this iterative procedure, a number, x, of new data records may be defined, each respective new record comprising y new fields, wherein each respective new field corresponds to a respective original field from a respective original record. If a determination is made (e.g., at block 1620) that additional iterations are required, the method may loop back to block 1602; otherwise, the method may proceed to block 1603. At block 1603, the block of data may be reformatted, responsive to the defining operation (at block 1602) such that a reformatted block of data comprises the new data records, each comprising a single field type. See FIG. 11 for an illustration of one example of a data structure that may result from the operations depicted at blocks 1602, 1620, and 1603. In particular, the operations depicted at these blocks are set forth in detail above with specific reference to FIGS. 10 through 14.

In this example, the method may continue by associating each of the new data records with an index operative to identify a particular new data record in the reformatted block of data. These indices are illustrated at reference numeral 813 in FIG. 11, for example. The method may then proceed by writing the reformatted block of data to memory (block 1605), whereupon the method may conclude (block 1699).

To summarize the operations depicted in FIG. 16, particularly in the context of FIGS. 1, 4, and 11, it will be appreciated that a method reformatting a data structure may result in a newly formatted data structure that enables flexible and efficient processing operations and data access in cooperation with conventional memory hardware architectures; for example, vector processing or traditional processing may be selectively implemented with minimal administrative overhead.

It is noted that the arrangement of the blocks and the order of operations depicted in FIG. 16 are not intended to exclude other alternatives or options. For example, the operations depicted at blocks 1603 and 1604 may be reversed in order, or they may be made to occur substantially simultaneously in some implementations. Further, one or more of these operations may occur substantially simultaneously with the operations depicted at blocks 1602 and 1605 in instances where it may be desirable to do so, e.g., for efficiency, where processing resources are sufficient, when multithreaded or parallel operations are accommodated by the compute array 142 and attendant hardware, and the like. Those of skill in the art will appreciate that the foregoing subject matter is susceptible of various design choices that may influence the order or arrangement of the operations depicted in FIG. 16.

Figure 17:
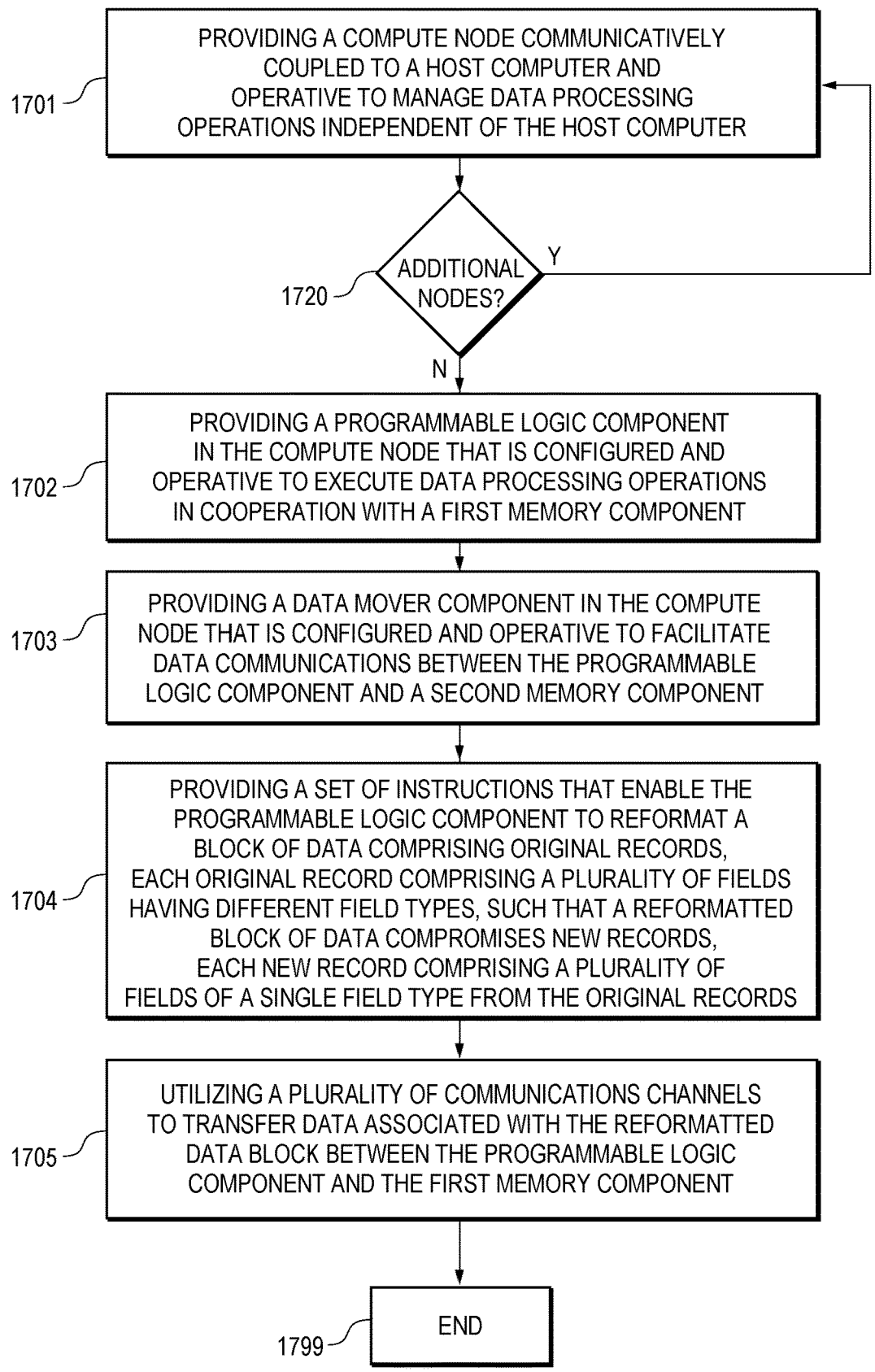
FIG. 17 is a functional flow diagram illustrating aspects of one implementation of a method of executing data processing operations.

FIG. 17 is a functional flow diagram illustrating aspects of one implementation of a method of executing data processing operations. As indicated at block 1701, a method of executing data processing operations may begin by providing a compute node communicatively coupled to a host computer and operative to manage data processing operations independent of the host computer. Such a compute node may be embodied in or comprise elements described above with reference to compute node 140; similarly, the communicative coupling may be embodied in or comprise elements of router module 120 such as described in the examples above.

If a determination is made (e.g., at decision block 1720) that additional nodes are required or desired for a particular data processing operation or application, then the method may loop back to block 1701; otherwise, the method may proceed to block 1702.

The method may continue by providing a programmable logic component in each compute node as indicated at block 1702; each programmable logic component may be configured and operative to execute data processing operations in cooperation with a first memory component. In some disclosed embodiments, the programmable logic component (e.g., compute array 142 in FIGS. 1 and 4) may be embodied in or comprise a microprocessor, a multicore microprocessor, an FPGA, or other digital data processing component suitable to execute the functionality set forth above. Also as noted above, the first memory component may be, or have access to, a non-volatile data storage device such as EEPROM or Flash memory, though other types of memory are contemplated.

In some disclosed implementations, the method may proceed by providing a data mover component in the compute node that is configured and operative to facilitate data communications between the programmable logic component and a second memory component (block 1703). The second memory component may include any of various types of solid state storage hardware, such as RAM, SRAM, DRAM, DDR RAM, DDR4 RAM, and the like. The data mover component may utilize hardware and firmware components that are operable substantially as set forth above with reference to FIGS. 1 and 4.

The method may proceed, as indicated at block 1704, by providing a set of instructions that enable the programmable logic component to reformat a block of data comprising original records, each original record comprising a plurality of fields having different field types, such that a reformatted block of data comprises new records, each new record comprising a plurality of fields of a single field type from the original records. Aspects of an example of such reformatting operations are described above with reference to FIGS. 10 through 14.

The method may then proceed by utilizing a plurality of communications channels to transfer data associated with the reformatted data block between the programmable logic component and the first memory component (block 1705), whereupon the method may conclude (block 1799).

As with FIG. 16, the arrangement of the blocks and the order of operations depicted in FIG. 17 are not intended to exclude other alternatives or options. For example, it will be appreciated that in accordance with one embodiment, the operations depicted at blocks 1702, 1703, and 1704 may be executed in any order without materially impacting results of the method or the functionality of any particular hardware implementation utilized to execute the method. In addition to the alternatives set forth in detail above, various design choices that may influence the order or arrangement of the operations depicted in FIG. 17 will be readily apparent to those of skill in the art.

Figure 18:
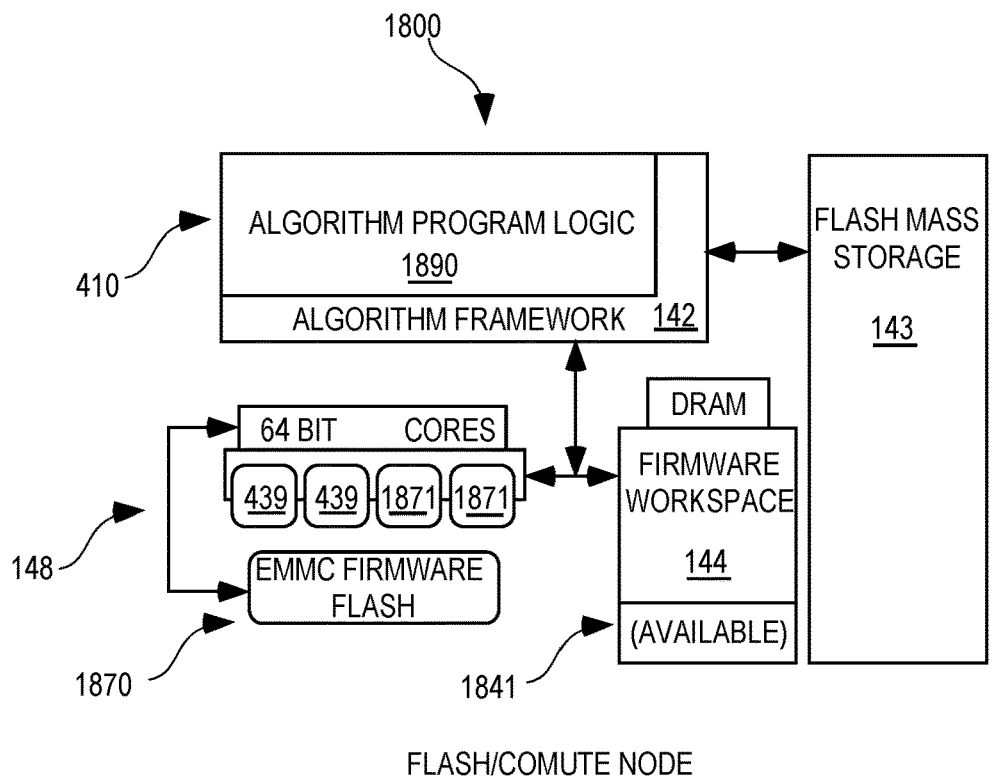
FIGS. 18 and 19 are functional block diagrams illustrating components of various implementations of a compute node having utility in connection with a data processing and analytics system.
Figure 19:
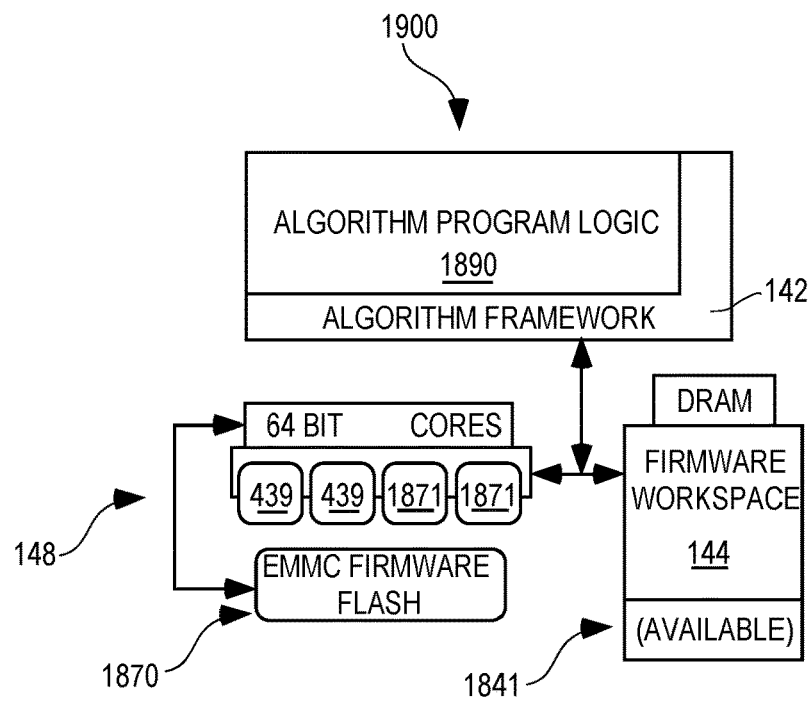

FIGS. 18 and 19 are functional block diagrams illustrating components of various implementations of a compute node having utility in connection with a data processing and analytics system. It will be appreciated that the architectures illustrated in FIGS. 18 and 19 may be implemented as variations of compute node 140, and that node 1800 may be similar in overall architecture to compute node 140 depicted in, and described in detail with specific reference to, FIGS. 1 and 4. As illustrated in FIG. 19, node 1900 is similar to node 1800, though the former may omit a data store component (reference numeral 143 in FIGS. 1 and 1800) that is included in or accessible by the latter.

As set forth above with reference to FIG. 1, a communications link (not illustrated in FIGS. 18 and 19) may be employed to couple compute nodes such as 140, 1800, and 1900 at different successive tiers in series. As noted above, such a communications link (reference numeral 149 in FIGS. 1 and 4) may be based upon and operative in accordance with standard serial interfaces or protocols, though some proprietary serial links may also be used as a design choice. For instance, it may be desirable that a communications link employ or comprise a Xilinx Aurora™ communication link. In any event, such a communications link may be selected, configured, and operative as a function of, or otherwise taking into consideration, the hardware and operation of a compute array 142 (or "algorithm framework"). Those of skill in the art will appreciate that many options exist for both compute array 142 and a communications link, and that specific commercial embodiments have been identified by way of example only, and not by way of limitation.

The "Flash Mass Storage" functional block illustrated in FIG. 18 may be embodied in or comprise the data store 143 described above with reference to FIG. 1. In that regard, data store 143 may be embodied in or include Flash memory or other EEPROM or non-volatile storage medium. A suitable interface, such as data store interface 145 in FIG. 1 (not shown in FIG. 18), may employ a protocol that is necessary or desirable to allow compute array 142 and algorithm program logic 1890 to communicate with (e.g., manage read and write access to) data store 143 as is generally known in the art.

The "Firmware Workspace" components illustrated in FIGS. 18 and 19 may be identical, similar, or analogous to node memory 144 described above with specific reference to FIGS. 1 and 4. In that regard, node memory 144 may be implemented as or comprise DDR4 RAM or other volatile or non-volatile memory suitable to support operations of node 1800 or 1900, in general, and processing system 148, in particular. As noted above, node memory 144 may be employed to support algorithm execution in some compute-intensive situations. It may be desirable or useful in certain circumstances that node memory 144 comprise, or at least have access to, dedicated or predetermined addresses or blocks of memory (such as algorithm memory 1841) that may be used, e.g., in an "on demand" or "ad hoc" manner, as processing loads or bandwidth requirements dictate as set forth below.

In that regard, algorithm memory 1841 may be implemented as pre-allocated addresses, blocks, or sectors of node memory 144, for instance, or it may be dynamically allocated on an "as available" basis as processing requirements vary over time. The latter approach may not reserve or pre-allocate large chunks of node memory 144 when it is not needed, but may also ensure that sufficient algorithm memory 1841 may be available to support complex computational tasks. In the illustrated examples, algorithm memory 1841 may generally comprise resource-specific data storage cells or memory locations (such as the FP tables 454n, algorithm buffers 456n, and FP buffers 458n illustrated in FIG. 4), and may generally be operative to store data and instructions necessary or desirable for processing system 148 to perform write/read/execute operations in support of programmable logic block 410 as is generally known.

Those of skill in the art will appreciate that the present disclosure is not intended to be limited to any particular memory management techniques that may enable or facilitate allocation of algorithm memory 1841 in the context of using node memory 144 in connection with particular drivers, memory controllers, or address allocation methodologies.

In the illustrated architectures, processing system 148 (which may be similar or analogous to processing system 148 of FIGS. 1 and 4) may generally handle read/write commands and other memory access with respect to data store 143 (e.g., via a suitable data store interface), receive and act upon interrupt requests (e.g., with respect to operations executing at compute array 142), and regulate, control, or otherwise influence intra-node data transfers across the various components of nodes 1800 and 1900. For instance, in one embodiment described above, processing system 148 may comprise a set of one or more data processing elements or hardware components to manage all interrupt handling as well as AXI or other intra-node data transfers, on the one hand, and a different set of one or more processing components to manage general system administration (or "housekeeping") and management tasks for a node 1800, 1900 as well as algorithm execution support for compute array 142, on the other hand. While aspects of this implementation are described above with reference to FIG. 4, FIGS. 18 and 19 illustrate that different component arrangements and task distributions are within the scope and contemplation of the disclosed subject matter.

As depicted in FIGS. 18 and 19, processing system 148 may comprise processors 439 (or processing "cores") such as described above as well as additional processing cores 1871 that may be used for algorithm processing or execution support as set forth in more detail below. In that regard, processors 1871 may be analogous to (or implemented in addition to) processors 439c and 439d in FIG. 4, and may generally be embodied in or comprise digital processing hardware and firmware that is similar to or identical to that employed in processors 439, though it may be desirable in some instances to use different hardware having different processing capabilities or operational characteristics for processors 1871 as compared to processors 439, particularly in the case where processors 1871 are dedicated to algorithm execution support (as opposed to a situation where a generic core may be used for algorithm execution only on a part-time or as needed basis). It is noted that bus structures, power sources, controllers, internal memory, and other attendant and supporting hardware and communications paths have been omitted from FIGS. 18 and 19 for clarity. Processors 1871 may be implemented as or generally comprise a microprocessor, a multi-core microprocessor, a microcontroller, an FPGA, a PLC, a PLU, or some similar or analogous hardware component suitable for data processing as is generally known in the art and described above with reference to processors 439.

In operation, processors 439 and 1871 may be responsible for a variety of tasks which, under some circumstances, may be requested or required by processors 432a and 432b (see FIG. 4), or which may be initiated autonomously or otherwise without direction from external components. In various implementations, processors 439 and 1871 may perform some or all of the following functions, or a subset thereof, as requirements of system 100, in general, or node 1800, 1900, dictate: data transformation and storage (e.g., with respect to node memory 144, memory store 143, or both); data dispatch for write/read operations (again, with respect to node memory 144, memory store 143, or both); command interpretation and execution (e.g., with respect to data processing and algorithm execution); algorithm load and compute; and memory exception handling. Those of skill in the art will appreciate that various other functions may be assigned to or attributable to processing system 148 as a function of desired operability of node 1800, 1900, and that any of numerous hardware arrangements, computing architectures, and distributed processing resources may be employed at processing system 148 to enable its functionality in the context of supporting desired capabilities of node 1800, 1900. Specifically, processors 1871 may be dedicated (either on a full-time or as needed basis) to support the algorithm execution functionality described in more detail below.

Further, and to support algorithm execution functionality as necessary or desired, processing system 148 may additionally comprise or have access to a memory component 1870. Memory component 1870 may be dedicated to facilitate processing system 148 functionality, and may be embodied in or comprise an Embedded Multimedia Card (EMMC) firmware Flash device or other EEPROM or non-volatile storage medium. By redirecting read/write operations from node memory 144 to a more local and dedicated memory component 1870 for computationally intensive algorithm execution operations, processing system 148 may realize performance advantages in high-demand applications.

As with the FIG. 4 approach, programmable logic block 410 is illustrated in FIGS. 18 and 19 as generally comprising a compute array 142 or algorithm framework, which may in some instances be communicatively coupled to data store 143 by a suitable hardware interface (such as storage interface component 411n in FIG. 4) that is omitted from FIG. 18 for clarity. Aspects of the interoperability of programmable logic block 410 and data store 143 are described above with reference to FIG. 4, and it is noted that the FIG. 18 arrangement is not intended to be limited to any particular memory controller or communications protocol.

In the implementations of FIGS. 18 and 19, compute array 142 is depicted as further comprising or embodying an algorithm program logic functional block (or "APL," reference numeral 1890). As noted above, compute array 142 may employ or comprise any of various commercial embodiments of an FPGA that may be selected in accordance with any of a number of factors or boundaries conditions that are typical in electronics design. In this case, compute array 142 may be selected to accommodate operation of APL 1890 as described below, as well as to support other required or desired functionality of compute node 1800, 1900.

In operation, processing system 148 may cooperate with programmable logic block 410 for data transfer and read/write operations with respect to data store 143 (FIG. 18) or, more generally, to support algorithm execution at node 1800, 1900.

Figure 20:
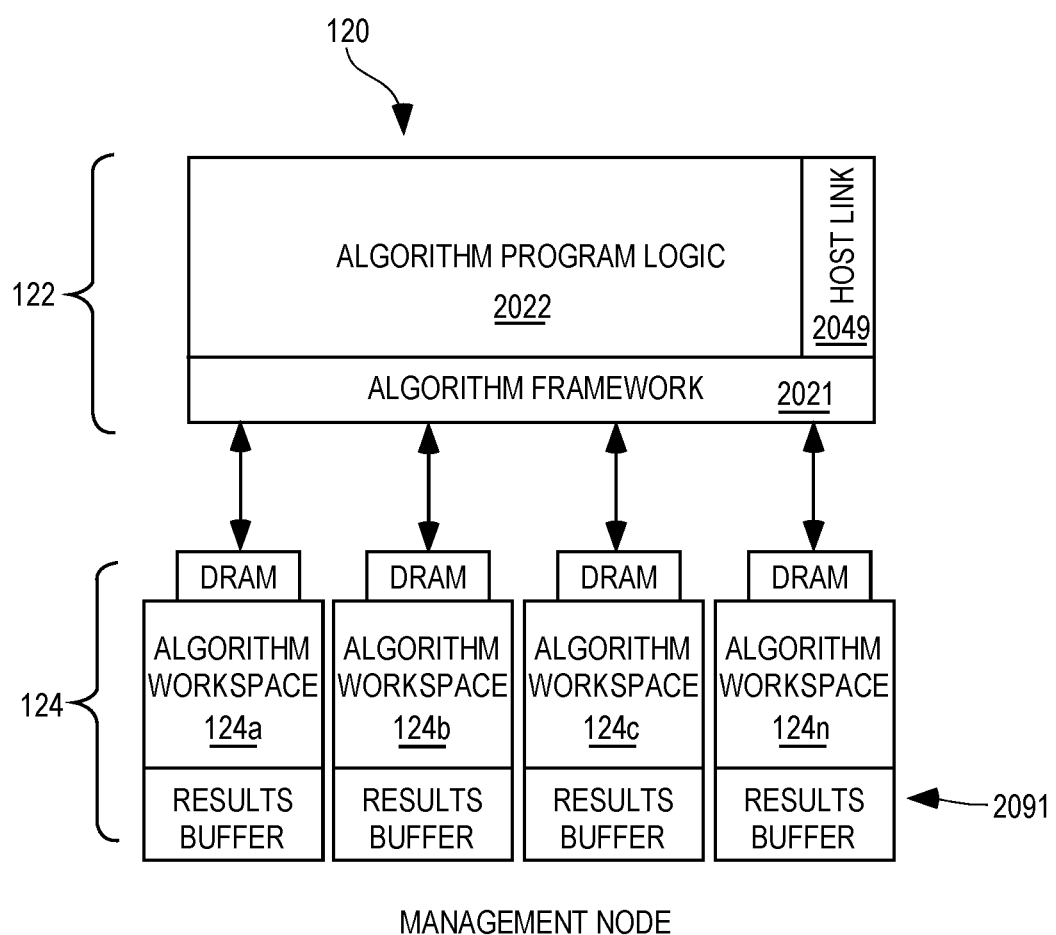
FIG. 20 is a functional block diagram illustrating components of an implementation of a management node having utility in connection with a data processing and analytics system.

FIG. 20 is a functional block diagram illustrating components of an implementation of a management node having utility in connection with a data processing and analytics system. A management node 2000 such as depicted in FIG. 20 may be one implementation of router module 120 such as described above with reference to FIG. 1. In that regard, management node 2000 may generally comprise a router 122 portion, a router memory 124 portion (which, as noted above, may include one or more router memory components 124a, 124b, 124c, . . . 124n), and one or more node interfaces or communications links (not illustrated, but described above with reference to FIG. 1). It is noted that attendant power supplies, bus structures, and memory controller elements are omitted from FIG. 20 for clarity, but are well-known in the art.

Management node 2000, in general, may also include a host interface 126 to communicate with a host compute system 199. As set forth above, host interface 126 may be operative in accordance with PCI or PCIe hardware and associated communications protocols such as Ethernet™, SATA, or other suitable communications technologies. The specific hardware and communication strategy embodied by or incorporated into host interface 126 may be selected in accordance with bandwidth requirements, cooperating hardware at host compute system 199, functionality and operational characteristics of router 122 portion of management node 2000, or a combination of these and a variety of other factors.

As set forth above with reference to router module 120, one or more node interfaces or communications links may be implemented as a network interface card, a wireless or inductive hardware component, or a communications port, jack, or plug, for instance, and may enable router 122 portion of management node 2000 to communicate with a respective compute node 140, 1800, and 1900 as is generally known in the art. In use, router 122 portion may be operable to transmit data packets between host compute system 199 (via host interface 126) and a respective compute node 140, 1800, 1900 (via an appropriate node interface) in cooperation with routing information (destination address, packet header data, flood domains, etc.) and other short term data (look up tables, resource availability, performance or load balancing data, etc.) stored in or accessible by router memory 124 portion. Router memory 124 portion may be embodied in or comprise, by way of example, volatile memory such as RAM, SRAM, DRAM, DDR RAM, and the like. Router memory 124 portion, in general, or individual memory components such as 124a-124n, in particular, may employ dedicated or dynamically allocated memory storage areas or buffers (such as result buffers 2091) to support algorithm processing in high-demand applications. As noted above, the disclosed subject matter is not to be limited to any particular memory management or resource allocation strategy, as many techniques and hardware architectures may be employed to facilitate the functionality described herein.

In one implementation, router 122 portion may execute all routing functionality (such as described above with reference to FIG. 1) using, or in cooperation with, algorithm program logic (APL) 2022 embedded in an algorithm hardware and/or firmware framework 2021. As with APL 1890 described above, APL 2022 may employ or comprise any of various commercial embodiments of an FPGA that may be selected in accordance with any of a number of factors or design choices. In this case, APL 2022 may be selected to accommodate operation of node 2000 in connection with algorithm processing as described below, in addition to support other required or desired functionality of router 122 portion set forth above. As many types of hardware implementations are generally available, the structure and operation of router 122 portion and router memory 124 portion of management node 2000 are not described further.

Figure 21:
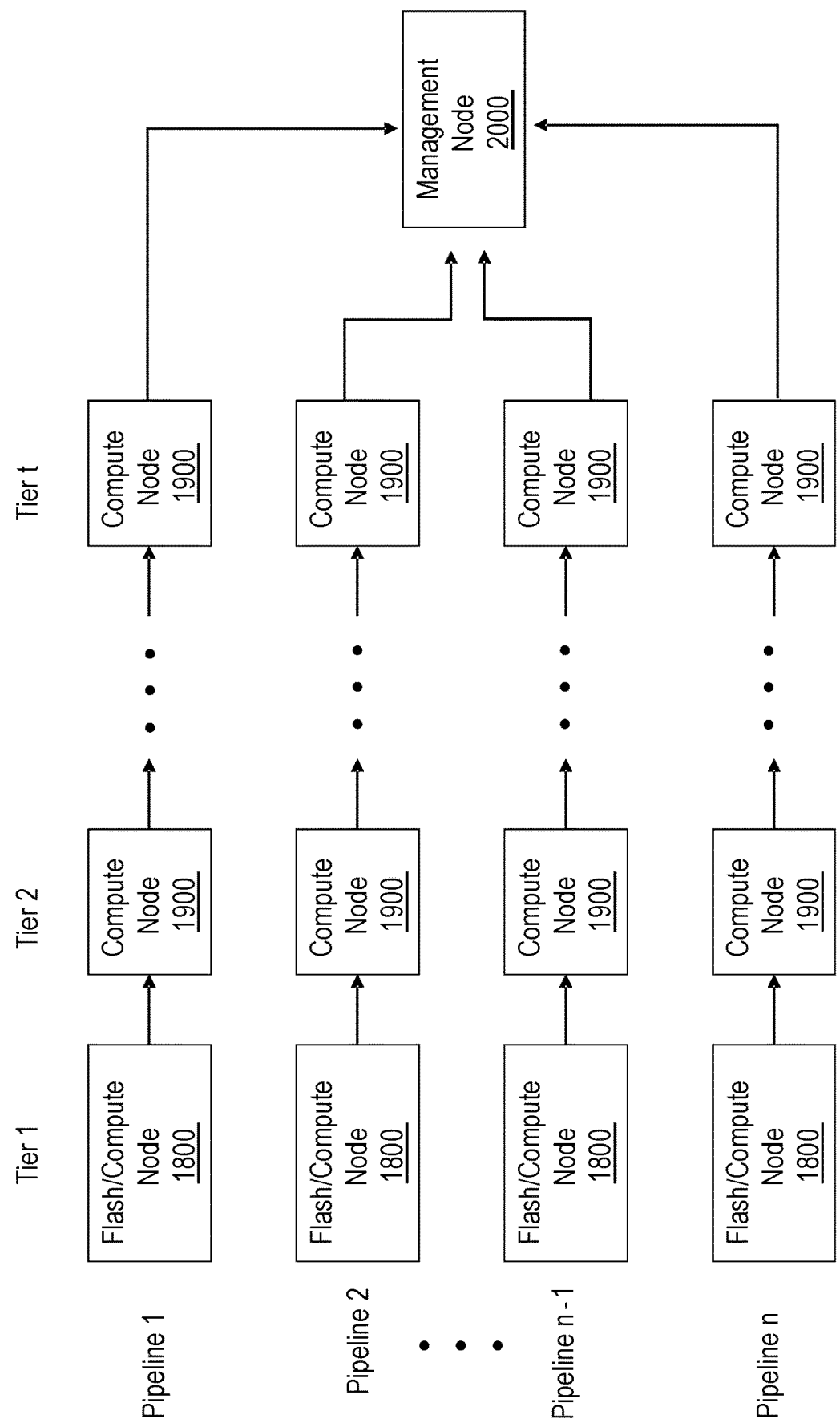
FIG. 21 is a functional block diagram illustrating one implementation of an algorithm processing system using a management node.

FIG. 21 is a functional block diagram illustrating one implementation of an algorithm processing system using a management node. FIG. 21 depicts one arrangement utilizing a matrix (of size n×t) of distributed processing resources, wherein the matrix comprises an arbitrary number of processing pipelines (1, 2, . . . n), each of which includes an arbitrary number of processing tiers (1, 2, . . . t). Other arrangements, for instance, in which the pipelines do not have the same number of tiers, may also be employed in some circumstances as a design choice or as a function of computational requirements or other system parameters. In some implementations, the number of pipelines may be limited to four, eight, or sixteen, for example, depending upon the nature and operational characteristics of the nodes 140, 1800, 1900, and 2000, for instance, or in accordance with processing capabilities, power consumption, size requirements, economic, or other constraints.

As illustrated in FIG. 21, each processing pipeline (1 through n) may employ a Flash/Compute node 1800 at tier 1 (in some of the description that follows, such a Flash/Compute node 1800 may be referred to as a "memory-supported" compute node, owing to the fact that it has access to, or may incorporate, memory store 143). In some implementations, the tier 1 node 1800 in each pipeline is assigned a particular algorithm processing operation, and may use an associated memory store 143 to support such an assigned operation. To facilitate such processing, however, in addition to making use of available local resources and processing capabilities, node 1800 may employ (e.g., via delegation of tasks, passing of interim results, or using alternative resources downstream in its particular pipeline) additional resources in downstream tiers (tiers 2 through t, for example). In the example illustrated in FIG. 21, each pipeline employs Compute nodes 1900 in tiers 2 through t; as noted above, each node 1900 may omit on-board or accessible memory stores 143, while still having computational capabilities sufficient to support activities delegated or requested by a respective upstream node 1800 (or node 1900, as the case may be) in its particular pipeline. It will be appreciated that a node 1900 at a particular tier in a particular pipeline may be replaced with or supplemented by a node 1800 having access to memory store 143 where desirable or appropriate for a given application or system configuration. Further, it is noted that FIG. 21 has been simplified to show only a single set of slaved, serialized Compute nodes 1900 per Flash/Compute node 1800 in a particular pipeline; this may not always be the case, as a single Flash/Compute node 1800 may support multiple, parallel pipelines of Compute nodes 1900 in some circumstances, depending upon, for example, the nature, operational characteristics, and bandwidth of the communications links 149 employed, the sophistication of compute arrays or algorithm frameworks 142, 2021 and their respective encodings, or a combination of these and a variety of other system parameters.

At the terminus of each processing pipeline, a terminal node (i.e., at tier t in FIG. 21) may provide results to a management node 2000 as illustrated in FIG. 21. Though the illustrated arrangement depicts each respective pipeline feeding results to a single management node 2000, other possibilities are contemplated. Similarly, the management node 2000 at the terminus of each pipeline may be the same management node 2000 that originally assigned the processing tasks to the Flash/Compute nodes 1800 at tier 1 of the pipelines, or it may also be a different management node 2000 in other applications or hardware architectures.

FIG. 22 is a functional flow diagram illustrating aspects of one implementation of a method of executing data processing operations. As indicated in FIG. 22, one method of executing an algorithm in a distributed processing compute environment may begin by providing an initiating compute node comprising a memory store and a first node memory (see block 2201). In one such implementation, an initiating node may be embodied in or comprise a Flash/Compute node 1800 at tier 1 of a pipeline as described above with reference to FIGS. 18 and 21. This initiating compute node may engage in bi-directional data communication with a host compute system 199 substantially as set forth above.

A method may continue, as indicated a block 2202, by serially coupling one or more additional compute nodes to the initiating compute node to establish an execution pipeline comprising the initiating compute node and the one or more additional compute nodes, each respective one of the one or more additional compute nodes comprising a respective second node memory. In some implementations, the one or more additional compute nodes may not include or have access to a memory store; in such circumstances, these additional compute nodes may be embodied in or comprise Compute nodes 1900 such as those described above with reference to FIGS. 19 and 21 or similar hardware constructs.

The execution pipeline may be initiated by loading a bit stream comprising an instruction set related to execution of the algorithm into a respective programmable logic space of each respective compute node in the execution pipeline (block 2203). As noted above, loading a bit stream into each compute node responsible for execution of the algorithm may be desirable in many instances, providing efficiencies and increasing data flow through a particular pipelined architecture. In that regard, it is noted that information in the bit stream may be used in several operations depicted in FIG. 22, as well as in other methods operative in accordance with the disclosed subject matter.

For algorithm processing, a method may continue with executing a first operation associated with the algorithm at the initiating node using information in the bit stream and data retrieved from the memory store, and passing results of the first operation to a first additional compute node in the execution pipeline (block 2204). As noted above, some implementations may execute this functionality without storing the results of the first operation in the first node memory.

As described above with specific reference to FIG. 21, the first additional compute node and each subsequent additional compute node in the execution pipeline may execute a respective additional operation associated with the algorithm using information in the bit stream and results of a respective preceding operation, and may then pass respective additional results of the respective additional operation to a next additional compute node in the execution pipeline (block 2205). As with block 2204, in some circumstances, it may be desirable that the operations depicted at block 2205 occur without storing the additional results in the respective second node memory of each respective additional compute node.

In accordance with the disclosed subject matter, a method may conclude by terminating execution of the algorithm at a management node that receives the additional results from a terminal additional compute node in the execution pipeline, the terminating comprising executing a final operation to produce a final result of the algorithm (block 2206). The management node may be embodied in or comprise a Management node 2000 substantially as described above with reference to FIGS. 20 and 21, and may execute the functionality described above.

As with FIGS. 16 and 17, the arrangement of the blocks and the order of operations depicted in FIG. 22 are not intended to exclude other alternatives or options. For example, it will be appreciated that in accordance with one embodiment, the operations depicted at blocks 2201 and 2202 may be executed substantially simultaneously, or may be integrated into a single operation. As another example, the operation depicted at block 2203 may be executed concomitantly with the operations at block 2201, 2202, or both, where compute nodes are selected in real-time or near real-time as a function of execution requirements, for example, which may be determined by the sophistication of the bit stream. Further, those of skill in the art will appreciate that the operations depicted at blocks 2204 and 2205 may occur substantially simultaneously, as a subsequent or downstream compute node is executing a next step while one or more upstream nodes are executing preceding steps in an algorithm processing operation. These and other such alternatives may readily be effectuated without materially impacting results of the method or the functionality of any particular hardware implementation utilized to execute the method. In addition to the alternatives set forth in detail above, various design choices that may influence the order or arrangement of the operations depicted in FIG. 22 will be readily apparent to those of skill in the art.

Those of skill in the art will appreciate that the foregoing distributed processing system may be particularly suited to complex algorithm processing operations, and that the platform architecture may provide performance and efficiency advantages in many applications. In particular, the disclosed subject matter may have utility in connection with a pipeline architecture machine in accordance with which algorithm execution parameters may be programmed as processing pipelines using various facilities implemented in hardware and firmware resident at or accessible by the nodes 140, 1800, 1900, and 2000 described herein. In some implementations, for example, data may be streamed from a memory component (such as memory store 143) into an execution pipeline (such as depicted in FIG. 21) generally at the maximum clock rate of the algorithm framework 142, 2021 processing components that form or support the nodes in the pipeline.

As set forth above, an aspect of the disclosed subject matter that facilitates implementing an algorithm to execute in a particular processing node is the compute array or algorithm framework integrated into the programmable logic 410 space (see FIGS. 4 and 18-20) of the Flash/Compute nodes 140, 1800, or, when a module or card (see FIGS. 3B and 3C) is so configured, its Compute nodes 1900 or management node 2000. As noted above, nodes 1900 and 2000 may simply be implemented as Flash/Compute nodes 140, 1800 with no memory store 143 component, and the former may serve in such an arrangement as additional compute accelerators.

In operation of an algorithm processing application, most single pass algorithms may be distributed as binary bit streams to be loaded and executed in the programmable logic 410 space of one or more nodes 1800 (see FIGS. 4 and 18). More complex algorithms may also utilize other facilities or resources of a particular node or a combination of nodes (140, 1800, 1900, or 2000) such as is illustrated in the pipelines of FIG. 21. These other facilities or resources may include: programmable logic 2022 space of a management node 2000; node memory 144 at nodes 1800, 1900, router memory 124 at node 2000, or both; one of more processors 439, 1871 at a node 1800, 1900; or a combination of the foregoing or other resources.

Thus, to execute a given algorithm, a bit stream loaded into each node 1800, 1900 may also be accompanied by a bit stream for a management node 2000 that may be tasked with overseeing or managing the relevant or related pipeline (see FIG. 21) and/or executable code to be processed by a local processing system 148, 430. Whether implemented by a single node based bit stream or by a more complex combination of node 1800, 1900 and management node 2000 facilities, all algorithms may be managed by firmware and a proprietary algorithm framework (PAF) code that is part of every bit stream and complements an algorithm's specific bit stream in the programmable logic 410, 2022 space in a given node. For example, FIG. 20 illustrates some functional blocks of a management node 2000 and its facilities, including APL 2022 integrated with or embedded in algorithm framework 2021. These facilities may be operative in accordance with the present disclosure to support the functionality described herein, as will be appreciated by those of skill in the art.

From an application programmer point of view, the complexities of this approach to algorithm processing may be completely ignored. In that regard, application programmers may simply specify the algorithm to be executed, provide parameters for the algorithm (including the name and selection criteria for the dataset upon which the algorithm is to be executed), and request execution. It is noted that an application programmer may also identify datasets that are related to the named dataset, or that the disclosed algorithm execution methodologies may identify such related datasets without input, depending upon the manner in which the datasets are identified as related in the memory store paradigm. In this manner, a single instantiation of an algorithm execution process may operate on multiple datasets efficiently and without undue programming or experimentation on the part of the application programmer. The facilities or system resources used or required by that algorithm, how nodes 140, 1800, 1900, and 2000 may interact to access data and to execute the algorithm, how much memory is required or where the appropriate memory hardware resides, and other functional and operational details may be entirely transparent to application programmers.

Some use cases are provided below.

In the context of the present disclosure, the term "Level 1" algorithm is intended to mean an algorithm that may be implemented in accordance with the present system and method using just the programmable logic 410 space of one or more Flash/Compute nodes 140, 1800 (i.e., those nodes incorporating or having access to a memory store 143). These Level 1 algorithms may make use of a single processing pipeline (say, pipeline n–1 in FIG. 21), which may be replicated and executed in parallel across a plurality of nodes 140, 1800 in the pipeline. A Level 1 algorithm may be complex, large (in terms of number of execution steps), or both; a Level 1 algorithm may even be recursive, but it may generally be characterized by the fact that it has little or no need for intermediate data storage. With the foregoing as context, it will be appreciated that a Level 1 algorithm may interface with a memory store 143 and return results via the PAF (e.g., compute array 142 in FIGS. 4 and 18) under the control of firmware resident in the programmable logic 410 space.

Examples of such Level 1 algorithms are: basic mathematics and statistics functions such as min, max, average, etc.; complex data searches and selections; and more complex mathematical computations such as Fast Fourier Transforms and the like.

In the context of the present disclosure, the term "Level 2" algorithm is intended to mean an algorithm that generally requires one or more blocks of significant amounts of data storage for intermediate results between the various steps in an associated processing pipeline. It is noted that "significant amounts" of data storage may vary as a function of overall processing requirements, hardware capabilities, throughput or bandwidth thresholds, and other system parameters. In that regard, a typical Level 2 algorithm may be characterized as such because, in order to satisfy or to exceed some performance threshold or processing bandwidth requirement, which may be pre-determined or dynamically calculated or adjusted, the algorithm must or beneficially should: pass intermediate results to slaved nodes 1900; store those intermediate results in a temporary data store for use in connection with subsequent steps within the overall algorithm execution; or both. Specifically, a Level 2 algorithm in this context may be characterized as a series of execution layers in which each execution layer essentially operates on a Level 1 algorithm, the output (e.g., a significant quantity of data) of which is necessary for operations to occur at a subsequent execution layer. In accordance with the disclosed subject matter, such Level 2 algorithms may be executed in a variety of ways.

In one implementation, for example, a Level 2 algorithm may be approached as a series of simple (i.e., Level 1) algorithms stored within the programmable logic 410 space of a Flash/Compute node 140, 1800, each of which may be configured and operative to feed its output into node memory 144 (of the associated node 140, 1800); the input for each such simple algorithm at each tier in a particular pipeline may be stored results read from either the associated memory store 143 or the node memory 144 at a previous layer (i.e., from the node 140, 1800 in a preceding tier in the pipeline).

As another example of implementation, a Level 2 algorithm may be approached as a series of simple algorithms stored with the programmable logic 410 space of a Flash/Compute node 140, 1800, and also stored in the programmable logic 410 space of one or more Compute nodes 1900; in this embodiment (illustrated in FIG. 21), each node 1800, 1900 may feed intermediate results or data to the next to form a pipeline. Each node 1900 in a particular pipeline may be slaved to the node 140, 1800 at tier 1, and each particular pipeline may ultimately terminate at the APL 2022 of a management node 2000. The final result of the algorithm execution may be computed (e.g., at management node 2000) and returned to a host compute system 199. In this case, instead of writing intermediate results to short-term storage (e.g., at node memory 144), such results may be transmitted or handed off by the $i-1^{th}$ node (1800, 1900, as the case may be) to the $i^{th}$ node in the slaved pipeline (see FIG. 21). As the cascade of intermediate results propagates through the pipeline, the tier 1 node 1800, for example, may then accept the next data element(s) (and any additional arguments) from data store 143 (or its equivalent) while the tier 2 node 1900 continues to execute concomitantly or substantially simultaneously, ultimately passing its output to the tier 3 node 1900 in the pipeline, whereupon the tier 2 node 1900 may then be ready to accept the next input from the initiating tier 1 node 1800, and so on. The terminal node in a given pipeline (e.g., the tier t node 1900 in FIG. 21) may finally pass or transmit its results to the management node 2000 for any final computation steps (e.g., using APL 2022), after which a final result may be buffered for returned to host compute system 199, and each relevant tier 1 node 1800 may be notified that a result is ready to be returned.

One example of a Level 2 algorithm as contemplated herein is a common inference algorithm for a neural network executing under TensorFlow™ (an open-source platform for machine learning, artificial intelligence training, and the like). As is generally known in the art, neural networks are typically organized into layers (or tiers): all the neurons (or nodes) in a given tier are tasked with executing processing operations using both input data for that tier (and per node, as directed by the network) and a coefficient (as supplied by the network) for each node in the tier. The output data or results of the inference processing operations at each node may be quite large; typically, these data are transmitted or fed to the next subsequent tier downstream in the processing pipeline, after which they may be discarded by the node transmitting the results. The final or terminal tier's output (or a computation based upon output from all the nodes in the terminal tier) is the result of the inference, and may be returned to the application that requested the inference that instantiated the algorithm processing in the first place. In essence, then, the basic TensorFlow computational element may be considered a Level 1 algorithm that accepts primarily two inputs or arguments: a coefficient which is computed from results of original training of the particular relevant neural network; and an element of data, which is either taken from (in the case of the first layer or tier of the neural network) the dataset that is the target of the inference process, or from (in the case of a subsequent layer or tier of the neural network) output data from a previous tier in the neural network.

In the context of the present computing architecture such as illustrated in FIGS. 1 and 4, for instance, the foregoing pipelined processing methodologies may be implemented to run exclusively within a series of Flash/Compute nodes 140, 1800, for example, by storing intermediate results from processing within a given tier in node memory 144 of an applicable node 140, 1800. While this approach may achieve satisfactory performance for most applications, it may not achieve the best possible performance for computationally expensive pipelined processing since it may not, under certain circumstances, fully leverage a particular node's (or tier's) available assets. For example, since the executable code (in compute array 142 and processing system 148, for instance) must store and retrieve intermediate results from node memory 144, the streaming capabilities of the architecture may not be optimized to achieve maximum throughput, as reads from data store 143 must wait during node memory 144 access cycles. As noted above, in many processing scenarios, even in a Big Data context involving high performance computing and massive datasets, the architecture illustrated in FIGS. 1 and 4 may be adequate to provide sufficient performance and data throughput rates. For applications in which performance and data throughput are critical, however, it may be desirable to combine a Flash/Compute node 140, 1800 with a Compute node 1900, for example, such as in the architecture illustrated in FIG. 21.

As noted above with reference to FIG. 19, some embodiments of a Compute node 1900 may omit data store 143. In addition to economizing on silicon real estate, power consumption, manufacturing costs, and the like, utilization of node 1900 may enable or facilitate implementation of an overall system architecture that resembles that depicted in FIG. 21. Such a system architecture or hardware arrangement may link a single, particular Flash/Compute node 1800 (which does incorporate or have access to memory store 143) to a pipeline of serially coupled Compute nodes 1900, each of which may be uniquely associated with that particular Flash/Compute node 1800. In the FIG. 21 example, tier 1 comprises node 1800 (i.e., the "initiating node"), and every successive tier (2, 3, . . . t) comprises a node 1900. The illustrated architecture, where appropriately coded and leveraged to increase or to maximize data throughput, may have particular utility in connection with neural network processing operations.

In the context of processing the TensorFlow inference algorithm in connection with this hardware architecture, for example, for all nodes in a particular pipeline, the same bit stream implementing the algorithm may be loaded into the programmable logic 410 space of each node 1900, in addition to the programmable logic 410 space of Flash/Compute node 140, 1800. In some implementations, there may be minor differences in the data supplied to node 1800 as compared to those supplied to nodes 1900 in a particular pipeline. For instance, Flash/Compute node 140, 1800 may be programmed not to use its node memory 144 in connection with executing the algorithm, whereas each Compute node 1900 may be instructed or coded to do so before passing or transmitting its output to the next Compute node 1900 in the pipeline. These and any other desired operational parameters may be communicated to nodes 1800, 1900 via the bit stream.

In operation, the tier 1 initiating Flash/Compute node 1800 may retrieve input for the algorithm processing operation (e.g., from memory store 143), execute required or desired computations for the first layer in the neural network, and transmit computational results or output data to the first Compute node 1900 in the pipeline. Once such computational results or output data are received from the initiating tier 1 node, the first Compute node 1900 in the pipeline (in this case, at tier 2), may begin processing operations at the next layer in the neural network; meanwhile, back at the tier 1 Flash/Compute node 1800, the next element of data to be used as input for the next algorithm processing operation may be retrieved (e.g., from memory store 143) such that Flash/Compute node 1800 may already be executing the next subsequent required or desired computations or processing operations. Data processing responsibilities may propagate downstream through the pipeline, along with output from the previous tier, substantially as illustrated and described above with reference to FIG. 21.

Each Compute node 1900 in a particular pipeline may handle one or more layers of processing in the given algorithm. Eventually, upon completion of processing at a particular Compute node 1900 in a particular tier of the pipeline, that particular Compute node 1900 may then pass output to the next Compute node 1900 in the next subsequent tier. Those of skill in the art will appreciate that the number of layers for a particular algorithm that may be computed by a given Compute node 1900 in a particular pipeline may depend upon the coding provided in the bit stream, the complexity and structure of the neural network (including the overall architecture, pipeline length, specific implementations of nodes 1800, 1900, bandwidth of the communications links 149, read/write performance of node memory 144 or memory store 143, and the like), sophistication of the algorithm being processed, or a combination of these and other factors. In that regard, the number of Compute nodes 1900 employed in a given pipeline may also depend upon the complexity and structure of the neural network in the context of some or all of the factors listed above. In some instances, it may be useful to balance the ratio of layers (of algorithm processing) per Compute node 1900 with the number of Compute nodes 1900 in a given architecture in such a manner that the associated Flash/Compute node 1800 in a given pipeline may continue to accept data streamed from memory store 143 without needing to stall the read process.

As noted above, the terminal Compute node 1900 (e.g., at tier t in FIG. 21) in a particular pipeline may transmit its data to a management node 2000; in some implementations, such a management node 2000 may also be supplied with a copy of the algorithm bit stream that instantiated the processing operations in the first place. In operation, management node 2000 generally may execute the final layer (or final several layers) of computation required by the algorithm to produce a result. In some implementations, it may be desirable that a management node 2000 comprises four independent channels to router memory 124; this architecture may enable a four-way parallel computation, for example, such that a given management node 2000 may support up to four pipelines. This is illustrated in FIG. 21, which has been simplified to show only a single set of slaved, serialized Compute nodes 1900 per Flash/Compute node 1800. Other embodiments comprising multiple pipelines per Flash/Compute node 1800 are contemplated as set forth above, and may be implemented as a design choice or as a function of overall system throughput requirements.

In operation, management node 2000 may buffer computational results or algorithm output for return to host compute system 199 when appropriate or required. When resources at management node 2000 are taxed or reach a capacity threshold that may be pre-determined or dynamically computed or adjusted (e.g., when result buffers 2091 are full or exceed a threshold or other pre-determined or dynamically computed limit), management node 2000 may signal the algorithm initiating nodes 140, 1800 under its control that computed results are ready for transmission. In some embodiments, one or more applicable Flash/Compute nodes 140, 1800 may initiate the return, e.g., by commanding or instructing management node 2000 to transmit buffered results to host compute system 199; alternatively, management node 2000 may initiate such a data transfer in accordance with coded instructions, e.g., unbidden or otherwise without instructions or requests supplied by any other system component.

The following description addresses certain hardware and functional details of some of the system components and implementations described above. In that regard, recall that FIGS. 2A through 2C are functional block diagrams illustrating one example of a hardware environment accommodating components of a data processing and analytics system. These hardware environments may be referred to as "cards" in some instances, such as in the description of FIGS. 2A through 2C; additionally, those of skill in the art will appreciate that such cards may also be referred to as "modules" in some industries or for some applications. In the description that follows, the term "module" may be used as a synonym for "card" as that term is used in reference to FIGS. 2A through 2C.

Program Logic 410 Space

In some implementations, a single implementation of a card or module may generally comprise two types of FPGAs or processing components.

The first may be embodied in or comprise a straightforward FPGA or other processing component that handles all the functionality of a management node 2000 (FIG. 20) or router module 120 (FIG. 1) set forth above. In the illustrated implementations, there is only one such processing component per module. To accommodate the described functionality, this processing component (for example, algorithm framework 2021 in router 122 portion) may comprise or incorporate a large (in terms of overall silicon real estate or area) programmable logic space (such as APL 2022, for instance) and a large number of I/O lanes. In operation, this FPGA or processing component may generally implement appropriate protocols for messaging to/from the host compute system 199, vector messaging to/from pipelined nodes 140, 1800, and 1900, and other routing and housekeeping functionality substantially as described above.

The second is an FPGA or other processing component that may generally be implemented as a Multi-Processor System on a Chip (MPSoC). In the illustrated embodiments, every module comprises at least one of these; in some embodiments such as described above, a module or card may comprise eight of such processing components, which may operate in parallel (though other configurations are also possible, and may reflect design choices, cost constraints, desired processing characteristics, and the like). In embodiments, each such processing component includes a reasonably large programmable logic 410 space, four or more (e.g., 64 bit) processors or cores 439, two or more (e.g., 32 bit) processors or cores 432, and a sufficient number of I/O lanes to enable both communications with a management node 2000 via communications links 149 as well as high speed connections to node memory 144 and memory store 143 elements, if applicable. Note that some nodes 1900 may also employ the same or similar processing components, but do not need to implement a connection to a memory store 143 component.

Within each type of FPGA or processing component, an algorithm's use of the available resources while residing in the programmable logic 410 space may be managed by the algorithm framework (142 in FIGS. 18 and 19 or 2021 in FIG. 20). In accordance with some methodologies, other than restrictions imposed by the algorithm framework 142, 2021, an algorithm may be configured and operative to use any or all available logic within the programmable logic space.

In operation, local firmware (e.g., executing on one of more of the embedded processors 439, 1871) may initialize the programmable logic 410 space upon system boot or as otherwise requested, and may then load a "golden image" or template containing the appropriate or requested algorithm framework 142, 2021. Once loaded and initialized as is generally known, the local firmware may then load and execute algorithms or attendant or associated instruction sets as dictated by messages received from the host compute system 199.

Algorithm Framework 142, 2021

The algorithm framework 142, 2021 may generally provide two basic categories of services: system utilities; and a data selection engine.

In some implementations, system utilities may generally include the following: communications link 149 messaging system protocols and support; control of access (i.e., driver support, controller functionality, etc.) to node memory 144 and memory store 143 elements, if applicable; data movers (described above) that may queue and initiate read/write activities for node memory 144 and memory store 143 elements, if applicable; start/stop/resume control for algorithm execution processes; and management of any unhandled condition (such as interrupts and the like) arising from algorithm processing operations.

In some implementations, data selection engine services may be requested or utilized in cooperation with the data movers, for instance, to implement a flexible selection capability when an algorithm operates on only a subset of data from a target dataset. For example, selections of targeted portions or subsets of data may be made using any of a variety of fields in a dataset, irrespective of whether those particular data are from the fields on which a particular algorithm will ultimately be operating. In such cases, selection of specific subsets of data may be based upon specific fields in the target dataset, fields in a different dataset that includes indices to the target dataset, both, or a combination of these and other factors or system parameters related to or arising from the applicable algorithm and processing boundary conditions. It is noted that co-location of data or datasets, as well as providing an option for a particular algorithm to execute on multiple datasets, complement these features and may result in increased computational and data access efficiencies in may applications.

In some embodiments, it may be desirable that the only permitted interaction between algorithms and the algorithm framework facilities of a node 1800, 1900 may be via the algorithm framework 142, 2021 hardware and firmware implementation. In accordance with the disclosed subject matter, this restricted permission paradigm may be a deliberate design choice, as the algorithm framework 142, 2021 may be responsible for preventing algorithms and the constituent hardware and firmware components from corrupting system data and user data maintained in node memory 144 and memory store 143, if applicable. Other alternative embodiments may not be so restricted, however, as will be appreciated by those of skill in the art.

Node Memory 144

The majority of node memory 144 located on or accessible by a Flash/Compute node 142, 1800 may be dedicated to or otherwise used for managing access to memory store 143, as well as for storing system information required by local firmware that manages operation and overall functionality of the node 142, 1800. Even in light of the foregoing, however, several gigabytes (or more, in some implementations) of node memory 144 may be available for use by Level 2 algorithms, if needed (this is represented by reference numeral 1841 in FIG. 18). Access to such algorithm memory 1841 may be achieved via the PAF or via interaction with one or more cores 439 or 1871.

In some embodiments of a Compute node 1900, a minority or relatively small portion of local node memory 144 (typically, only a few gigabytes) may be used for system information and intra-node messaging operations required by local firmware. The remainder of the available capacity (typically, 16 gigabytes or more) of a node memory 144 storage component (i.e., algorithm memory 1841) may thus be made available for Level 2 algorithm execution operations, for example: buffering intermediate results for use within the node 1900 itself; buffering a final intermediate result for transmission to the next node 1900 in the pipeline or to the management node 2000; storing data relevant to a previous or subsequent neural network processing layer; and the like.

In typical Flash/Compute node 1800 as set forth herein, an algorithm using local node memory 144 generally may slow down the streaming of data from memory store 143 into the programmable logic 410 space as required during algorithm processing operations. Such an intentional governing of data flow may be implemented as a design choice, since the data movers (described above) represent shared resources for both functions (i.e., retrieving data from memory store 143 and managing intra-node data transfers with respect to node memory 144 and other components of node 1800). In some situations, this may affect throughput in a manner that is measureable or significant, which is one of the motivations to implement the architecture depicted in FIG. 21 for high-throughput, computationally expensive applications in which it may be useful to regulate or to limit access to memory store 143.

Processing Cores

Local firmware running on either a Flash/Compute node 140, 1800, on the one hand, or on Compute node 1900, on the other hand, may generally utilize one or more processors 439, 1871 or cores (see processing system 430 in FIG. 4). As is generally known in the art, such firmware may employ multiple cores, for instance, to increase performance under normal loads, or it may throttle back and dedicate fewer cores to intra-node work in the event that a Level 2 algorithm requires the use of one or more processors 439, 1871 for high load situations.

In some implementations, it may be desirable to run a host Linux operating system in connection with any processor 432, 439, 1871 that is being used by, or that is managing, an algorithm processing operation or any application-specific code. Access to the various facilities of an applicable node 142, 1800, 1900, and 2000 may be strictly controlled by such a host operating system, and Linux is one operating system that provides certain protections for user and system data that are located in node memory 144 and memory store 143 that are not available in other commercially available operating systems. Specifically, using Linux, direct access to node memory 144 and memory store 143 elements may be strictly regulated in a manner that is not readily implemented using other operating systems. In some circumstance, the EMMC memory component 1870 integrated into or accessible by a Flash/Compute node 1800 and a Compute node 1900 may be utilized for maintaining data and instruction sets associated with the host operating system, for instance, and to act as a "hard drive" for the local node 1800, 1900 when needed or desired. Such activity may be limited to a specific partition on the memory component 1870 if desired, as is generally known in the art.

Management Node 2000 Facilities

A management node 2000, as previous described, may have a distinct architecture and specific facilities that are available to accommodate processing of Level 2 algorithms in some situations. In some implementations, for instance, a management node 2000 may include or have access to up to four times (or more) the local memory capacity (e.g., router memory 124) of other nodes (such as nodes 140, 1800, and 1900) and no memory store 143 component; additionally or alternatively, it may also not have any local processors or processing cores.

In the illustrated embodiments (provided byway of example only) a management node 2000 may generally be controlled by its own local version of the algorithm framework 2021, which may include extensions or appropriate modifications suitable to enable bi-directional data communication with the host compute system 199 (as set forth above with reference to FIG. 1) and any necessary functional blocks to implement necessary PCIe or other communications protocols (or other applicable protocols for interfacing with any other communication fabric that is generally known in the art or developed in accordance with known principles).

In the context of algorithm processing operations utilizing the programmable logic 2022 space of a management node 2000, for example, a single FPGA or other processing component resident at or integrated into the management node 2000 may be made available via algorithm framework 2021, and may be loaded and made available in the event that a Level 2 algorithm, which may require use of its resources, is selected for execution.

In the illustrated arrangement, router memory 124 integrated into a management node 2000 may be implemented as four or more separate DRAM modules (reference numerals 124a through 124n in FIGS. 1 and 20), though other configurations may have utility in some situations. In one implementation, each router memory 124 module may be sixteen gigabytes in capacity, and may be coupled to the local algorithm framework 2021 via a dedicated or individual direct memory access (DMA) or other channel. In that regard, a particular management node 2000 may alternatively function effectively as four (or more) virtual Compute nodes 1900 that each have programmable logic 2022 space only. In addition, the memory usage requirements for a given management node 2000 (in terms of overall system operation) may be generally low, so the vast majority of the total memory capacity resident at a management node 2000 may be made available to an algorithm executing in its programmable logic 2022 space.

A management node 2000 may also be capable of communicating directly with any and all other nodes 140, 1800, and 1900 connected to it via a pipeline or other distributed architecture hardware construct. These communications facilities may generally be used at any point during algorithm execution, though it is most likely that inter-node communications involving a management node 2000 will be related to or associated with a final or terminal operation at the end of execution or when data buffers or other temporary data storage components (such as result buffers 2091) reach some pre-determined capacity, at which point it may be necessary or desirable to initiate a return of data to the host compute system 199.

Several features and aspects of a system and method have been illustrated and described in detail with reference to particular embodiments by way of example only, and not by way of limitation. Those of skill in the art will appreciate that alternative implementations and various modifications to the disclosed subject matter are within the scope and contemplation of the present disclosure. Therefore, it is intended that the present disclosure be considered as limited only by the scope of the appended claims.

What is claimed is:

1. A compute node for use in a data processing system, the compute node comprising:
   a communications link communicatively coupling the compute node to one or both of a host compute system and an adjacent compute node in an execution pipeline;
   a data store comprising records associated with a data processing operation;
   a programmable logic component to execute the data processing operation in cooperation with the data store;
   a node memory comprising data and instructions to support operation of the programmable logic component in connection with the data processing operation and to facilitate inter-node data communications with the adjacent node via the communications link, wherein the node memory further comprises algorithm memory including resource-specific memory locations to support the data processing operation;
   a data mover component to facilitate intra-node data communications between the programmable logic component and the node memory; and
   a storage interface component to facilitate intra-node data communications between the programmable logic component and the data store;
   wherein the storage interface component utilizes a plurality of communications channels to transfer data between the programmable logic component and the data store; and
   wherein the data processing operation is associated with a computationally expensive algorithm and the compute node is deployed in a distributed processing compute environment to execute the computationally expensive algorithm.

2. The compute node of claim 1 wherein the communications link employs a serial communications protocol enabling bi-directional data communication between the compute node and other compute nodes in the execution pipeline.

3. The compute node of claim 2 wherein the compute node is communicatively coupled to the adjacent compute node in series via the communications link.

4. The compute node of claim 1 wherein the data comprise an Electronically Erasable Programmable Read Only Memory (EEPROM) device.

5. The compute node of claim 4 wherein the storage interface employs an Open NAND Flash Interface (ONFI) protocol.

6. The compute node of claim 1 wherein the programmable logic component comprises a field programmable gate array (FPGA).

7. The compute node of claim 1 wherein the compute node further comprises a processor to manage operation of the data mover component.

8. The compute node of claim 7 wherein the data mover component comprises a device controller.

9. The compute node of claim 1 wherein the communications link enables the compute node to receive instructions from the host compute system, the instructions to influence operation of the compute node.

10. The compute node of claim 1 wherein the compute node is combined with a router module and integrated into an interface card communicatively coupled to the host compute system.

11. The compute node of claim 1 wherein the compute node executes a respective operation associated with the computationally expensive algorithm using information in a computer-executable code associated with the computationally expensive algorithm and results of a respective preceding operation, and passes respective additional results of the respective operation to a next compute node in the execution pipeline.

12. The compute node of claim 11 wherein the computer-executable code associated with the computationally expensive algorithm is incorporated in a bit stream.

* * * * *